US008552962B2

(12) United States Patent
Otani et al.

(10) Patent No.: US 8,552,962 B2
(45) Date of Patent: Oct. 8, 2013

(54) METHOD AND APPARATUS FOR REDUCING HEAT GENERATED AT SOURCE DRIVER OF DISPLAY APPARATUS

(75) Inventors: Yoshiyuki Otani, Shiga (JP); Hiroshi Kojima, Shiga (JP); Masaaki Nishihara, Osaka (JP); Tomoya Ishikawa, Osaka (JP); Tooru Suyama, Kyoto (JP)

(73) Assignee: Panasonic Corporation, Osaka (JP)

( * ) Notice: Subject to any disclaimer, the term of this patent is extended or adjusted under 35 U.S.C. 154(b) by 123 days.

(21) Appl. No.: 13/220,265

(22) Filed: Aug. 29, 2011

(65) Prior Publication Data

US 2011/0316823 A1 Dec. 29, 2011

Related U.S. Application Data

(63) Continuation of application No. PCT/JP2010/006589, filed on Nov. 10, 2010.

(30) Foreign Application Priority Data

Dec. 10, 2009 (JP) ................................ 2009-280274

(51) Int. Cl.

*G09G 3/36* (2006.01)
*G09G 5/00* (2006.01)
*G06F 3/038* (2013.01)

(52) U.S. Cl.

USPC .......................................... 345/101; 345/204

(58) Field of Classification Search

USPC ............ 345/101, 204–215, 690–699; 349/72; 374/141, 163

See application file for complete search history.

(56) References Cited

U.S. PATENT DOCUMENTS 5,929,833 A * 7/1999 Koshobu et al. .............. 345/101
6,075,511 A * 6/2000 Iwasaki et al. ................ 345/101
6,211,854 B1 4/2001 Fujiyoshi
7,271,836 B2 * 9/2007 Wako et al. .................. 348/314

(Continued)

FOREIGN PATENT DOCUMENTS

JP 3233895 9/2001
JP 2002-366081 12/2002

(Continued)

OTHER PUBLICATIONS

Unmatched NPL document provided by Applicant but improperly listed on IDS of Jan. 17, 2012.*

(Continued)

*Primary Examiner* — Ariel Balaoing
*Assistant Examiner* — Larry Sternbane
(74) *Attorney, Agent, or Firm* — McDermott Will & Emery LLP

(57) ABSTRACT

A display apparatus driving circuit capable of reducing the amount of heat generated at a driving unit while suppressing degradation in image quality is provided. A display apparatus driving circuit according to the present invention includes: a source driver for driving a display unit; a heat detecting circuit for detecting amount of heat generated at the source driver, and outputting a heat detection signal when the detected amount of generated heat is equal to or larger than a predetermined reference value; and a heat reduction circuit for changing, when the heat detection signal is received, a driving method of the display unit to reduce the amount of heat generated at said source driver.

15 Claims, 48 Drawing Sheets

(56) References Cited

U.S. PATENT DOCUMENTS

| | | | | |
|---|---|---|---|---|
| 7,898,556 | B2 | 3/2011 | Kinoshita | |
| 2002/0196242 | A1 | 12/2002 | Miura | |
| 2006/0007207 | A1 * | 1/2006 | Kawaguchi | 345/204 |
| 2007/0080905 | A1 * | 4/2007 | Takahara | 345/76 |
| 2007/0296664 | A1 | 12/2007 | Kinoshita | |
| 2008/0136767 | A1 * | 6/2008 | Kim et al. | 345/101 |
| 2008/0278473 | A1 * | 11/2008 | An | 345/214 |
| 2009/0002291 | A1 | 1/2009 | Koo et al. | |
| 2009/0002301 | A1 | 1/2009 | Koo et al. | |
| 2009/0002302 | A1 * | 1/2009 | Koo et al. | 345/89 |
| 2009/0002578 | A1 * | 1/2009 | Araki et al. | 349/8 |
| 2009/0201231 | A1 * | 8/2009 | Takahara et al. | 345/76 |
| 2010/0013817 | A1 * | 1/2010 | Ryu et al. | 345/211 |

FOREIGN PATENT DOCUMENTS

| | | |
|---|---|---|
| JP | 2007-187904 | 7/2007 |
| JP | 2008-250207 | 10/2008 |
| JP | 2009-009088 | 1/2009 |

OTHER PUBLICATIONS

G.A. Rincon-Mora, “Voltage References—From Diodes to Precision High—Order Bandgap Circuits,” IEEE Press, John Wiley & Sons Inc., pp. 28-29-, 2002.

* cited by examiner

METHOD AND APPARATUS FOR REDUCING HEAT GENERATED AT SOURCE DRIVER OF DISPLAY APPARATUS

CROSS REFERENCE TO RELATED APPLICATION

This is a continuation application of PCT application No. PCT/JP2010/006589 filed on Nov. 10, 2010, designating the United States of America.

BACKGROUND OF THE INVENTION (1) Field of the Invention

The present invention relates to display apparatus driving circuits and methods of driving display apparatuses, and particularly relates to a display apparatus driving circuit and a method of driving the display apparatus which reduce the amount of heat generated at a driving unit which drives a display panel.

(2) Description of the Related Art

A display apparatus including a display panel includes a driving unit for driving the display panel (for example, see Patent Literature 1: Japanese Patent No. 3233895). FIG. 49 illustrates the configuration of a conventional display apparatus according to Patent Literature 1. Here, the driving unit in the conventional display apparatus shall be described with reference to FIG. 49.

As illustrated in FIG. 49, the conventional display apparatus includes a display unit 5 (display panel), a source driver 6, a gate driver 7, a timing controller 8, a DC voltage conversion circuit 9, and a tone voltage generator 10. The driving unit corresponds to the gate driver 7 and the source driver 6.

The source driver 6 includes multiple output terminals, and multiple output buffers may be provided for generating voltage at the multiple output terminals. Each of the output buffers is connected to a data line, and drives the data line and the load of the display panel. Accordingly, when the source driver 6 outputs electric potential of a data signal Vdata, a charge-discharge current from a high potential voltage VDD or to a low potential voltage VSS flows to the load in the display panel. Here, since the charge-discharge current passes through an internal resistor in the output buffer provided in the source driver 6, heat is generated by the joule heating in the internal resistor.

Along with the increased definition of the display panel in recent years, the number of output buffers provided in one source driver 6 increases. As a result, the amount of heat generated at the source driver 6 increases. In order to suppress the generated heat at a certain temperature or lower, it is effective to reduce the number of the output buffers for each source driver 6 (reduce the number of output channels) and to use multiple source drivers 6, or to use a heat dissipating sheet. However, these methods increase the set cost, and thus further reduction in the generated heat of the source driver 6 is necessary.

The heat generated inside of the source driver 6 mostly comes from an output buffer unit. Accordingly, it is necessary to reduce the heat generated particularly at the output unit of the output buffer in order to reduce the amount of heat generated at the source driver 6.

As a method to prevent the increase in the amount of generated heat, a driving method performing thinned scanning (interlaced driving) depending on conditions of output images has been proposed (for example, see Patent Literature 1). In the technology disclosed in Patent Literature 1, the heat is reduced by switching from a progressive driving to the interlaced driving when it is determined that the image to be displayed is a still image, using a function in the timing controller 8 determining moving images and still images.

SUMMARY OF THE INVENTION

However, although interlaced driving dramatically reduced the amount of generated heat, there is a problem that image quality blur is displayed in the display panel.

With the conventional technology, when the timing controller determines that the image to be displayed is a still image, the driving method is switched to the interlaced driving. However, among still images, there are images with large amount of heat and images with small amount of heat, and switching to the interlaced driving with the still image with small amount of generated heat would only result in the degradation in the image quality.

Furthermore, since the heat generated at the source driver is merely an accumulation of the amount of heat generated in each display frame, and even in the still image with a large amount of generated heat, the source driver does not immediately generate heat unless the image is continuously displayed for a predetermined amount of time. The conventional technology has a problem that the image quality is highly likely to be degraded depending on the use of the display panel as a price for reducing the generated heat (reducing the power consumption), Accordingly, the conventional technology is not applicable for a high-quality display panel, and it is necessary to use multiple source drivers while reducing the number of output buffers for one source driver (reduce output channels), or to use a heat radiating sheet to reduce the amount of generated heat. However, these measures increase the set cost as described above.

The present invention has been conceived in response to the problems in conventional technology, and it is an object of the present invention to provide a display apparatus driving circuit and the method of driving the display apparatus capable of reducing the factors for the driving unit, that is, reducing the set cost by reducing the amount of heat generated at the driving unit while suppressing the degradation in the image quality in the display apparatus.

In order to solve the problems described above, the display apparatus driving circuit according to an Embodiment of the present invention is a display apparatus driving circuit including: a source driver for driving a display unit; a heat detecting circuit for detecting amount of heat generated at the source driver, and outputting a heat detection signal when the detected amount of generated heat is equal to or larger than a predetermined reference value; and a heat reduction circuit for changing, when the heat detection signal is received, a driving method of the display unit to reduce the amount of heat generated at the source driver.

With this configuration, as in the conventional display apparatus driving circuit, whether or not to change the display driving method is not determined depending on whether the image is moving image or still image, and a determination as to whether or not the amount of generated heat detected by the heat detecting circuit exceeds one or more set reference values, and changes the display driving method when the amount of generated heat exceeds the reference value. Accordingly, in addition to not changing the display driving method in the still image with small amount of generated heat, it is possible to continuously detect heat in real time. Thus, it is possible to suppress the degradation in image quality as much as possible without unnecessarily switching the display driving method. Therefore, it is possible to reduce the amount of heat generated at the driving unit while suppressing the degradation in the image quality in the display apparatus. Thus, it is possible to reduce the factor for the driving unit, that is, the set cost.

Furthermore, the heat detecting circuit may receive at least part of image data on a row basis, compare first data in row p and second data in row p+1 out of the received image data so as to detect a value based on a difference between the first data and the second data as the generated heat amount, where p is a natural number.

With this configuration, the amount of generated heat is detected as a value based on the difference in the image data. Thus, it is possible to detect the change in temperature more precisely. In other words, the change in each row of the image is detected. Thus, it is possible to determine whether the image is an image with a large amount of generated heat or an image with a small amount of generated heat, suppressing the change in the driving method. Accordingly, it is possible to reduce the amount of heat generated at the driving unit while suppressing the degradation in image quality.

Furthermore, the heat detecting circuit may detect, as the generated heat amount, the number of successive frames in which absolute differences of the first data and the second data in one frame is larger than a predetermined first threshold for the number of times equal to or larger than a predetermined second threshold.

With this configuration, it is possible to change the driving method and to suppress the change in the driving method when there are successive frames with a large amount of generated heat. Accordingly, it is possible to suppress the change in the driving method, suppressing the degradation in the image quality.

Furthermore, the heat detecting circuit may include a counter for outputting a count as the generated heat amount, and the counter may increment the count when absolute differences of the first data and the second data in one frame is larger than the predetermined first threshold for the number of times equal to or larger than a predetermined second threshold, and decrement the count when the number of times is smaller than the second threshold.

With this configuration, it is possible to change the driving method and to suppress the change in the driving method when there are more frames with a large amount of generated heat than frames with a small amount of generated heat. Accordingly, it is possible to reduce the amount of generated heat and to suppress the change in the driving method, suppressing the degradation in the image quality.

Furthermore, the heat detecting circuit may include: a temperature measuring circuit for measuring a temperature which is the amount of heat generated at the source driver; and a temperature comparison circuit for comparing the temperature measured by the temperature measuring circuit and a reference temperature which is the reference value, and the heat detecting circuit outputs the heat detection signal when the temperature measured by the temperature detecting circuit is equal to or higher than the reference temperature.

With this configuration the temperature is directly measured. Thus, it is possible to determine the change in the driving method according to the actual amount of generated heat. Accordingly, it is possible to reduce the amount of generated heat more effectively and to suppress the change in the driving method. Thus, it is possible to suppress the degradation in image quality.

Furthermore, the heat detecting circuit may further include a reference circuit for generating a reference voltage corresponding to the reference temperature, using bandgap characteristics, the temperature measuring circuit further generates a measured voltage corresponding to the measured temperature, and the temperature comparison circuit compares the reference voltage and the measured voltage, and outputs the heat detection signal when the measured voltage is equal to or larger than the reference voltage.

With this configuration, it is possible to easily compare the temperature and the reference value by converting the measured temperature into a voltage.

Furthermore, the heat detecting circuit may detect s generated heat amount, compares the s generated heat amount with s reference values, and outputs a heat detection signal according to the s generated heat amount, the s reference values, and their magnitude relationship, where s is a natural number, and the heat reduction circuit may change the driving method to a driving method according to a type of the heat detection signal.

With this configuration, it is possible to perform detection by more than one step, and change the driving method according to the heat detection signal in accordance with the detection result. Thus, it is possible to select a driving method more effective for reducing the amount of generated heat. Accordingly, it is possible to reduce the amount of generated heat more effectively, and to suppress the change in the driving method, suppressing the degradation in image quality.

Furthermore, the display apparatus driving circuit may include: n of the source driver; and at least one of the heat detecting circuit, in which the at least one heat detecting circuit is incorporated in at least one of the n source drivers.

With this configuration, it is possible to achieve effects equivalent to the effects described above even when more than one source drivers are used. Thus, it is possible to increase the size of the display apparatus.

Furthermore, the at least one source driver having the heat detecting circuit among the n source drivers may be two or more source drivers which are interconnected, and heat detecting circuits included in the two or more source drivers may share a detection result.

With this configuration, it is possible to match the driving method of the multiple source drivers.

Furthermore, all of the n source drivers may change the driving method to a same driving method when any of the at least one heat detecting circuit outputs the heat detection signal.

With this configuration, it is possible to match the driving method of the multiple source drivers.

Furthermore, the display apparatus driving circuit may further include a timing controller for controlling a driving timing by the source driver, based on image data, in which the heat detecting circuit is incorporated in the timing controller.

With this configuration, even when the heat detecting circuit is incorporated in the timing controller, it is possible to reduce the amount of generated heat and to suppress the change in the driving method, suppressing the degradation in the image quality.

Furthermore, the display apparatus driving circuit may further include a gate driver for driving the display unit on a row basis, in which the gate driver and the source driver may change the driving method from a progressive driving to an interlaced driving or a frame thinning driving, when the heat detection signal is received.

With this configuration, the driving method is changed from the progressive driving to the interlaced driving or the frame thinning driving, reducing the amount of generated into approximately half.

Furthermore, the heat reduction circuit may change the driving method from a method that does not perform charge sharing to a method that performs charge sharing, when the heat detection signal is received.

With this configuration, charge sharing is performed. Thus, it is possible to reduce the voltage that should be driven by the source driver, reducing the amount of generated heat.

Furthermore, the heat reduction circuit may perform the charge sharing by short-circuiting at least one of (i) odd columns and (ii) even columns.

With this configuration, the present invention is applicable to a column-inversion driving display apparatus.

Furthermore, the method of driving the display apparatus according to an aspect of the present invention is a method of a driving display apparatus including a source driver for driving a display unit, the method including: detecting amount of heat generated at the source driver; determining whether the detected amount of generated heat is equal to or larger than a predetermined reference value; and changing, when it is determined that the amount of generated heat is equal to or larger than the reference value, a driving method of the display unit to reduce the amount of heat generated at the source driver.

With this configuration, as in the conventional technology, whether or not to change the display driving method is not determined depending on whether the image is moving image or still image, and a determination as to whether or not the amount of generated heat detected by the heat detecting circuit exceeds one or more set reference values, and changes the display driving method when the amount of generated heat exceeds the reference value. Accordingly, in addition to not changing the display driving method in the still image with small amount of generated heat, it is possible to continuously detect heat in real time. Thus, it is possible to suppress the degradation in image quality as much as possible without unnecessarily switching the display driving method. Therefore, it is possible to reduce the amount of heat generated at the driving unit while suppressing the degradation in the image quality in the display apparatus. Thus, it is possible to reduce the factor for the driving unit, that is, the set cost.

According to the present invention, it is possible to reduce the amount of heat generated at the driving unit while suppressing the degradation in the image quality in the display apparatus allows decrease in the factor of the driving unit, that is, the set cost.

Further Information About Technical Background to this Application

The disclosure of Japanese Patent Application No. 2009-280274 filed on Dec. 10, 2009 including specification, drawings and claims is incorporated herein by reference in its entirety.

The disclosure of PCT application No. PCT/JP2010/006589 filed on Nov. 10, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

Figure 1:
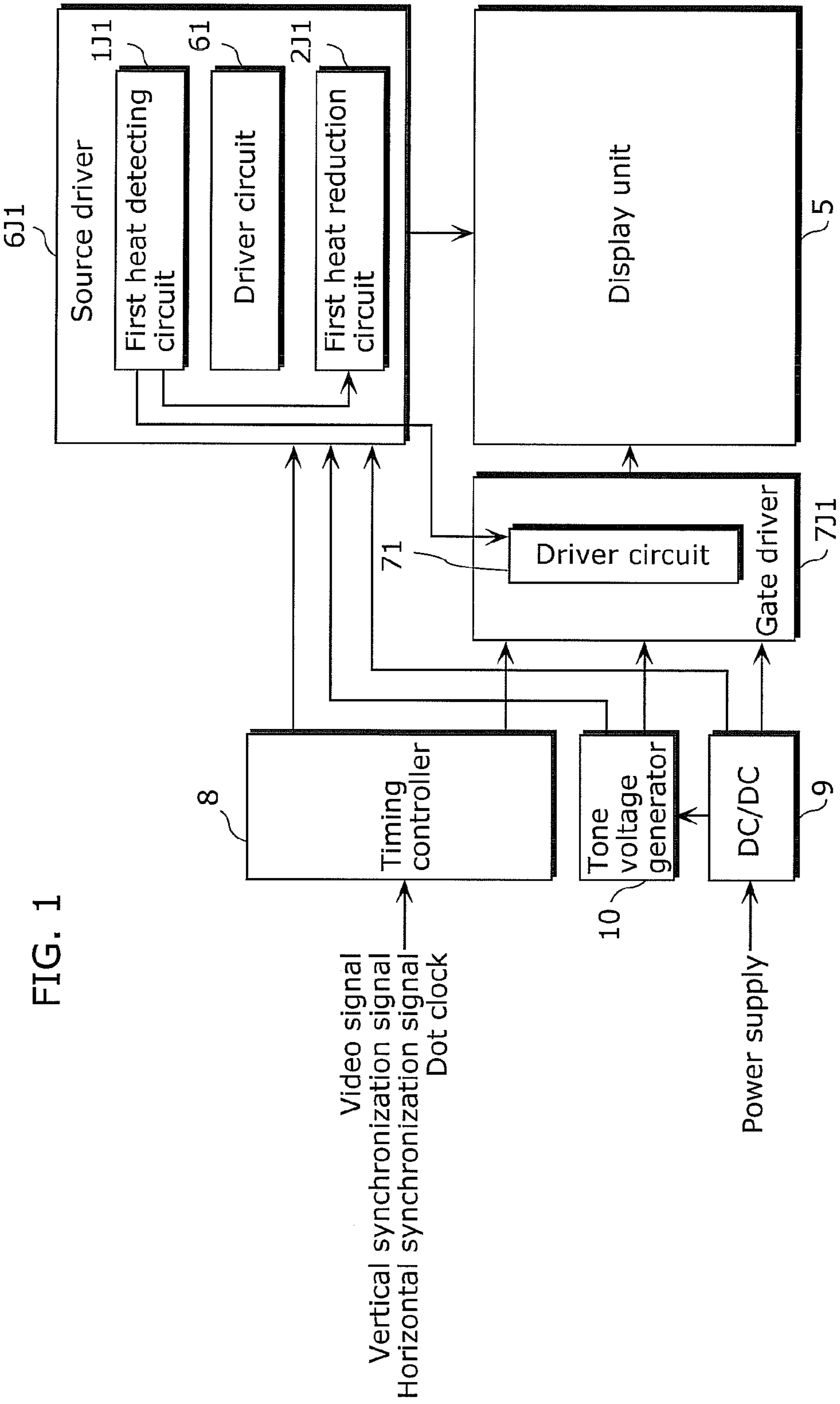
FIG. 1 illustrates an example of block configuration of a display apparatus according to Embodiment 1.

Embodiments of the present invention shall be described as follows with reference to the drawings. Note that, the timing charts are for simplified description, and strictly speaking, the timing may not be accurate. Furthermore, Embodiments are essentially preferable examples, and it is not intended to limit the scope of the present invention, the application of the present invention, and the use of the present invention. In the description for Embodiments and variations, descriptions for components having equivalent function as components that have been described once are assigned with the same reference numerals, and the description for those components are omitted.

Embodiment 1

FIG. 1 illustrates a schematic configuration of a display apparatus according to Embodiment 1. The display apparatus according to Embodiment 1 is, for example, an active-matrix liquid crystal display (LCD) apparatus. The display apparatus illustrated in FIG. 1 includes a display unit 5, a source driver 6J1, a gate driver 7J1, a timing controller 8, a DC voltage conversion circuit 9, and a tone voltage generator 10.

More specifically, the display unit 5 includes pixels arranged in a matrix. Multiple data lines (not illustrated) and multiple scan lines (not illustrated) arranged in a matrix are connected to the pixels. The source driver 6J1 for driving the data lines and the gate driver 7J1 for driving the gate lines are provided near the display unit 5.

The source driver 6J1 (the signal line driver circuit) includes a driver circuit 61, a first heat detecting circuit 1J1, and a first heat reduction circuit 2J1, and drives the display unit 5 per column. The gate driver 7J1 (the scanning line driver circuit) includes a driver circuit 71, and drives the display unit 5 per row. Note that, the gate driver 7J1 here is not limited to a gate driver integrated circuit (IC).

The display apparatus according to Embodiment 1 further includes the timing controller 8, the DC voltage conversion circuit 9 (illustrated as DC/DC in the drawing), and the tone voltage generator 10. The timing controller 8 receives inputs of video signals, vertical synchronization signals, horizontal synchronization signals, and dot clocks. The DC voltage conversion circuit 9 receives an input of the power supply voltage. For example, the timing controller 8 generates and outputs a frame pulse signal FP based on the vertical synchronization signal, and generates and outputs a line pulse signal LP based on the horizontal synchronization signal. Furthermore, the timing controller 8 controls driving timing by the gate driver 7J1 and the source driver 6J1, based on image data.

Figure 2:
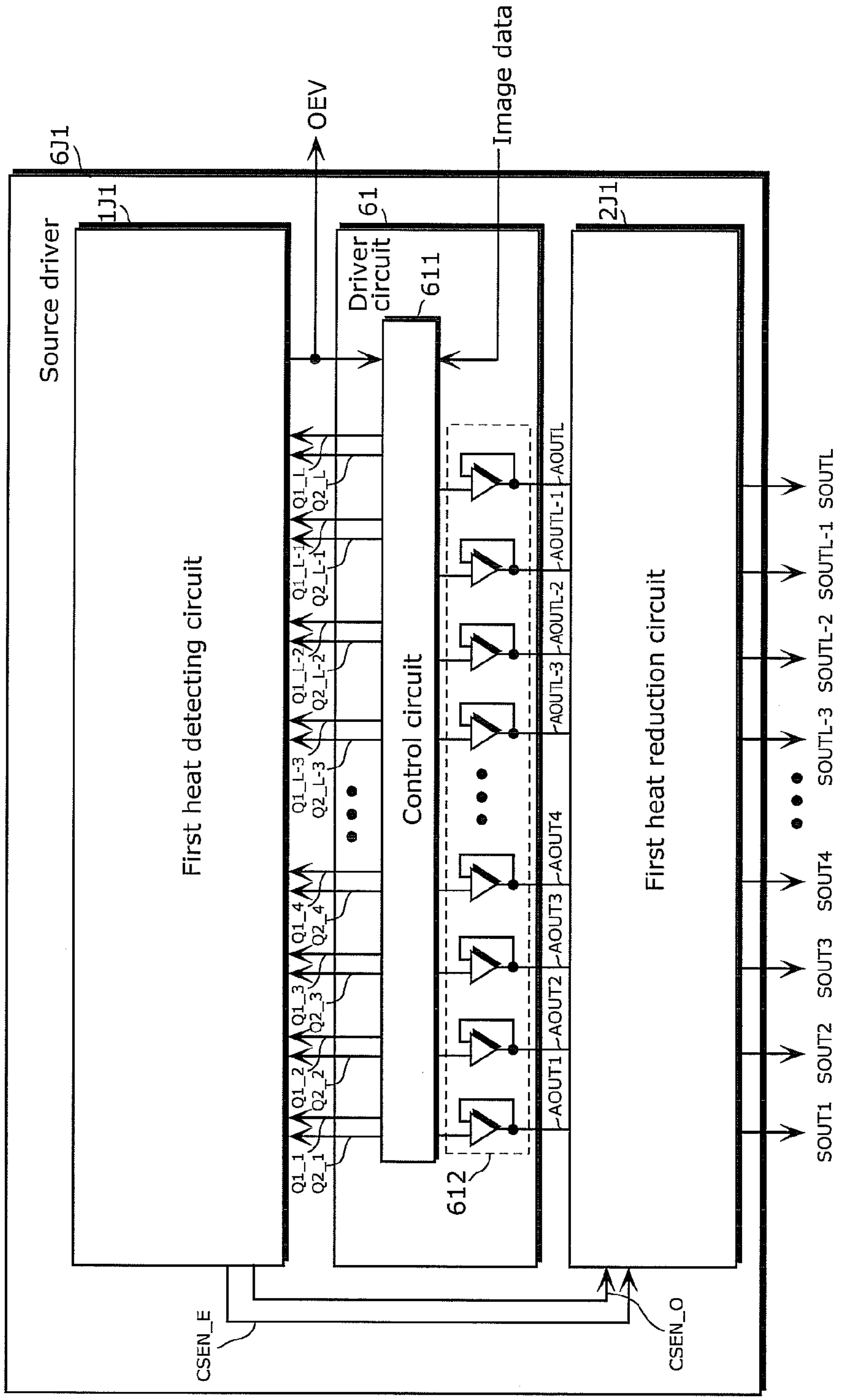
FIG. 2 illustrates an example of schematic configuration of a source driver according to Embodiment 1.

FIG. 2 illustrates a schematic configuration of the source driver 6J1. The source driver 6J1 includes L (L is a natural number) output channel, a driver circuit 61, a first heat detecting circuit 1J1, and a first heat reduction circuit 2J1. Note that, in Embodiment 1, L is a number of columns of pixels arranged in a matrix in the display unit 5; that is, the number of data lines. For description purpose, only signals transmitted and received between the driver circuit 61, the first heat detecting circuit 1J1 and the first heat reduction circuit 2J1, and between the source driver 6J1, the display unit 5, and the gate driver 7J1 are indicated.

Driver Circuit 61

As illustrated in FIG. 2, the driver circuit 61 includes a control circuit 611 and the output buffer unit 612. In the driver circuit 61, the control circuit 611 receives image data from the timing controller 8, performs digital-analog conversion on the image data for one row in the corresponding output channel 1 to L, and outputs the data line driving signals AOUT1 to AOUTL to the first heat reduction circuit 2J1 with a timing for each line via the corresponding output buffer unit 612.

The control circuit 611 includes a first latch group (not illustrated) and a second latch group (not illustrated). The first latch group is for sequentially loading and holding image data for one row from the timing controller 8. The second latch group is for loading the image data for one row in the first latch group with the timing when the timing controller 8 does not update the image data, and for holding the input to the output buffer unit 612 which output data line driving signals AOUT1 to AOUTL for a time for one row. At certain timing when the image data from the timing controller 8 is not updated, the first latch group holds the image data for the current one row, and the second latch group holds the image data for the previous one row. Accordingly, the first latch group includes latches with a bit width of the number of output channels L×the image data. The second latch group includes the latches as many as the first latch group.

The output from the latch in the first latch group corresponding to the output channel 1 is provided to the first heat detecting circuit 1J1 as the latch signal Q1_1. The output from the latch in the second latch group corresponding to the output channel 1 is provided to the first heat detecting circuit 1J1 as the latch signal Q2_1. The latch signal Q1_1 and the latch signal Q2_1 may only have a bit width of higher bits necessary for the first heat detecting circuit 1J1. This is because, the amount of generated heat is dependent on transition amount of the image data, and the transition amount is larger the higher the bit is. Here, it is assumed 3 bits are necessary, and the bit width of the latch signal Q1_1 and the latch signal Q2_1 is 3 bits.

Similarly, the latch signals Q1_2 to Q1_L and the latch signals Q2_2 to Q2_L are signals corresponding to the output channels. In response to the output enable signal OEV from the first heat detecting circuit 1J1, the control circuit 611 controls update of the data line driving signals AOUT1 to AOUTL for one row. Here, it is assumed that the output enable signal OEV is L active, and only when the OEV is L (that is, when the OEV is in low level), the driver circuit 61 updates the data line driving signals AOUT1 to AOUTL.

First Heat Detecting Circuit 1J1

The first heat detecting circuit 1J1 detects the amount of heat generated at the source driver 6J1, and outputs a heat detection signal when the detected amount of generated heat is equal to or higher than a reference value. In Embodiment 1, at least part of the image data is received per row, first data in p row (p is a natural number) and second data in p+1 row among the received image data are compared to detect a value based on the difference between the first data and the second data as the amount of generated heat. The following describes specific configuration.

The first heat detecting circuit 1J1 calculates the amount of heat generated at the source driver 6J1 from the latch signals Q1_1 to Q1_L and the latch signals Q2_1 to Q2_L output from the driver circuit 61. Subsequently, when the calculated amount of generated heat is equal to or higher than the predetermined reference value, the first heat detecting circuit 1J1 outputs the heat detection signal.

More specifically, the first heat detecting circuit 1J1 determines whether or not the calculated amount of generated heat exceeds one or more set levels. More specifically, the first heat detecting circuit 1J1 includes one or more set levels which are one or more reference values, and determines whether or not the calculated amount of generated heat exceeds which one of the set levels.

The first heat detecting circuit 1J1 then outputs the heat detection signal according to the set level at which the amount of generated heat exceeds. More specifically, the first heat detecting circuit 1J1 outputs, as the heat detection signals according to the level of the detected amount of generated heat, an odd-column charge sharing enable signal CSEN_O, and an even-column charge sharing enable signal CSEN_E to the first heat reduction circuit 2J1 and an output enable signal OEV to the driver circuit 61 and the gate driver 7J1.

As such, the first heat detecting circuit 1J1 detects s (s is a natural number) levels of detection, more specifically, comparisons with s reference values (set levels), and is capable of outputting s-types of heat detection signals. To put it differently, the first heat detecting circuit 1J1 can output heat detection signals of types according to s amounts of generated heat and s reference values.

After that, the first heat detecting circuit 1J1 causes the gate driver 7J1 and the source driver 6J1 to perform display driving methods different for each type of the heat detection signal. For example, upon receiving the heat detection signal, the gate driver 7J1 and the source driver 6J1 perform charge sharing as a first step of heat reduction method, and change the display driving methods from the progressive driving to the interlaced driving or the frame thinning driving as a second step of heat reduction method. Note that, a specific example of the charge sharing, the progressive driving, the interlaced driving, and the frame thinning driving shall be described later.

First Heat Reduction Circuit 2J1

The first heat reduction circuit 2J1 is a circuit controlling the charge sharing which is an example of the first step of heat reduction method.

The first heat reduction circuit 2J1 receives the odd-column charge sharing enable signal CSEN_O and the even-column charge sharing enable signal CSEN_E from the first heat detecting circuit 1J1. Subsequently, the first heat reduction circuit 2J1 performs charge sharing on the data line driving signals AOUT1 to AOUTL from the driver circuit 61 with an appropriate timing, and output the data line driving signals SOUT to SOUTL to the display unit 5 so as to drive the data lines.

Detailed Description of First Heat Detecting Circuit 1J1

The configuration and the operations of the first heat detecting circuit 1J1 shall be described in further detail with reference to FIGS. 3 to 7.

Figure 3:
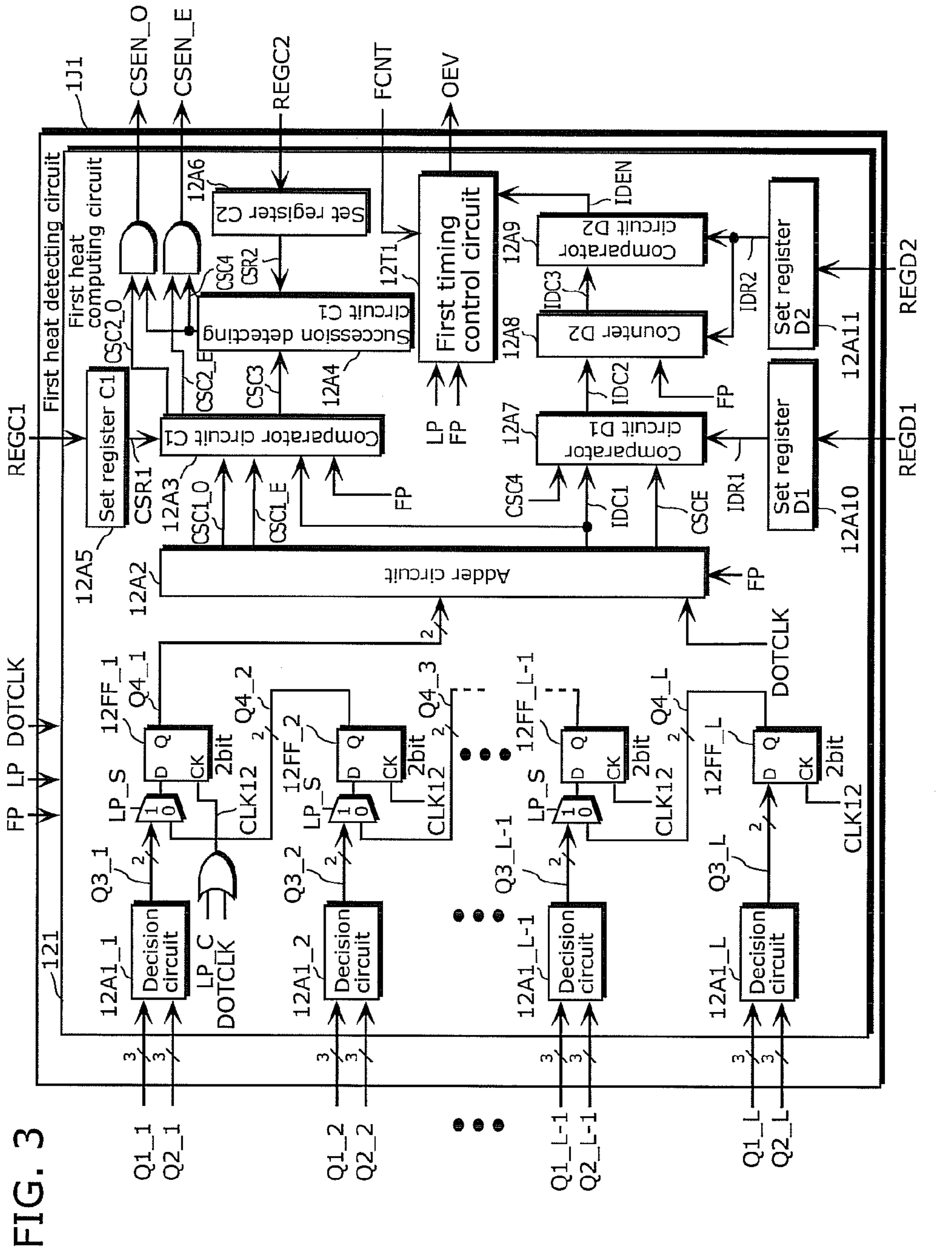
FIG. 3 illustrates an example of schematic configuration of a first heat detecting circuit according to Embodiment 1.

FIG. 3 illustrates the schematic configuration of the first heat detecting circuit 1J1. The first heat detecting circuit 1J1 includes a first heat computing circuit 121. The first heat computing circuit 121 includes L decision circuits 12A1_1 to 12A1_L corresponding to output channels, L×2-bit flip-flops 12FF_1 to 12FF_L, an adder circuit 12A2, a first comparator circuit 12A3 (comparator circuit C1), a succession detecting circuit 12A4 (succession detecting circuit C1), a first set register 12A5 (set register C1), and a second set register (set register C2). The first heat computing circuit 121 further includes a second comparator circuit 12A7 (comparator circuit D1), a counter 12A8 (counter D2), a third comparator circuit 12A9 (comparator circuit D2), a third set register 12A10 (set register D1), a fourth set register 12A11 (set register D2), and a first timing control circuit 12T1.

The first heat reduction circuit 2J1 receives, from outside, inputs of a frame pulse signal FP, a line pulse signal LP, a dot clock signal DOTCLK, latch signals Q1_1 to Q1_L, latch signals Q2_1 to Q2_L, register setting signals REGC1, REGC2, REGD1, and REGD2, and a selection signal FCNT.

The frame pulse signal FP indicates a top of a frame. The line pulse signal LP indicates a top of a row. The dot clock signals DOTCLK is a clock signal indicating output timing for each pixel.

The register setting signals REGC1, REGC2, REGD1, and REGD2 are for reading or writing the set register C1, the set register C2, the set register D1, and the set register D2, respectively. The selection signal FCNT is for selecting the driving method for heat reduction as the interlaced driving or the frame thinning driving.

The register setting signals REGC1, REGC2, REGD1, and REGD2 allow the user or manufacturer and others to write or change the set levels. Similarly, the selection signal FCNT allows the user or manufacturer to set the selection of the driving method.

Figure 4:
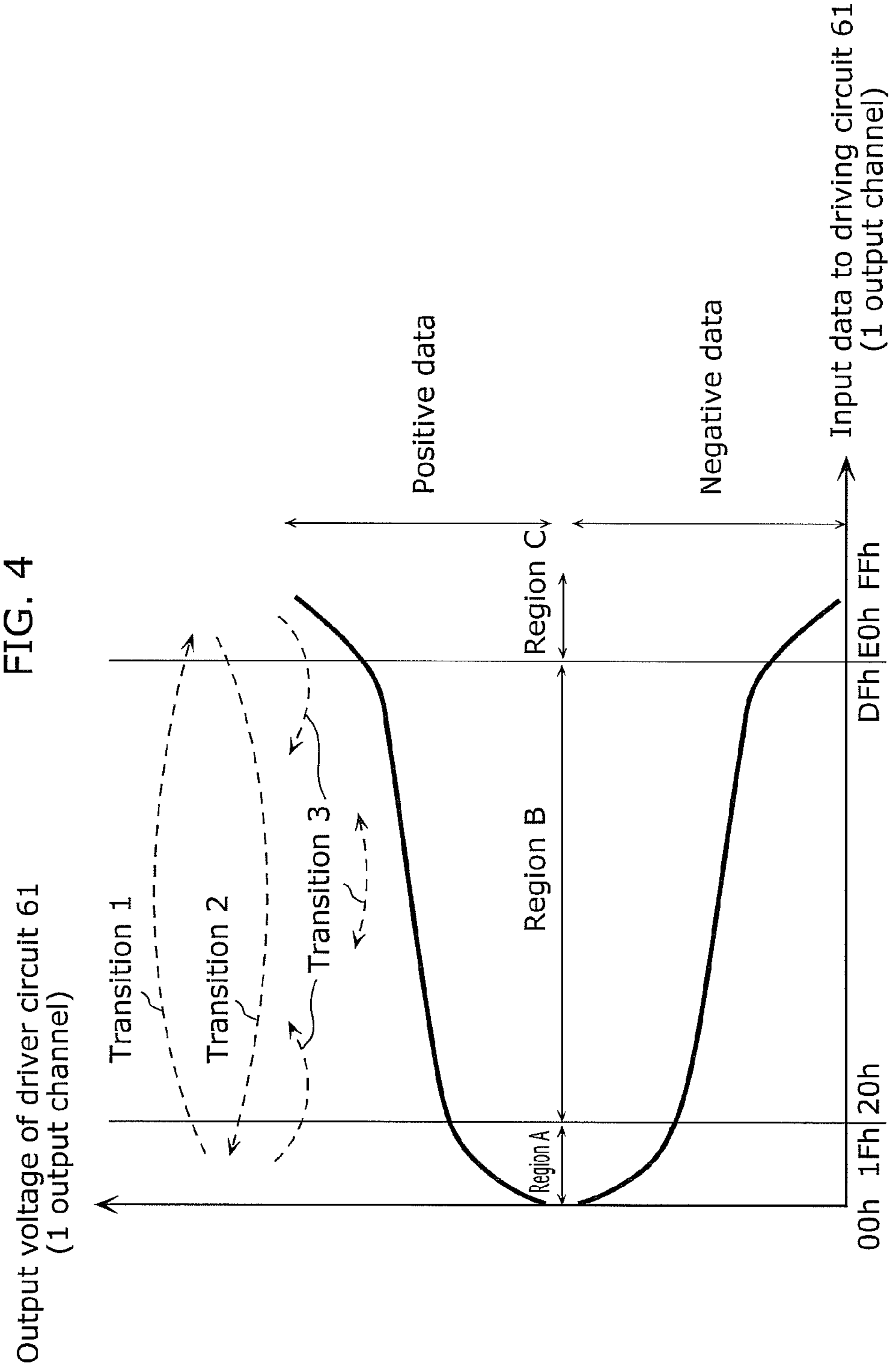
FIG. 4 illustrates an example of input-output relationship for one terminal in a driver circuit according to Embodiment 1.
Figure 5:
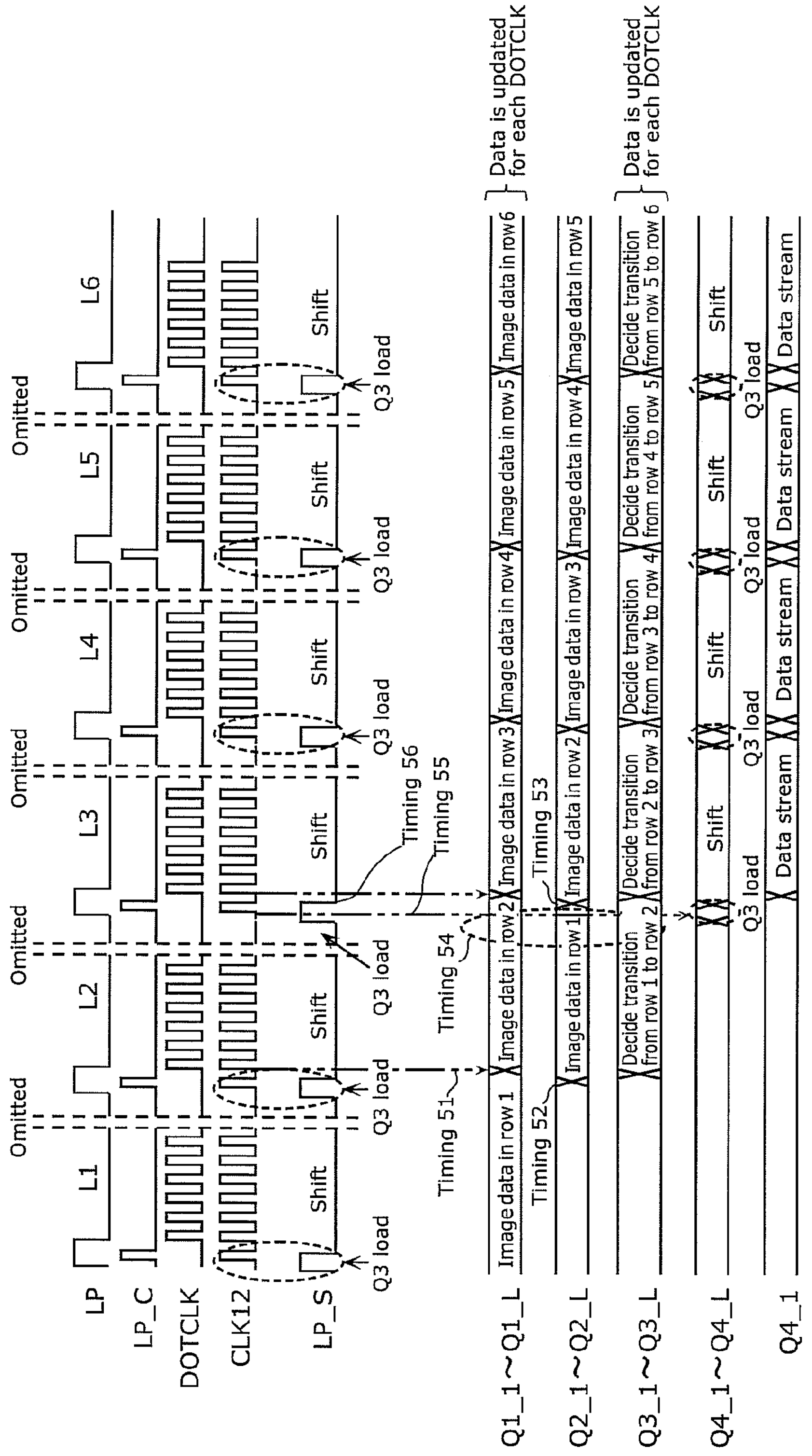
FIG. 5 illustrates an example of timing chart of internal signal of the first heat detecting circuit according to Embodiment 1.

First, the overview of operations by part of circuit from inputs of the latch signals Q1_1 to Q1_L, the latch signals Q2_1 to Q2_L, to the adder circuit 12A2 with reference to FIGS. 3 to 5. In this part of circuit, a transition state from image data for a previous row to image data for a current row is determined, and the amount of heat generated by the transition of the image data for one row is held as a value, and an output of the value is provided to the adder circuit 12A2. More specifically, the first heat computing circuit 121 receives at least part of the image data per row, compares first data of p row (p is a natural number) and second data of p+1 row among the received image data, and to detect the value based on the difference between the first data and the second data as the amount of generated heat.

More specifically, the following shall describe a method of digitizing the amount of generated heat by the transition in the image data for one row, and a method of transferring the numeric data of the amount of generated heat to the adder circuit 12A2.

FIG. 4 illustrates an example of input-output relationship of one of the output channels of the driver circuit 61. Here, as an example, the input image data has 256 tones, and 8-bit wide.

The latch signals Q1_1 to Q1_L, and the latch signals Q2_1 to Q2_L are signals in which 3 highest bits out of the 8 bits of the image data are latched. When it is assumed that the values of the latch signals Q1_1 to Q1_L, and the latch signals Q2_1 to Q2_L are 0h, it means that the image data is 1Fh or less in all tones, that is, within the region A in FIG. 4. When the values of the latch signals are 7h, it means that latch signals are E0h or more in all tones, that is, within the region C in FIG. 4. When the values of the latch signals are not 0h or 7h, it means that the image data is between 20h and DFh in all tones, that is, within the region B in FIG. 4.

The latch signal Q1_1 is a latch signal corresponding to the current output channel 1, and the latch signals Q2_1 is a latch signal corresponding to the output channel 1 for the previous row. For this reason, a comparison of the latch signal Q1_1 and the latch signal Q2_1 shows one of "Transition 1", "Transition 2", and "Transition 3" in FIG. 4. A circuit performing the decision is the decision circuit 12A1_1 in FIG. 3, which outputs the decision result as a decision signal Q3_1.

The larger the transition width of the image data is, the larger the charge-discharge current to the load in the display unit 5 becomes, or the amount of generated heat. More specifically, in FIG. 4, "Transition 1" and "Transition 2" indicates a large amount of generated heat.

When the decision circuit 12A1_1 decides that that transition is "Transition 1" with the large amount of generated heat, the decision circuit 12A1_1 outputs a 2-bit value 11b as the decision signal Q3_1. Similarly, when the decision circuit 12A1_1 decides that the transition is "Transition 2", the decision circuit 12A1_1 outputs a 2-bit value 10b, and when the decision circuit 12A1_1 decides that the transition is "Transition 3" with the small amount of generated heat, the decision circuit 12A1_1 outputs a 2-bit value 00b. In this example, the higher bit of the 2-bit value is a decision signal indicating whether or not the width of the transition is large, and the lower bit of the 2-bit value is a decision signal indicating a direction of the transition.

Note that, the decision on the direction of the transition is made for determining whether or not the charge sharing is effective by computing the total number of "Transition 1" and "Transition 2". The details of the charge sharing shall be described later.

The other output channels are decided by the decision circuits 12A1_2 to 12A1_L in the same manner, and the decision circuits output the decision signals Q3_2 to Q3_L. As such, it is possible to digitize the amount of generated heat by the transition of the image data for one row. Furthermore, the amount of effect of the charge sharing by the transition of the image data for one row can also be digitized.

FIG. 5 is a timing chart illustrating an example of internal signals of the first heat detecting circuit. More specifically, FIG. 5 is a timing chart from the input of the latch signals Q1_1 to Q1_L and the latch signals Q2_1 to Q2_L, to transfer of signals to the adder circuit 12A2 via the decision circuits 12A1_1 to 12A1_L and the flip-flops 12FF_1 to 12FF_L.

In FIG. 5, L1 to L6 indicate intervals between pulses of the line pulse signal LP, and each indicating a period for each row. The signal LP_C is a signal with an H pulse sufficiently falls within an H period of the line pulse signal LP (one pulse in FIG. 5). The signal CLK12 is a signal which is a logical OR of the dot clock signal DOTCLK and the signal LP_C. The signal LP_S is a signal which rises in response to the rise of the line pulse signal LP, and falls in response to the fall of the signal LP_C.

During the period L1, the latch signals Q1_1 to Q1_L are the image data in row one output from the timing controller 8, and are sequentially loaded, by the driver circuit 61, to the first latch group in the corresponding output channels. Subsequently, when the loading of the image data in the last column (column L) is complete, the first latch group continues to hold the image data in row 1 until the loading of the image data in row 2 in the period L2 starts (timing 51 in FIG. 5).

At a predetermined timing after the second rise of the line pulse signal LP and an appropriate delay time (timing 52 in FIG. 5), the latch signals Q1_1 to Q1_L in the first latch group in the driver circuit 61 are loaded to the second latch group at the same time. Subsequently, the latch signals Q2_1 to Q2_L holds the image data in row 1 until a predetermined timing after an appropriate delay time from the rise of the line pulse signal LP in the period L3 (timing 53 in FIG. 5).

When the timing controller 8 outputs the image data in row 2 as the latch signals Q1_1 to Q1_L, the image data in row 2 is sequentially loaded to the first latch group in the corresponding output channels and held. Subsequently, when the loading of the image data in the last column (column L) is complete, the first latch group continues to hold the image data in row 2 until the loading of the image data in row 3 in the period L3 starts.

At the timing when all of the image data in row 2 is loaded in the first latch group as the latch signals Q1_1 to Q1_L (timing 54 in FIG. 5), the latch signals Q1_1 to Q1_L indicate the image data in row 2, and the latch signals Q2_1 to Q2_L indicate the image data in row 1. Furthermore, at this point, the decision circuits 12A1_1 to 12A1_L output effective decision signals Q3_1 to Q3_L.

The signal LP_S rises in response to the third rise of the line pulse signal LP, a group of multiplexers at a front end of D terminals of the flip-flops 12FF_1 to 12FF_L select the decision signals Q3_1 to Q3_L. Subsequently, the group of multiplexers outputs the selected decision signals Q3_1 to Q3_L to the flip-flops 12FF_1 to 12FF_L, respectively. Subsequently, when the signal LP_C rises (timing 55 in FIG. 5), the flip-flops 12FF_1 to 12FF_L load and hold the decision signals Q3_1 to Q3_L at the same time, and output the decision signals Q4_1 to Q4_L.

Subsequently, the signal LP_S falls in response to the fall of the signal LP_C (timing 56 in FIG. 5), and the group of multiplexers in the front end of the D terminals of the flip-flops 12FF_1 to 12FF_L change the configuration such that all of the flip-flops 12FF_1 to 12FF_L are linked together. To put it differently, the flip-flops 12FF_1 to 12FF_L configure a shift register. Subsequently, shift and output of the decision signal are repeated each time the dot clock signals DOTCLK rise, from the decision signal Q4_1 to the decision signal Q4_L.

The adder circuit 12A2 loads the data streams synchronized to the dot clock signal DOTCLK in the decision signal Q4_1 is loaded each time the dot clock signals DOTCLK rise, and sequentially perform adding.

Next, the overview of the operations by the adder circuit 12A2 shall be described with reference to FIG. 3.

After an initialization at a rise of the frame pulse signal FP, the adder circuit 12A2 keeps adding the data stream for one row in the higher bit of the decision signal Q4_1 until the next rise of the frame pulse signal FP. This means that the amount of heat generated by the transition of image data for one frame is computed by keep adding the amount of heat generated by the transition of the image data for one row. That is, the higher bit of the decision signal Q4_1 corresponds to the higher bits of the decision signals Q3_1 to Q3_L indicating the result of decision made by the decision circuits 12A1_1 to 12A1_L, respectively. In other words, the higher bit of the decision signals Q3_1 to Q3_L indicate that the amount of transition (amount of generated heat) is large. Thus, larger addition result indicates larger amount of generated heat.

The frame generated heat value signal IDC1 output from the adder circuit 12A2 is numeric data of the amount of heat generated by the transition of the image data for one frame. The odd-column frame generated heat signal CSC1_O is numeric data of the amount of heat generated in the odd columns among the amount of heat generated by the transition of the image data for one frame. The even-column frame generated heat signal CSC1_E is numeric data of the amount of heat generated in the even columns among the amount of heat generated by the transition of the image data for one frame. In Embodiment 1, charge sharing is separately performed for positive terminals and negative terminals. Accordingly, separating the odd columns and the even columns allows effective use of the computation result by the first heat detecting circuit 1J1.

At the same time, the data stream of the lower bit of the decision circuit Q4_1 is also calculated as follows. First, no operation is performed on the column with a higher bit of 0, that is, the column determined as having a small amount of generated heat. Regarding the column with a higher bit of 1, that is, the column determined as having a large amount of generated heat, 1 is added when the lower bit is 1 (“Transition 1”), and 1 is subtracted when the lower bit is 0 (“Transition 2”). The adder circuit 12A2 computes this for each row, determines that the charge sharing is effective if the value indicating the computation result is close to 0, and holds “1” in the internal register. The adder circuit 12A2 determines that the effect of the charge sharing is small if the value indicating the computation result is away from 0, and holds “0” in the internal register.

The charge sharing is most effective when there are a same number of columns of image data with opposite transition direction, that is, the number of “Transition 1” and “Transition 2” is identical. The charge sharing is least effective when the transition direction of all of the image data is in the same direction. The adder circuit 12A2 adds, frame by frame, “1” and “0” indicating the result of the computation result for one row. This means that the amount of effect of the charge sharing by the transition of one-frame image data is computed. The charge sharing effect signals CSCE output from the adder circuit 12A2 is numeric data of the amount of effect of the charge sharing by the transition in the image data for one frame. The larger the charge sharing effect value signal CSCE, the more effective charge sharing for the subject frame.

Figure 6:
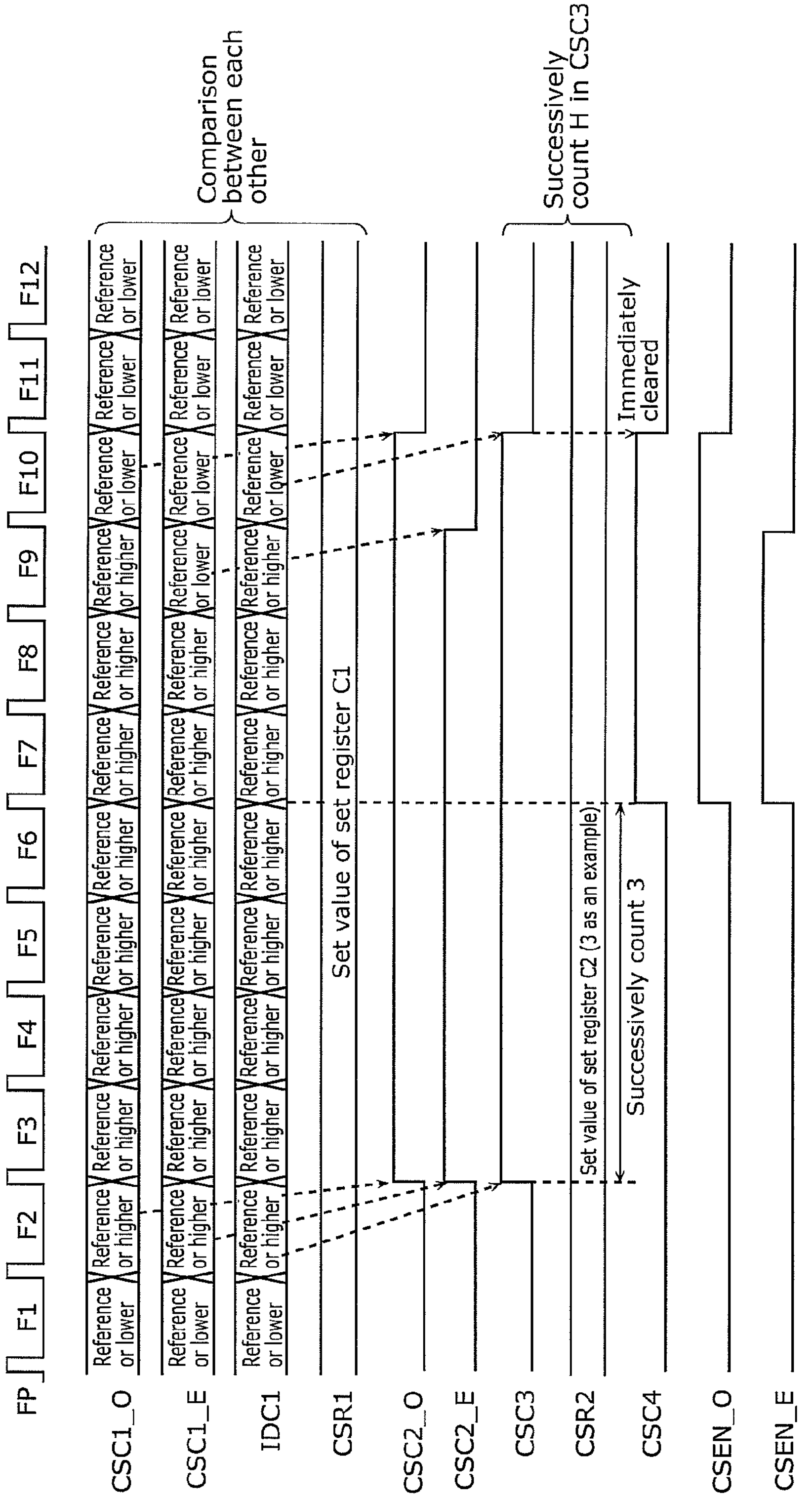
FIG. 6 illustrates an example of timing chart of internal signal for charge sharing by the first heat detecting circuit according to Embodiment 1.

Next, the overview of the operations from the process by the first comparator circuit 12A3 (comparator circuit C1) to the output of the odd-column charge sharing enable signal CSEN_O to the even-column charge sharing enable signal CSEN_E with reference to FIGS. 3 and 6. Here, the change in the display driving method (charge sharing) is controlled as the first step of the heat reduction method.

The set register C1 (first set register 12A5) stores a reference value for the amount of first heat generated by the transition in one frame written by the register set signal REGC1. Subsequently, the set register C1 outputs the first generated heat reference value signal CSR1 to the comparator circuit C1 (first comparator circuit 12A3). The first generated heat reference value signal CSR1 is a signal indicating a reference value for the first generated heat amount. The first generated heat reference value is a threshold for comparing the amount of generated heat, and is one of threshold for determined whether or not to perform charge sharing.

The comparator circuit C1 (first comparator circuit 12A3) compares, frame by frame, a frame heat value signal IDC1, an odd-column frame heat value signal CSC1_O, and an even-column frame heat value signal CSC1_E with the first generated heat reference value signal CSR1 to determine whether these signals are higher or lower than the first generated heat reference value signal. Subsequently, the comparator circuit C1 outputs a frame heat first decision signal CSC3, an odd-column frame heat first decision signal CSC2_O and an even-column frame heat first decision signal CSC2_E. These output signals are H (in high level) if the comparison result exceeds the first heat reference value, and is L (in low level) if the comparison result falls below the first heat reference value.

The set register C2 (second set register 12A6) stores a reference value which is a threshold for determining whether or not the charge sharing is performed written by the register set signal REGC2. More specifically, the reference value is for determining the number of successive frames with H output of the frame heat first decision signal CSC3 for performing the charge sharing operation. In other words, the reference value indicates a threshold of the number of successive frames with H output of the frame heat first decision signal CSC3. In addition, the set register C2 outputs a first successive detection reference value signal CSR2 indicating the reference value to the succession detecting circuit C1 (succession detecting circuit 12A4).

The succession detecting circuit C1 (succession detecting circuit 12A4) detects whether the number of successive frames with H output of the frame heat first decision signal CSC3 is higher or lower than the reference value for successive detection, based on the first succession detecting reference value signal CSR2. The succession detecting circuit C1 subsequently outputs a first succession detecting signal CSC4 indicating the detection result.

A signal which is a logical AND of the first succession detecting signals CSC4 and the odd-column frame heat first decision signal CSC2_O is output to the first heat reduction circuit 2J1 as an odd-column charge sharing enable signal CSEN_O. Furthermore, a signal which is a logical AND of the first succession detecting signal CSC4 and the even-column frame heat first decision signals CSC2_E is output to the first heat reduction circuit 2J1 as the odd-column charge sharing enable signal CSEN_E.

The series of operations aims to prevent, by charge sharing, accumulation of the heat generated for one frame, based on an assumption that continuing succession of frames with values higher than the first succession detecting reference value highly likely indicates the same tendency in the future. The operations also aim to prevent adverse effect of constant charge sharing depending on the type of image data.

For example, charge sharing at the time when the amount of heat generated for one frame remains high (that is, the data transition is high), the charge sharing is less likely to have adverse effects, and is likely to be highly effective. Accordingly, the first heat reduction circuit 2J1 changes the display driving method (charge sharing) as a first step of the heat reduction method only during a period which would be really necessary.

FIG. 6 is an example of timing chart for internal signals related to the charge sharing by the first heat detecting circuit 1J1 according to Embodiment 1. More specifically, FIG. 6 is a timing chart from the process by the adder circuit 12A2, to the output of the odd-column charge sharing enable signal CSEN_O and the even-column charge sharing enable signal CSEN_E.

F1 to F12 indicate frame periods. The frame heat value signal IDC1, the odd-column frame heat value signal CSC1_O and the even-column frame heat value signal CSC1_E are numeric data indicating a result of computation of the amount of generated heat by the transition of the image data for one frame from the adder circuit 12A2. Note that, these signals are actual numbers, however, in FIG. 6, for explanation purpose, they are denoted as "reference or higher" or "reference or lower" as results of determination by the comparator circuit C1 (first comparator circuit 12A3) as to whether the decision reference value is higher or lower than the first generated heat reference value signal CSR1.

In the example illustrated in FIG. 6, all of the signals are "reference or lower" in the period F1, all of the signals are "reference or higher" in the period F2. In response to this, the comparator circuit C1 outputs a frame heat first decision signal CSC3, an odd-column frame heat first decision signal CSC2_O, and an even-column frame heat first decision signal CSC2_E, which are in high level (H).

Here, suppose the value written on the set register C2 (second set register 12A6) by the register set signal REGC2 is 3h. Accordingly, the first succession detecting reference value signal CSR2 indicates 3h.

The succession detecting circuit C1 (succession detecting circuit 12A4) counts the period in which the frame heat first decision signal CSC3 is H for each frame, and detects H three times successively between the period F3 and the period F5. Since the value of the first succession detecting reference value signal CSR2 is 3h, the succession detecting circuit C1 outputs the first succession detecting signal CSC4 in high level in the period F7. At the same time, the AND circuit outputs the odd-column charge sharing enable signal CSEN_O and the even-column charge sharing enable signal CSEN_E, and allows the first heat reduction circuit 2J1 to perform charge sharing.

Furthermore, in the example in FIG. 6, the even-column frame heat value signal CSC1_E is "reference or lower" in the period F9. In response to this, the comparator circuit C1 outputs the even-column frame heat first decision signals CSC2_E in low level (L) in the period F10. Furthermore, at the same time, the AND circuit outputs the even-column charge sharing enable signal CSEN_E in low level, and cancels the permission to the first heat reduction circuit 2J1 for the charge sharing in even rows.

However, the odd-column charge sharing enable signal CSEN_O remains in high level (H). In this state, the amount of heat generated by the transition of the image data for one frame exceeds the first heat reference value, and exceeds the first generated amount of heat reference value in the odd columns, however, falls lower than the first heat reference value only in even columns. This means that the charge sharing only on the odd columns is effective.

In the period F10, the frame heat value signal IDC1 and the even-column frame heat value signal CSC1_E are both "reference or lower". In response to this, the comparator circuit C1 outputs the frame heat first decision signal CSC3 and the even-column frame heat first decision signal CSC2_E, which are in low level in the period F11. Furthermore, at the same time, AND circuit outputs the even-column charge sharing enable signal CSEN_E in low level, and cancels the permission to the first heat reduction circuit 2J1 for the charge sharing in even columns. As such, the first heat detecting circuit 1J1 controls the charge sharing as the first step of the heat reduction method.

Figure 7:
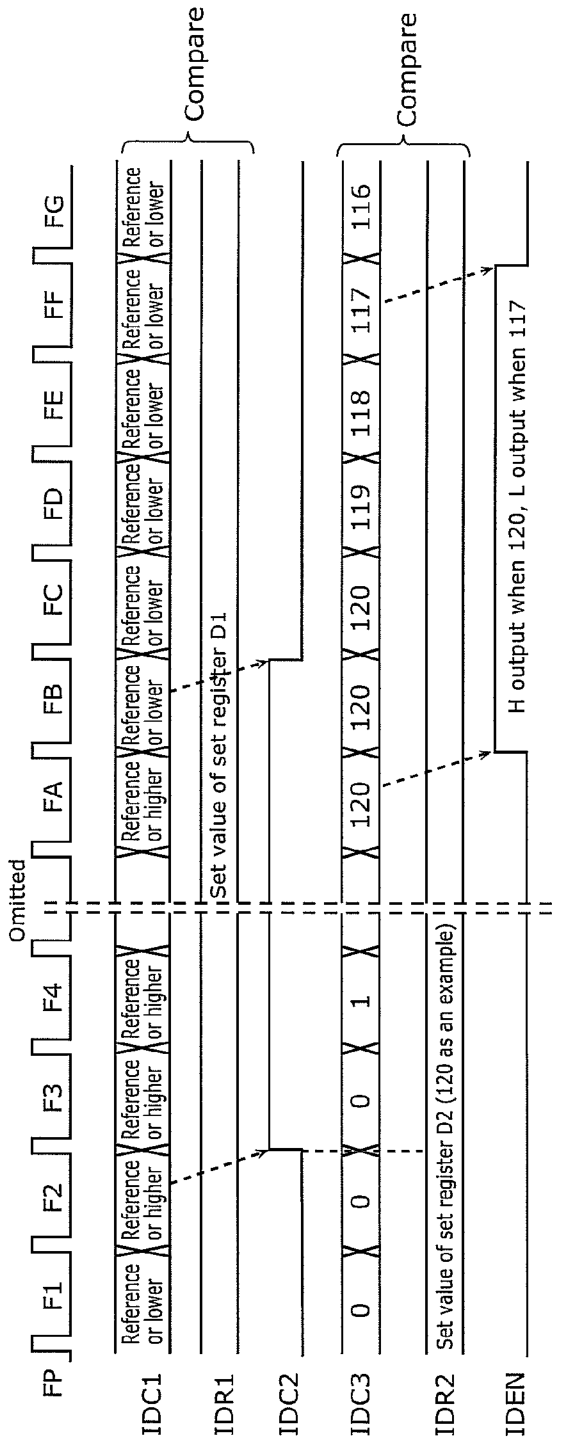
FIG. 7 illustrates an example of timing chart of internal signal for a changing process from the progressive driving by the first heat detecting circuit according to Embodiment 1.

Next, with reference to FIGS. 3 and 7, the overview of the operations from the processing by the second comparator circuit 12A7 to the output of the driving method change enable signal IDEN. Here, as a second step of heat reduction method, control for changing the display driving method (from progressive driving to interlaced driving or frame thinning driving) is performed.

The set register D1 (third set register 12A10) stores a second heat amount reference value generated by the transition of the image data for one frame written by a register set signal REGD1, and a charge sharing effect amount reference value for one frame. Subsequently, the set register D1 outputs the second heat amount reference value signal IDR1 to the comparator circuit D1 (second comparator circuit 12A7).

The second generated heat reference value signal IDR1 is a signal indicating a reference value for the second generated heat amount reference value and a charge sharing effect amount reference value. The second generated heat reference value is a threshold for comparing the amount of generated heat, and is one of thresholds for determining whether or not to change from the progressive driving. Furthermore, the charge sharing effect amount reference value is a threshold for comparing the effect of the charge sharing, and is one of the thresholds for determining whether the driving shall be changed from the progressive driving.

The comparator circuit D1 (second comparator circuit 12A7) compares whether the frame heat value signal IDC1 is higher or lower than the second heat amount reference value for each frame, based on the second generated heat amount reference value signal IDR1. Subsequently, the comparator circuit D1 outputs the frame heat second decision signal IDC2, based on the comparison result. This output signal is H when the comparison result is higher than the second generated heat amount reference value, and is L when the comparison result is lower than the second generated heat amount reference value.

Here, when the first succession detecting signal CSC4 is H and the charge sharing is performed, the comparator circuit D1 compares each frame whether the charge sharing effect value signal CSCE is higher or lower than the charge sharing effect amount reference value, based on the second heat reference value signal IDR1. When the charge sharing effect value signal CSCE is higher, the comparator circuit D1 cancels the H output of the frame heat second decision signals IDC2 and causes an L output, even if the frame heat value signal IDC1 is higher than the second heat amount reference value. This is because the amount of generated heat in the frame heat value signal IDC1 is calculated by only the image data, and does not reflect the effect of reduction by the charge sharing.

The counter D2 (counter 12A8) is an up/down counter, and adds 1h when the frame heat second decision signal IDC2 is H, and subtracts 1h when the frame heat second decision signal IDC2 is L, for each frame. Subsequently, the counter D2 outputs a frame heat second computing signal IDC3 indicating the counter value to the comparator circuit D2 (third comparator circuit 12A9). The maximum value of the frame heat second computing signal IDC3 is equal to a second generated heat amount time-series reference value signal IDR2, and no overflow or underflow occurs.

The set register D2 (fourth set register 12A11) stores the generated heat amount reference value in second time-series written by the register setting signal REGD2. Subsequently, the set register D2 outputs the second generated heat amount time-series reference value signal IDR2 to the counter D2 (counter 12A8) and the comparator circuit D2 (third comparator circuit 12A9). The second generated heat amount time-series reference value signal IDR2 is a signal indicating a generated heat amount reference value in second time-series. The second time-series generated heat amount is a threshold for comparing the amount of heat generated for each frame, and is one of the thresholds for determining whether or not the change from the progressive driving is performed.

The comparator circuit D2 (third comparator circuit 12A9) compares whether the frame heat second computing signal IDC3 is higher or lower than the generated heat amount reference value in second time-series, based on the second generated heat amount time-series reference value signal IDR2. Subsequently, the comparator circuit D2 outputs the driving method change enable signal IDEN, based on the comparison result. The output signals is H when the comparison result is equal to the generated heat amount reference value in the second time-series, and is L when the value is lower than a predetermined value which is lower than the generated heat amount reference value in the second time-series.

The series of operations indicates that frames with a value higher than the second generated heat amount reference value continuously in time-series, detects generated heat by deciding whether the value is higher or lower than the heat amount reference value in second time-series, and determines the change in the display driving method (from progressive driving to interlaced driving or to frame thinning driving). The reason why the value has to be lower than a predetermined value lower than a generated heat amount reference value in second time-series, upon disabling the driving method change enable signal IDEN is because disabling is performed after confirming a tendency that the accumulation of image data with small generated heat amount lowers the temperature of the source driver 6J1 in the meantime. As such, the first heat detecting circuit 1J1 changes the display driving method (from progressive driving to interlaced driving or frame thinning driving) as a second step of the heat reduction method only during a period when it is really necessary.

FIG. 7 is an example of timing chart for internal signals related to the change from the progressive driving in the first heat detecting circuit 1J1 according to Embodiment 1. More specifically, FIG. 7 is a timing chart from the process by the adder circuit 12A2 to the output of the driving method change enable signals IDEN.

Each of F1 to FG indicates a frame period, and for explanation purpose, F5 to a frame before FA are omitted. The frame heat value signal IDC1 is a numeric data indicating a result of computation of the amount of heat generated by a transition of image data for one frame from the adder circuit 12A2. This signal actually is a value. However, in FIG. 7, for explanation purpose, the signal is referred to as "reference or higher" or "reference or lower", as a result of decision whether the value is higher or lower than the decision reference value, based on the second generated heat reference signal IDR1 by the comparator circuit D1 (second comparator circuit 12A7).

In the example illustrated in FIG. 7, the signal is "reference or lower" in the period F1, and the signal is "reference or higher" in the period F2. In response to this, the comparator circuit D1 outputs frame heat second decision signals IDC2 in high level (H) in the period F3.

Suppose a value written on the set register D2 (fourth set register 12A11) by the register setting signal REGD2 is 120d.

Accordingly, the second generated heat amount time-series reference value signal IDR2 is 120d.

The counter D2 (counter 12A8) starts counting addition from the period F3 and keeps counting until the period FA when the frame heat second computing signal IDC3 is 120d. Here, since the second generated heat amount time-series reference value signal IDR2 is 120d, the counter D2 stops counting and holds the value. In response to this, the comparator circuit D2 outputs the driving method change enable signal IDEN in high level in the period FB, and allows the change in the display driving method (from progressive driving to interlaced driving or frame thinning driving).

In addition, in the period FB, the frame heat value signal IDC1 is "reference or lower". In response to this, the comparator circuit D1 outputs the frame heat second decision signal IDC2 in low level (L) in the period FC. The counter D2 (counter 12A8) continues subtracting counts from the period FC.

Here, when disabling the driving method change enable signal IDEN, the value has to be lower than a predetermined value which is lower than the generated heat amount reference value in the second time-series. Here, the value is 117d, for example. In the period FF, the frame heat second computing signal IDC3 is 117, and in response to this, the comparator circuit D2 outputs the driving method change enable signal IDEN in low level in the period FG, and cancels the permission for changing the display driving method (from progressive driving to interlaced driving or frame thinning driving). As such, the first heat detecting circuit 1J1 controls the change in the display driving method (from progressive driving to interlaced driving or frame thinning driving).

Detailed Description of First Heat Reduction Circuit 2J1

Figure 8:
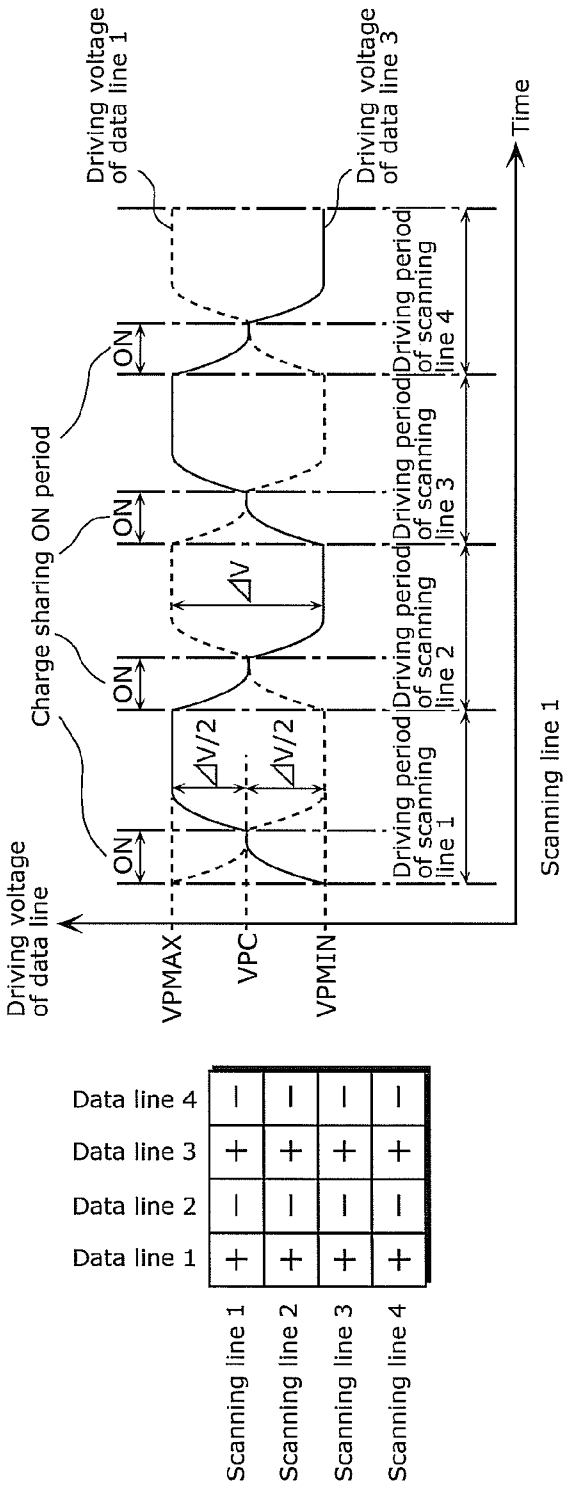
FIG. 8 is a diagram for illustrating principles of charge sharing according to Embodiment 1.
Figure 9:
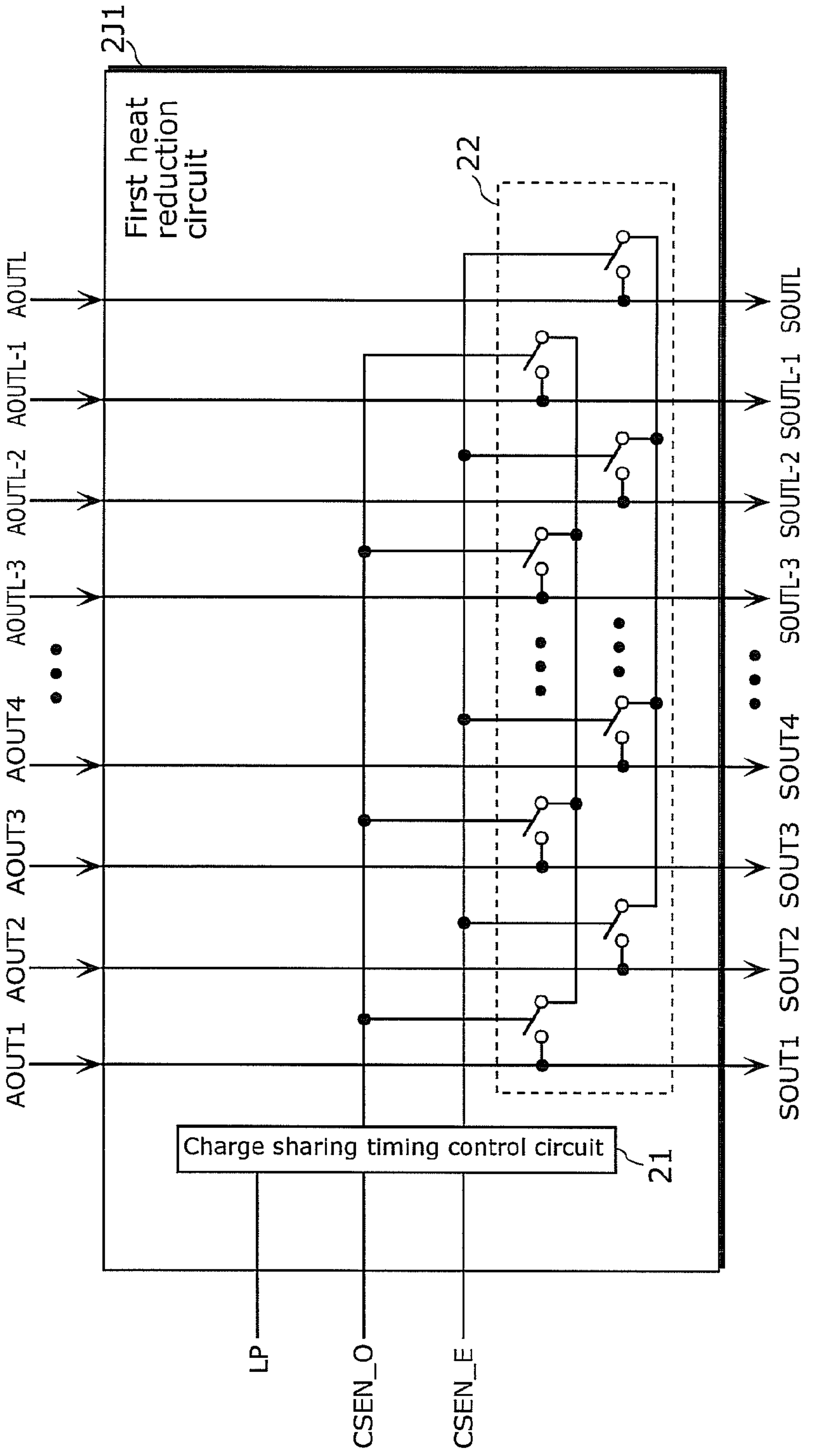
FIG. 9 illustrates a schematic configuration of a first heat reduction circuit according to Embodiment 1.

With reference to FIGS. 8 and 9, the operation of the first heat reduction circuit 2J1 shall be described in further detail. FIG. 8 illustrates a principle of the charge sharing according to Embodiment 1.

In FIG. 8, a display apparatus with 16 pixels, that is, 4 horizontal pixels×4 vertical pixels is used as an example, and charge sharing is performed for each row. The display apparatus includes data lines 1 to 4 and scanning lines 1 to 4. In FIG. 8, pixels in which the data line 1 and the data line 3 and the scanning lines intersect are denoted as "+", indicating that the pixels are driven by a positive voltage. Pixels in which the data line 2 and the data line 4 and the scanning lines intersect are denoted as "−", indicating that the pixels are driven by a negative voltage In Embodiment 1, the charge sharing is performed by short-circuiting data lines with positive voltages and data lines with negative voltages. More specifically, the source driver 6J1 performs charge sharing by short-circuiting at least one of (i) the odd-columns or (ii) the even-columns when the heat detection signal is received.

Note that, short-circuiting the positive data lines and the negative data lines with different voltage levels (indicated by the ranges of positive data and negative data in FIG. 4) allows charge-sharing at a voltage in the middle regardless of the displayed data. This makes wasteful the charge sharing period determined as having effective charge sharing based on the computation result by the first heat detecting circuit 1J1 from the display data.

The waveform chart in FIG. 8 illustrates "time-data line driving voltage" relationship in the data line 1 and the data line 3. The horizontal axis indicates time, and the scanning-line 1 driving period is a period when the scanning line 1 is ON and driving pixels at positions where the data lines 1 to 4 intersect the scanning line 1. The same operations are sequentially performed in the scanning-line 2 driving period to the scanning-line 4 driving period. The vertical axis is a driving voltage driving the data lines.

Each of the data line 1 and the data line 3 alternates between the maximum driving voltage value VPMAX and the minimum driving voltage value VPMIN in each tone opposite to each other. Here, it is assumed that VPMAX−VPMIN=ΔV. FIG. 8 also indicates an example of display data with highest generated heat amount from the driver circuit driving the source lines.

In the scanning-line 1 driving period, the data line 1 drives the minimum driving voltage value VPMIN, and the data line 3 drives the maximum driving voltage value VPMAX. Subsequently, in the charge-sharing ON period in the scanning-line 2 driving period, the data lines are not driven, and the data line 1 and the data line 3 are short-circuited. As such, the voltages converge at the middle voltage value VPC by re-using the charges.

Subsequently, the short-circuit is released when the charge-sharing ON period ends, and subsequently the data lines are driving again. With this, the data line 1 is driven from the middle voltage value VPC to the maximum driving voltage value VPMAX of the tone, and the data line 3 is driven from the middle voltage value VPC to the minimum driving voltage value VPMIN of the tone. More specifically, in the data line 1 and the data line 3, the voltage difference of ΔV/2 is driven in the scanning-line 2 driving period.

Here, when no charge sharing is performed, the data line 1 and the data line 3 are respectively driven by the voltage difference of ΔV, and has the amount of generated heat twice as much as the case when the charge sharing is performed. As such, performing charge sharing on the image data in this example is effective for reducing the amount of generated heat.

FIG. 9 illustrates an example of schematic configuration of the first heat reduction circuit 2J1 according to Embodiment 1. As illustrated in FIG. 9, the first heat reduction circuit 2J1 includes a charge sharing timing control circuit 21 and a charge sharing switching unit 22.

Furthermore, the first heat reduction circuit 2J1 receives input of the odd-column charge sharing enable signal CSEN_O, the even-column charge sharing enable signal CSEN_E, the line pulse signal LP, and the data line driving signal AOUT1 to AOUTL. The odd-column charge sharing enable signals CSEN_O and the even-column charge sharing enable signals CSEN_e are signal controlled for each frame, as illustrated in FIG. 6. Accordingly, the charge sharing timing control circuit 21 controls timing for charge sharing, that is, the charge sharing ON period such that the charge sharing is ON only in the charge sharing ON period illustrated in FIG. 8. For example, in the charge sharing ON period, a sufficient period for falls into the middle voltage value VPC is set for each row.

More specifically, the charge sharing timing control circuit 21 outputs the switching control signal for controlling ON/OFF of the switch included in the charge sharing switching unit 22. That is, the charge sharing timing control circuit 21 outputs a switch control signal for turning ON the switch in odd columns when the odd-column charge sharing enable signal CSEN_O is in high level. Furthermore, the charge sharing timing control circuit 21 outputs a switch control signal for turning ON the switches in the even columns when the even-column charge sharing enable signal CSEN_E is in high level. The charge sharing timing control circuit 21 controls a period during which the switch is ON (that is the charge sharing ON period) for each row, based on the line pulse signal.

The charge sharing switching unit 22 short-circuits odd columns of the data line driving signals AOUT1, AOUT3, AOUT5 . . . , AOUTL−1, and short-circuits even columns of the data line driving signals AOUT2, AOUT4, AOUT6 . . . , AOUTL, with the timing based on the switch control signal output by the charge sharing timing control circuit 21. In the charge sharing OFF period, the data line driving signals AOUT1 to AOUTL are output as the data line driving signals SOUT1 to SOUTL without any modification, driving the display unit 5.

As described above, when receiving the odd-column charge sharing enable signal CSEN_O and the even-column charge sharing enable signal CSEN_E as the heat detection signal, the source driver 6J1 can change from a driving method without charge sharing to a driving method with charge sharing.

Description of Overall Operation of Change in Display Driving Method as the Second Step of Heat Reduction Method Based on the above-described description, overall operations of the change in the display driving method which is a second step of the heat reduction method including the driver circuit 61 and the driver circuit 71 shall be described with reference to FIGS. 10 to 14.

Figure 10:
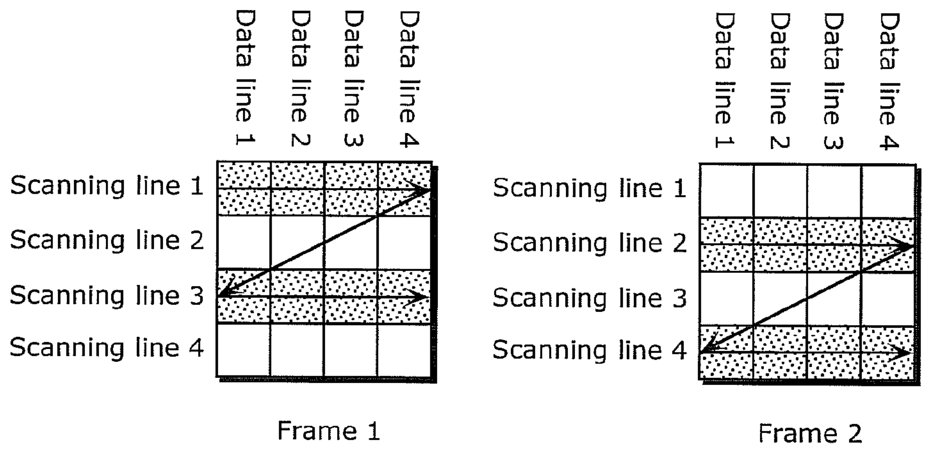
FIG. 10 illustrates principles of interlaced driving according to Embodiment 1.

FIG. 10 is a diagram illustrating a principle of the interlaced driving according to Embodiment 1. In FIG. 10, a display apparatus with 16 pixels, that is, 4 horizontal pixels×4 vertical pixels is used as an example. This display apparatus includes the data lines 1 to 4 and the scanning lines 1 to 4.

The frame 1 sequentially scans only the scanning line 1 and the scanning line 3 in the order of the arrows, that is, only driving the scanning lines in the odd rows, without driving the scanning lines in the even rows. The frame 2 sequentially scans only the scanning line 2 and the scanning line 4 in the order of the arrows, that is, only driving the scanning lines in the even rows, without driving the scanning lines in the odd rows.

Subsequently, the driving as in the frame 1 is performed in the odd-frames, and the driving as in the frame 2 is performed in the even-frames. As such, the driving method thinning the scanning lines to be driven in one frame is referred to as the interlaced driving. In this example, the number of driving each data line per frame is reduced to half. More specifically, by changing the progressive driving to the interlaced driving reduces the amount of generated heat approximately into half. Therefore, it is tremendously effective for reducing the amount of generated heat.

Figure 11:
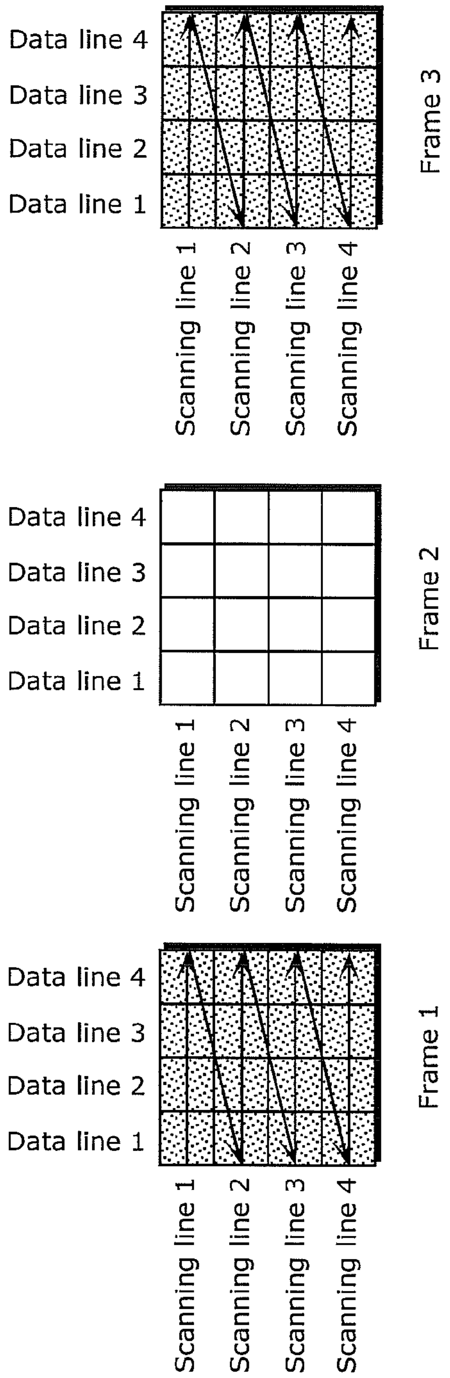
FIG. 11 illustrates principles of frame thinning driving according to Embodiment 1.

FIG. 11 illustrates the principle of the frame thinning driving according to Embodiment 1. In the same manner as FIG. 10, a display apparatus with 16 pixels, that is, 4 horizontal pixels×4 vertical pixels is used as an example. This display apparatus includes the data lines 1 to 4 and the scanning lines 1 to 4.

In the frame 1, all of the scanning lines 1 to 4 are driven. This operation is identical to that of progressive driving before switching the display driving method. In contrast, no line is driven in the frame 2. Subsequently, in the frame 3, all of the scanning 1 to 4 are driving in the same manner as the frame 1.

Subsequently, the driving as in the frame 1 is performed in the odd-frames, and the driving as in the frame 2 is performed in the even-frames. The driving method thinning the frames as described above is referred to as frame thinning driving. In this example, the number of driving each data line per frame is half. More specifically, by changing the progressive driving to the frame thinning driving reduces the amount of generated heat into half. Therefore, it is tremendously effective for reducing the amount of generated heat.

Note that, in the example illustrated in FIG. 11, one frame for every two frames is thinned in the frame thinning driving. However, the frames may be thinned for one in every three frames, one in every four frames, or two in every three frames. In other words, the frame thinning rate is not limited to the example described above.

Figure 12:
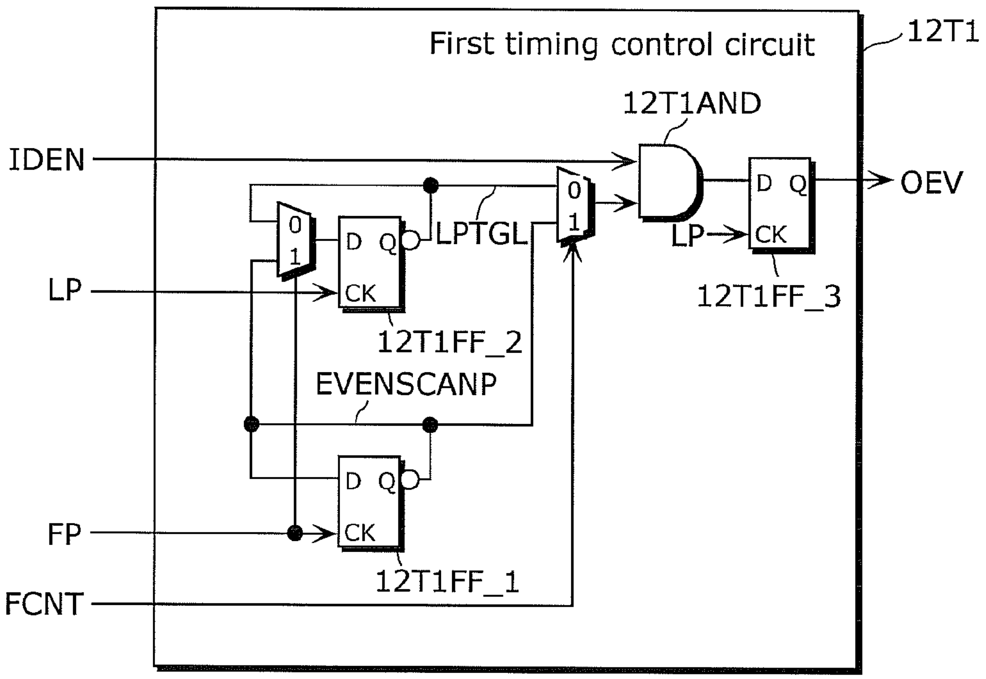
FIG. 12 illustrates a schematic configuration of a first timing control circuit according to Embodiment 1.

Here, before the description for FIG. 12, the overview of the gate driver 7J1 and the driver circuit 71 shall be given.

Driver Circuit 71

The gate driver 7J1 includes a driver circuit 71 with K (K is a natural number) output channels. Note that, K is the number of pixel rows arranged in a matrix in the display unit 5, and is the number of scanning lines.

In response to the timing signal from the timing controller 8, the driver circuit 71 outputs the scanning line driving signals GOUT1 to GOUTK to the display unit 5. In response to the output enable signal OEV from the first heat detecting circuit 1J1, the driver circuit 71 controls update of the scanning line driving signals GOUT1 to GOUTK for each row. Here, the output enable signal OEV is L active, and the scanning line driving signals GOUT1 to GOUTK are updated only when OEV is L (that is when the OEV is in low level).

FIG. 12 illustrates an example of the schematic configuration of the first timing control circuit 12T1. The first timing control circuit 12T1 receives input of the frame pulse signal FP, a line pulse signal LP, a selection signal FCNT, and a driving method change enable signal IDEN from outside. Furthermore, the first timing control circuit 12T1 includes flip-flops 12T1FF_1 to 12T1FF_3 and the logical AND circuit 12T1AND. Furthermore, multiplexers are provided in the stage before D terminals of the flip-flops 12T1FF_1 and 12T1FF_2.

The flip-flop 12T1FF_1 toggles for each pulse of the frame pulse signal FP to output the frame toggle signal EVENSCANP. Note that, it is assumed that the flip-flop 12T1FF_1 is appropriately initialized.

The flip-flop 12T1FF_2 toggles for each pulse of the line pulse signal LP to output the line toggle signal LPTGL. However, in a period when the frame pulse signal FP is H (when frame starts), the multiplexer at the early stage of the D terminal selects the frame toggle signal EVENSCANP, and the flip-flop 12T1FF_2 is initialized when the frame starts.

When the selection signal FCNT is L, the first timing control circuit 12T1 outputs, to the driver circuit 61 and the driver circuit 71, the output enable signal OEV with a timing synchronized to the interlaced driving. The D terminal of the flip-flop 12T1FF_3 receives an input of a logical AND of the driving method change enable signal IDEN and the line toggle signal LPTGL. Thus, the output enable signal OEV is toggled on a row basis Furthermore, when the selection signal FCNT is H, the first timing control circuit 12T1 outputs the output enable signal OEV to the driver circuit 61 and the driver circuit 71 with the timing synchronized with the frame thinning driving. The D terminal of the flip-flop 12T1FF_3 receives input of a logical AND of the driving method change enable signal IDEN and the frame toggle signals EVENSCANP. Thus, the output enable signal OEV is toggled for each frame.

However, in either case, when the driving method change enable signal IDEN is L, the output enable signal OEV is always L since it is masked by the logical AND (logical AND circuit 12T1AND). With this, the driver circuits 61 and 71 are always in output enabled state, and do not change the display driving method as the second step of the heat reduction method.

Figure 13:
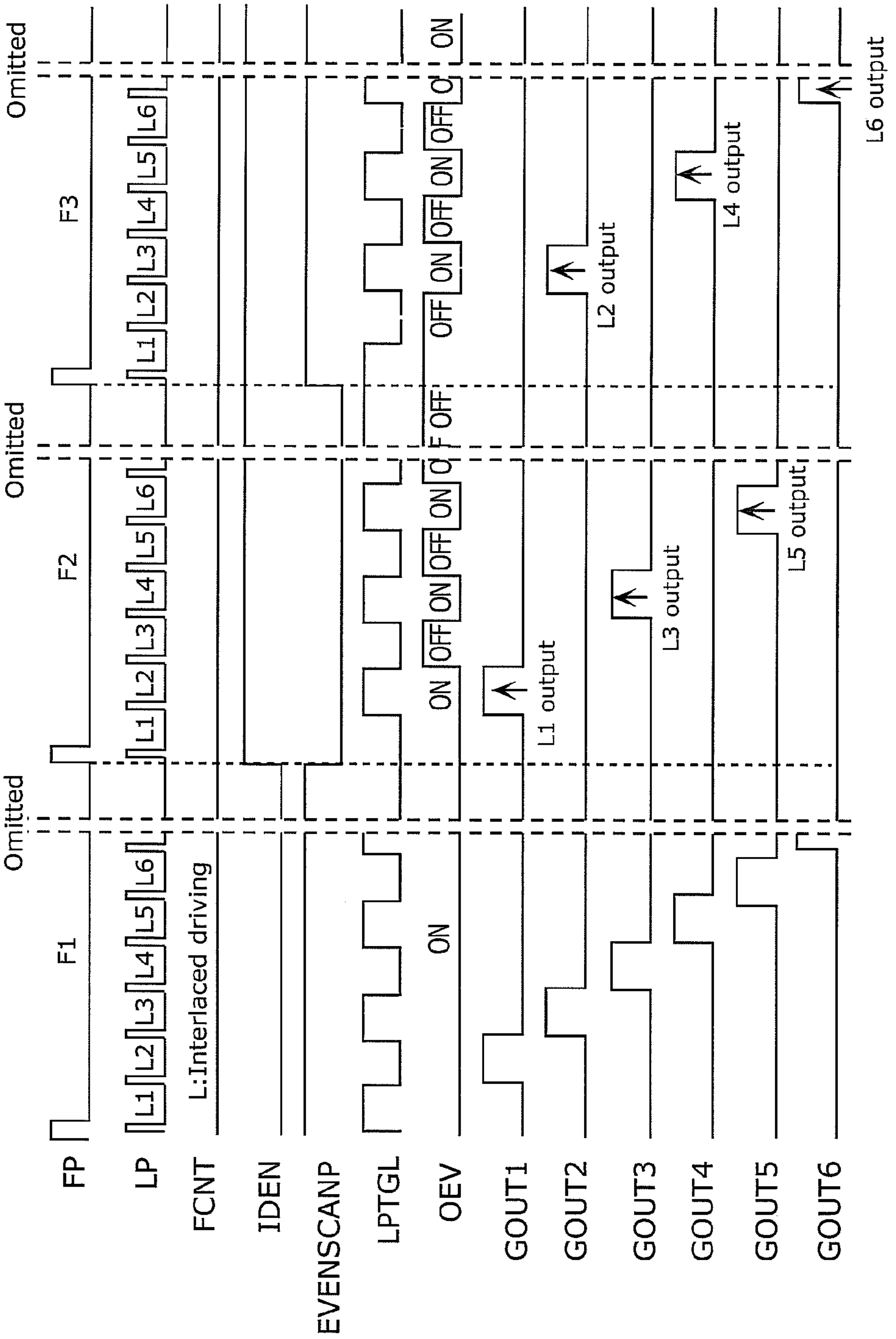
FIG. 13 is an example of a timing chart for an interlaced driving according to Embodiment 1.

FIG. 13 is an example of the timing chart for the interlaced driving according to Embodiment 1.

F1 to F3 each indicates a frame period, and L1 to L6 each indicates a period for one row. Here, the scanning line driving signals GOUT1 to GOUT6 are outputs from the driver circuit 71 in the gate driver 7J1, and are scanning line driving signals for driving the scanning lines 1 to 6. In periods when the scanning line driving signals GOUT1 to GOUT6 are H, the driver circuit 61 in the source driver 6J1 can update the pixels in the corresponding rows of the display unit 5.

The frame toggle signals EVENSCANP is toggled for each frame, and is H in the periods F1 and F3, and is L in the period F2. When the frame pulse signal FP is H, the line toggle signal LPTGL is initialized to L when the frame toggle signal EVENSCANP is L when the frame toggle signal EVENSCANP is L, and is initialized to H when the frame toggle signals EVENSCANP is H. Subsequently, the line toggle signal LPTGL toggles for each row until the next frame pulse signal is in H.

Note that, in the example illustrated in FIG. 13, the selection signal FCNT is L. Thus, the first timing control circuit 12T1 outputs the output enable signal OEV such that the interlaced driving is implemented.

In the period F1, the driving method change enable signal IDEN is L, and is masked by the logical AND circuit 12T1AND in FIG. 12. Accordingly, the output enable signal OEV is in low level (L). When the output enable signal OEV is L, the driver circuit 61 and the driver circuit 71 are in output enabled state, and thus performs progressive driving as usual. In other words, the display driving method is not changed.

In the period F2, the driving method change enable signal IDEN is H, and the D terminal of the flip-flop 12T1FF_3 receives an input of the signals in the same logic as the line toggle signal LPTGL. The timing for the output enable signal OEV which is an output of the flip-flop 12T1FF_3 is one row after the line toggle signal LPTGL. The timing control is performed such that the image data in row 1 loaded in the period L1 is output from the driver circuit 61 in the period L2.

Accordingly, the output enable signal OEV in the period L2 is L (output enabled state), and the image data for row 1 is output as the data signal driving signals AOUT_1 to AOUT_L which are output from this timing. Furthermore, the scanning line driving signal GOUT which is an output of the driver circuit 71 corresponding to the image data in row 1 is H, and the pixels in row 1 of the display unit 5 are updated.

The output enable signal OEV in the period L3 is H (output disabled state), and the image data for row 2 is not output as the data line driving signals AOUT_1 to AOUT_L which are output from the driver circuit 61 with this timing. Furthermore, the scanning line driving signal GOUT2 which is an output of the driver circuit 71 corresponding to the image data in row 2 is also L, and the pixels in row 2 of the display unit 5 are not updated.

The output enable signal OEV is L in the period L4 (output enabled state), and the image data in row 3 is output as the data line driving signals AOUT_1 to AOUT_L which are output of the driver circuit 61 with this timing. Furthermore, the scanning line driving signal GOUT3 which is an output of the driver circuit 71 corresponding to the image data in row 3 is H, and the pixels in row 3 of the display unit 5 are updated.

Since the same operation is performed in L5 and afterwards, the driver circuit 61, the driver circuit 71 both drives only the odd scanning lines in the period F2.

In the period F3, the driving method change enable signal IDEN is H, and the D terminal of the flip-flop 12T1FF_3 receives an input of the signals in the same logic as the line toggle signal LPTGL. The timing for the output enable signal OEV which is an output of the flip-flop 12T1FF_3 is one row after the line toggle signal LPTGL. The timing control is performed such that the image data in row 1 loaded in the period L1 is output from the driver circuit 61 in the period L2.

Accordingly, the output enable signal OEV in the period L2 is H (output disabled state), and the image data in row 1 is not output as the data line driving signals AOUT_1 to AOUT_L which are outputs of the driver circuit 61 with this timing. Furthermore, the scanning line driving signal GOUT1 which is an output of the driver circuit 71 corresponding to the image data in row 1 is also L, and the pixels in row 1 of the display unit 5 are not updated.

The output enable signal OEV is L in the period L3 (output enabled state), and the image data in row 2 is output as the data line driving signals AOUT_1 to AOUT_L which are output of the driver circuit 61 with this timing. Furthermore, the scanning line driving signal GOUT2 which is an output of the driver circuit 71 corresponding to the image data in row 2 is H, and the pixels in row 2 of the display unit 5 are updated.

The output enable signal OEV in the period L4 is H (output disabled state), and the image data for row 3 is not output as the data line driving signals AOUT_1 to AOUT_L which are output from the driver circuit 61 with this timing. Furthermore, the scanning line driving signal GOUT3 which is an output of the driver circuit 71 corresponding to the image data in row 3 is also L, and the pixels in row 3 of the display unit 5 are not updated.

Since the same operation is performed in L5 and afterwards, the driver circuit 61, the driver circuit 71 both drive only the even scanning lines in the period F3.

After the period F4, the operation identical to that of F2 is performed in even frames, and the operation identical to that of F3 is performed in odd frames. As such, the first timing control circuit 12T1 can perform the interlaced driving illustrated in FIG. 10 when the driving method change enable signal IDEN is H and when the change in the display driving method as the second step of the heat reduction method is permitted. As such, the source driver 6J1 and the gate driver 7J1 can change from the progressive driving to the interlaced driving when receiving the output enable signal OEV alternating between high and low for each line.

Figure 14:
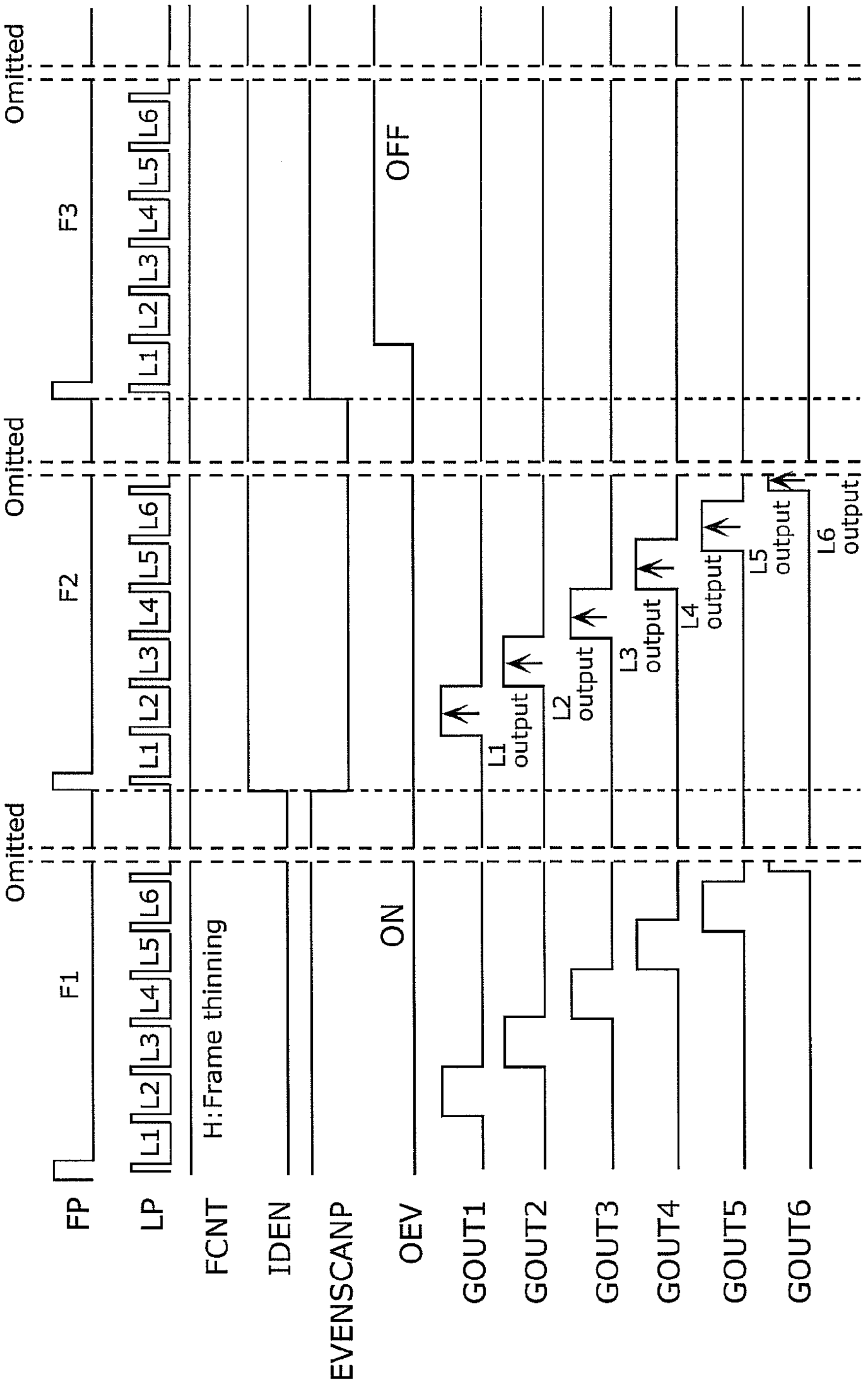
FIG. 14 is an example of a timing chart for frame thinning driving according to Embodiment 1.

FIG. 14 is an example of timing chart for frame thinning driving according to Embodiment 1.

F1 to F3 each indicates a frame period, and L1 to L6 each indicates a period for one row. Here, the scanning line driving signals GOUT1 to GOUT6 are outputs from the driver circuit 71 in the gate driver 7J1, and are scanning line driving signals for driving the scanning lines 1 to 6. In periods when the scanning line driving signals GOUT1 to GOUT6 are H, the driver circuit 61 in the source driver 6J1 can update the pixels in the corresponding rows of the display unit 5.

The frame toggle signals EVENSCANP is toggled for each frame, and is H in the periods F1 and F3, and is L in the period F2.

Note that, in the example illustrated in FIG. 14, the selection signal FCNT is H. Thus, the first timing control circuit 12T1 outputs the output enable signal OEV such that the frame thinning driving is implemented.

In the period F1, the driving method change enable signal IDEN is L, and is masked by the logical AND circuit 12T1AND in FIG. 12. Accordingly, the output enable signal OEV is in low level (L). When the output enable signal OEV is L, the driver circuit 61 and the driver circuit 71 are in output enabled state, and thus perform progressive driving as usual. In other words, the display driving method is not changed.

In the period F2, the driving method change enable signals IDEN is H, and the D terminal of the flip-flop 12T1FF_3 receives an input of a signal of the same logic as the frame toggle signal EVENSCANP. The timing for the output enable signal OEV which is an output of the flip-flop 12T1FF_3 is one row after the frame toggle signal EVENSCANP. The timing control is performed such that the image data in row 1 loaded in the period L1 is output from the driver circuit 61 in the period L2.

Accordingly, the output enable signal OEV in the period after L2 is L (output enabled state), and when the output enable signal OEV is L, the driver circuit 61 and the driver circuit 71 are in the output enabled state. Thus, the progressive driving is performed as usual. In other words, the display driving method is not changed.

In the period F3, the driving method change enable signals IDEN is H, and the D terminal of the flip-flop 12T1FF_3 receives an input of a signal of the same logic as the frame toggle signal EVENSCANP. The timing for the output enable signal OEV which is an output of the flip-flop 12T1FF_3 is one row after the frame toggle signal EVENSCANP. The timing control is performed such that the image data in row 1 loaded in the period L1 is output from the driver circuit 61 in the period L2.

Accordingly, the output enable signal OEV in the period after L2 is H (output disabled state), and when the output enable signal OEV is H, the driver circuit 61 and the driver circuit 71 are in output disabled state. Thus, nothing is driven.

After the period F4, the operation identical to that of F2 is performed in even frames, and the operation identical to that of F3 is performed in odd frames. As described above, the first timing control circuit 12T1 can perform the frame thinning driving illustrated in FIG. 11 when the driving method change enable signal IDEN is H and the change in the display driving method as the second step of the heat reduction method is permitted. As described above, the source driver 6J1 and the gate driver 7J1 can change the driving method from the progressive driving to the frame thinning driving when receiving the output enable signal OEV alternating between high and low for each frame as the heat detection signal.

The first heat detecting circuit 1J1 controls the driver circuit 61 and the driver circuit 71 only when the generated heat amount reference value in the second time-series is exceeded. With this, it is possible to change the display driving method which is a second step of the heat reduction method significantly effective for reducing the amount of generated heat (from progressive driving to interlaced driving or frame thinning driving) to lower the amount of heat generated by the source driver 6J1.

Examples of Setting Method for First and Second Generated Heat Amount Reference Values Here, for calculation purpose, a case in which the source driver 6J1 is heated, up to an unacceptable temperature, in the proximity of the image having the largest amount of generated heat is considered. Here, the display apparatus in FIG. 8 is used as an example.

A horizontal striped image is one of the one-frame images with the largest amount of generated heat. Take the display apparatus of FIG. 8 for example, all of the image data in the source lines corresponding to the scanning line 1 is FFh, all of the image data in the source lines corresponding to the scanning line 2 is 00h, and all of the image data in the source lines corresponding to the scanning line 3 is FFh, and all of the image data in the source lines corresponding to the scanning line 4 is 00h. With a still image of this picture (accumulated frames), the source driver 6J1 has the largest amount of generated heat.

The value of the frame heat value signal IDC1 corresponding to this image for one frame is "16" with 4 columns×4 rows of pixels. Here, as an example, a case in which the temperature of the source driver 6J1 exceeds the acceptable temperature when the value of frame heat value signal IDC1 keep exceeding "14" is assumed for calculation purpose. In this case, the second generated heat amount reference value should be "14".

Thus, the first generated heat amount reference value may be a value optimal for effective charge sharing and for preventing the generated heat amount from increasing toward the second generated heat amount reference value. Here, the first generated heat amount reference value is assumed to be "10". Based on these set values, the charge sharing is performed when the frame heat value signal IDC1 exceeds "10" for a predetermined period, changes the display driving method as the first step of the heat reduction method to reduce the amount of generated heat.

Note that, in this horizontal striped image, charge sharing is not effective. However, the charge sharing is most effective for an image with the largest amount of generated heat, having image data such as: FFh for the image data in the data line 1 and the data line 2 corresponding to the scanning line 1; 00h for the image data in the data line 3 and the data line 4 corresponding to the scanning line 1; 00h for the image data in the data line 1 and the data line 2 corresponding to the scanning line 2; FFh for the image data in the data line 3 and the data line 4 corresponding to the scanning line 2; FFh for the image data in the data line 1 and the data line 2 corresponding to the scanning line 3; 00h for the image data in the data line 3 and the data line 4 corresponding to the scanning line 3; 00h for the image data in the data line 1 and the data line 2 corresponding to the scanning line 4; and FFh for the image data in the data line 3 and the data line 4 corresponding to the scanning line 4. Accordingly, the frame generated heat second decision signal IDC2 remain in L, and the heat is reduced in the calculation of generated heat value in the second time-series. Therefore, the heat does not increase up to the generated heat amount reference value in the second time-series.

When the value of the frame heat value signal IDC1 keeps exceeding "14" for a predetermined period despite the first step of generated heat amount reduction, ultimately, the display driving method is changes as the second step of the heat reduction method.

However, what actually determines the display driving method is not the second generated heat reference value by sporadic image data, but by the generated heat amount reference value in the second time-series determined by the time-series data. With regard to the generated heat amount reference value in the second time-series, it is difficult to determine the value by calculation.

This is because; there is a large effect by the overall configuration of the display apparatus. For example, if the display apparatus is super-thin panel, the heat tends to be trapped in the display apparatus, and there is a possibility that a small generated heat amount reference value in the second time-series is necessary. However, it is extremely difficult to estimate the relationship between the time and increase in temperature here. Accordingly, it is better to determine the generated heat reference value in the second time-series by the specification of the display apparatus.

Figure 15:
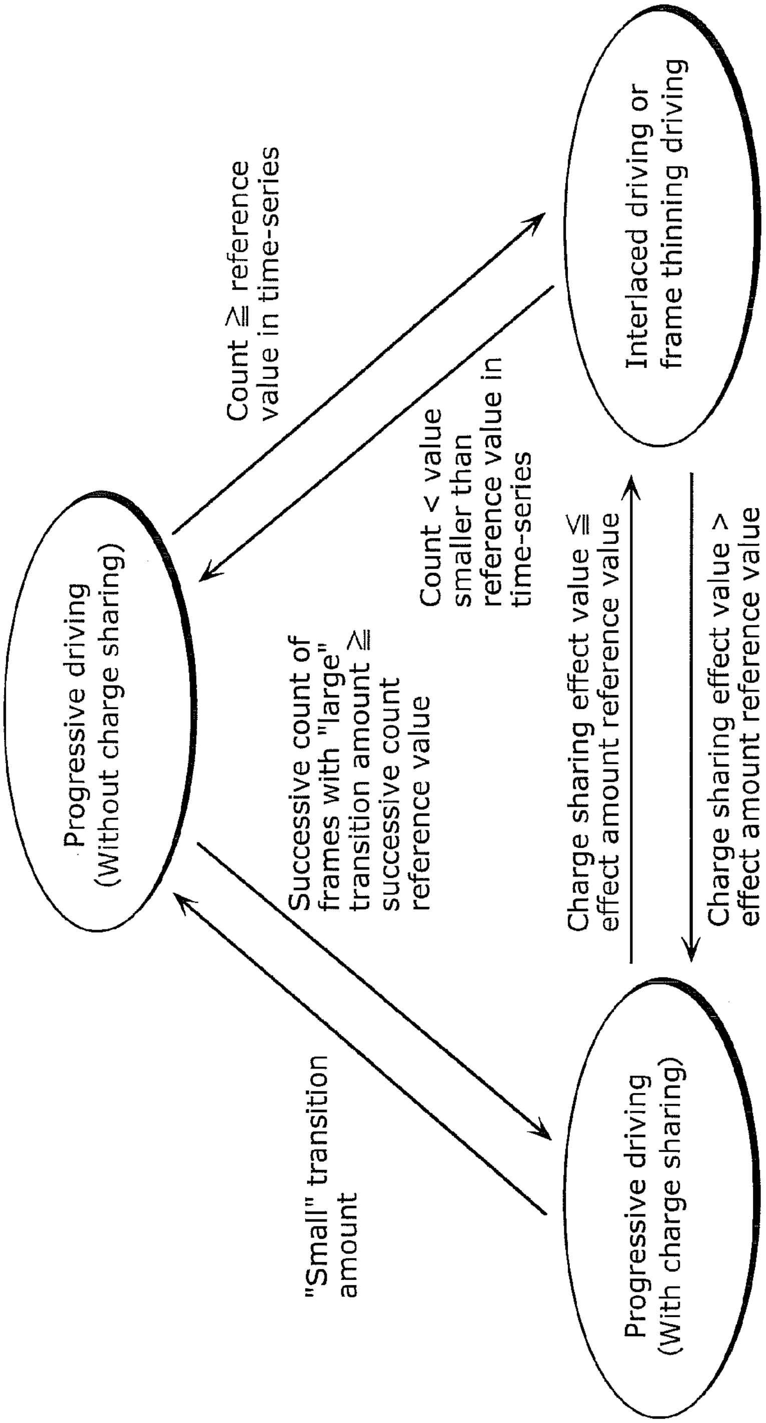
FIG. 15 is an example of a state transitional diagram of display driving method by the display apparatus according to Embodiment 1.

FIG. 15 is an example of a state transitional diagram of display driving method by the display apparatus according to Embodiment 1.

In Embodiment 1, when the display apparatus is driven by the progressive driving without charge sharing (that is, the regular driving method), the driving method is changed to the progressive driving with charge sharing when the number of successive frames with "large" transition amount equal to or more than the successive count reference value. Here, the frame with "large" transition amount refers to a frame with a absolute difference of the first data in row p and the second data in row p+1 is larger than a predetermined first threshold for times equal to or more than a predetermined second threshold.

More specifically, the frame with "large" amount of transition is a frame with the count of "Transition 1" and "Transition 2" in FIG. 4, that is, the frame with the value indicated by the frame heat value signal IDC1 output from the adder circuit 12A2 equal to or higher than the first generated heat amount reference value (an example of the first threshold). When the succession detecting circuit C1 detects that the successive frame count is equal to or higher than the succession reference value (second threshold), the display apparatus performs the charge sharing.

On the other hand, when the charge sharing is performed, the display apparatus changes the driving to the progressive driving without charge sharing when the frame with "small" transition amount is detected. Here, the frame with "small" transition amount refers to a frame with an absolute difference of the first data in row p and the second data in row p+1 is larger than a predetermined first threshold for times equal to or more than a predetermined second threshold. More specifically, when the succession detecting circuit C1 detects the frames with the number of "Transition 1" and "Transition 2" illustrated in FIG. 4, that is, with the value indicated by the frame heat value signal IDC1 smaller than the first generated heat amount reference value, the display apparatus stops charge sharing.

Furthermore, when the count of the counter D2 is equal to or more than the generated heat amount reference value in the second time-series when in the progressive driving without charge sharing, the display apparatus changes the progressive driving to the interlaced driving or the frame thinning driving. In addition, when the display apparatus is driven by the interlaced driving or the frame thinning driving and the count of the counter D2 is smaller than the predetermined value which is smaller than the generated heat amount reference value in the second time-series, the display apparatus changes the driving method to the progressive driving.

Note that, the counter D2 increments the count when the absolute difference of the first data in row p and the second data in row p+1 is equal to or higher than the predetermined first threshold for times equal to or more than a predetermined second threshold. More specifically, the count is incremented when the frames with the count of "Transition 1" and "Transition 2" illustrated in FIG. 4, that is, the value indicated by the frame heat value signal IDC1 equal to or more than the second generated heat amount reference value (an example of the first threshold). Furthermore, the counter D2 decrements the count when the above count is smaller than the second threshold.

Furthermore, when the charge sharing is implemented, and when the charge sharing effect value is equal to or less than the effect amount reference value, the display apparatus changes the driving method to the interlaced driving or the frame thinning driving. More specifically, when the value of the charge sharing effect value signal CSCE output from the adder circuit 12A2 is equal to or less than the charge sharing effect amount reference value indicated by the second generated heat amount reference value signal IDR1, the driving method is changed to the interlaced driving or the frame thinning driving.

Note that, in the example of Embodiment 1, two conditions must be satisfied when the progressive driving with charge sharing is changed to the interlaced driving or the frame thinning driving. More specifically, not just the comparison of the charge sharing effect amount reference value described above, a comparison between the counts of the counter D2 is also performed.

Furthermore, when the display apparatus is driven in the interlaced driving and the frame thinning driving, and the charge sharing effect amount value is larger than the effect amount reference value, the display apparatus changes the driving method to the progressive driving with charge sharing. More specifically, when the value of the charge sharing effect value signal CSCE output from the adder circuit 12A2 is equal to or larger than the charge sharing effect amount reference value indicated by the second generated heat amount reference value signal IDR1, the driving method is changed to the progressive driving with the charge sharing.

Note that, the transition of the driving method illustrated in FIG. 15 is merely an example, and is not limited by the example described above.

Note on Variation of Embodiment 1

In the display apparatus according to Embodiment 1, the first heat detecting circuit 1J1 detects the heat for two steps. However, more detailed control with three or more steps are possible. Furthermore, the order of performing the heat reduction method is not limited to the description described above. In addition, the heat detection may include one step.

In addition, in the display apparatus according to Embodiment 1, two-step operation including the charge sharing and the change from the progressive driving is described as an example of the change in the display driving method for reducing heat. However, the operation may include three or more steps. The operation may also include one step, and may perform only one of the charge sharing and the change from the progressive driving.

Note that the description is made using the display apparatus as an example in Embodiment 1. However, the present invention can also be implemented as a display apparatus driving circuit. For example, the display apparatus driving circuit according to Embodiment 1 includes the source driver 6J1. More specifically, the display apparatus driving circuit according to Embodiment 1 includes a heat detecting circuit 1J1 which detects the amount of heat generated at the source driver 6J1, and outputs a heat detection signal when the detected amount of generated heat is equal to or larger than a predetermined reference value, and a first heat reduction circuit 2J1 which changes the driving method of the display unit 5 to lower the amount of heat generated at the source driver 6J1 when the heat detection signal is received.

Effects of Embodiment 1

As described above, the display apparatus and the display apparatus driving circuit in Embodiment 1 includes a heat detecting circuit which detects the amount of heat generated at the source driver, and determines whether or not the detected amount of generated heat exceeds one or more set reference values. After that, the display apparatus and the display apparatus driving circuit according to Embodiment 1 changes the display driving method to reduce the amount of generated heat according to the level of the detected amount of generated heat, that is, according to the magnitude relationship between the detected amount of generated heat and the reference value.

With this, the display apparatus and the display apparatus driving circuit according to Embodiment 1 can effectively reduce the amount of heat generated at the source driver. Accordingly, instead of determining whether the image is a still image or a moving image, it is possible to detect the image with a large amount of generated heat. Therefore, it is possible to prevent the degradation in the image quality. More specifically, in the still image determined to have small amount of generated heat, the display driving method is not switched. In addition, continuing real-time heat detection allows suppressing the degradation in the image quality as much as possible without unnecessarily switching the display driving method.

Therefore, Embodiment 1 is applicable to a high-quality display panel. Furthermore, since it is possible to suppress the amount of generated heat, it is possible to increase the number of output buffers for one source driver, or a heat radiating sheet is not necessary. As a result, it is possible to reduce the set cost.

Embodiment 2

In Embodiment 2, an example of applying the present invention to a gate driver in which there is no output enabling function (output enable signal OEV unavailable) or the output enabling function is not used for some reason even if it is incorporated. Note that, the components identical to those in Embodiment 1 is assigned with the same reference numerals in Embodiment 1, and the description of those components is omitted.

Figure 16:
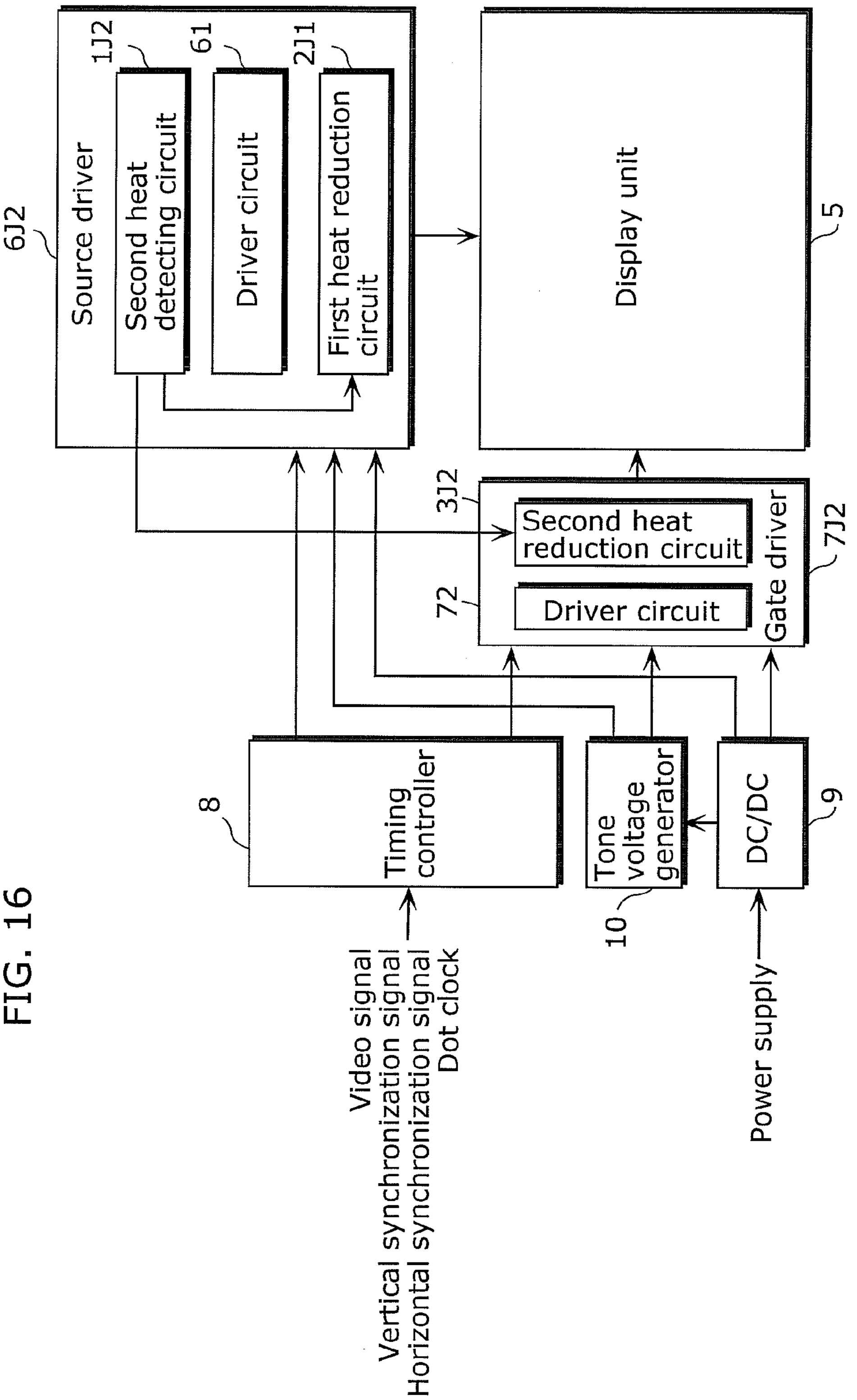
FIG. 16 illustrates an example of block configuration of a display apparatus according to Embodiment 2.

FIG. 16 illustrates an example of block configuration of the display apparatus according to Embodiment 2. The difference from the display apparatus according to Embodiment are that the source driver 6J1 is replaced with the source driver 6J2, and the gate driver 7J1 is replaced with the gate driver 7J2. The gate driver 7J2 here is not limited to a gate driver IC.

Figure 17:
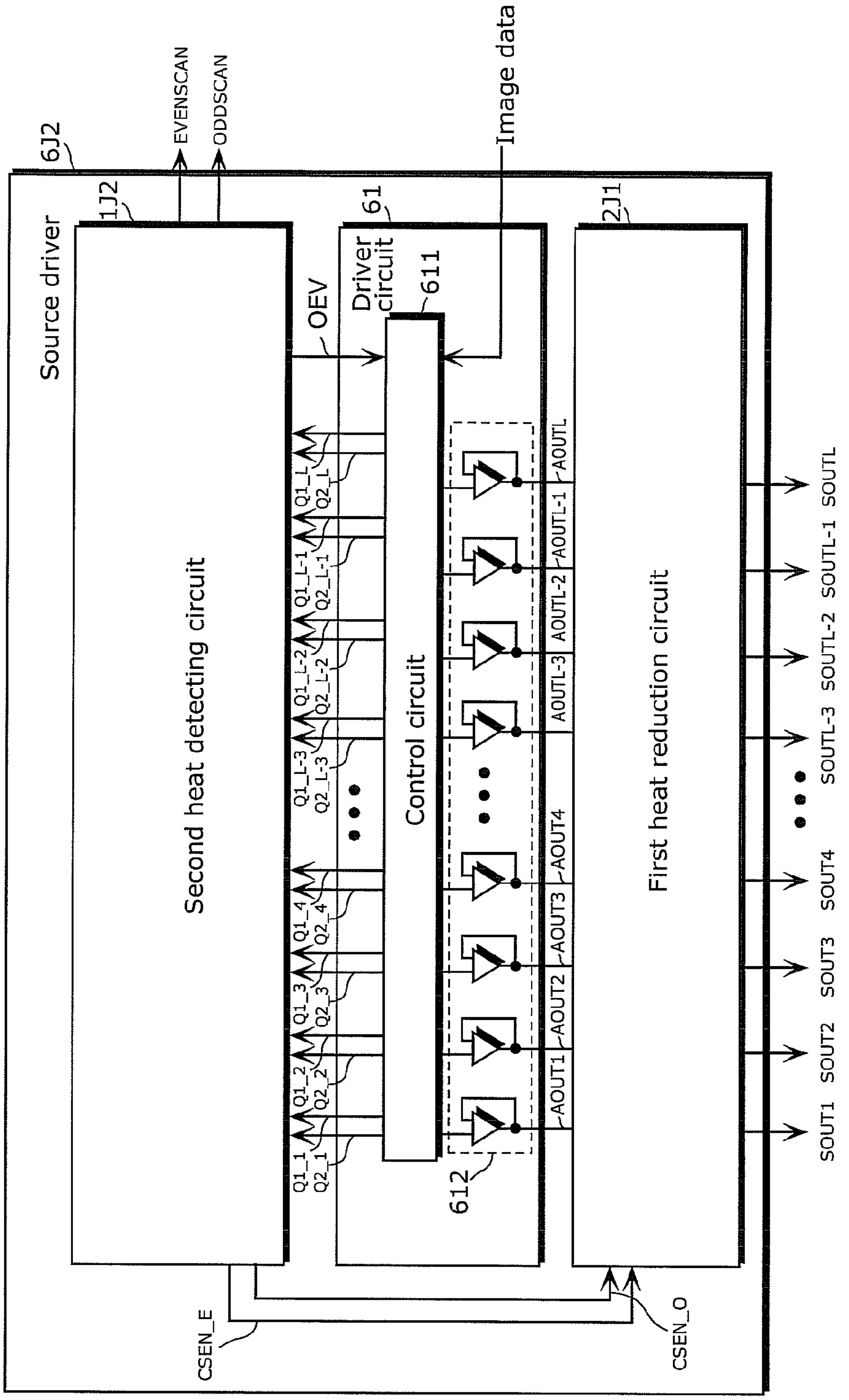
FIG. 17 illustrates an example of schematic configuration of a source driver according to Embodiment 2.

FIG. 17 illustrates a schematic configuration of the source driver 6J2 according to Embodiment 2. The source driver 6J2 includes L output channel, a driver circuit 61, a second heat detecting circuit 1J2, and a first heat reduction circuit 2J1. Note that, in Embodiment 2, L is also the number of columns of pixels arranged in a matrix in the display unit 5; that is, the number of data lines. For description purpose, only signals transmitted and received between the driver circuit 61, the second heat detecting circuit 1J2 and the first heat reduction circuit 2J1, and between the source driver 6J2, the display unit 5, and the gate driver 7J2 are indicated in FIG. 17.

Second Heat Detecting Circuit 1J2

The second heat detecting circuit 1J2 calculates the amount of heat generated at the source driver 6J2 from the latch signals Q1_1 to Q1_L and the latch signals Q2_1 to Q2_L output from the driver circuit 61. Subsequently, when the calculated amount of generated heat is equal to or higher than the predetermined reference value, the second heat detecting circuit 1J2 outputs the heat detection signal.

More specifically, the second heat detecting circuit 1J2 determines whether or not the calculated amount of generated heat exceeds one or more set levels. More specifically, the second heat detecting circuit 1J2 includes one of more set levels which are one or more reference values, and determines whether or not the calculated amount of generated heat exceeds which one of the set levels.

The second heat detecting circuit 1J2 then outputs the heat detection signal according to the set level at which the amount of generated heat exceeds. More specifically, the second heat detecting circuit 1J2 outputs the odd-column charge sharing enable signal CSEN_O and the even-column charge sharing enable signal CSEN_E to the first heat reduction circuit 2J1, outputs the output enable signal OEV to the driver circuit 61, and outputs an odd-row scanning signal ODDSCAN and an even-row scanning signal EVENSCAN to the gate driver 7J2, as the heat detection signals according to the level of the detected amount of generated heat.

Note that, in the same manner as Embodiment 1, the charge sharing is performed as the first step of heat reduction method, and the control for changing the display driving method from the progressive driving to the interlaced driving or the frame thinning driving is performed as the second step of heat reduction method.

Figure 18:
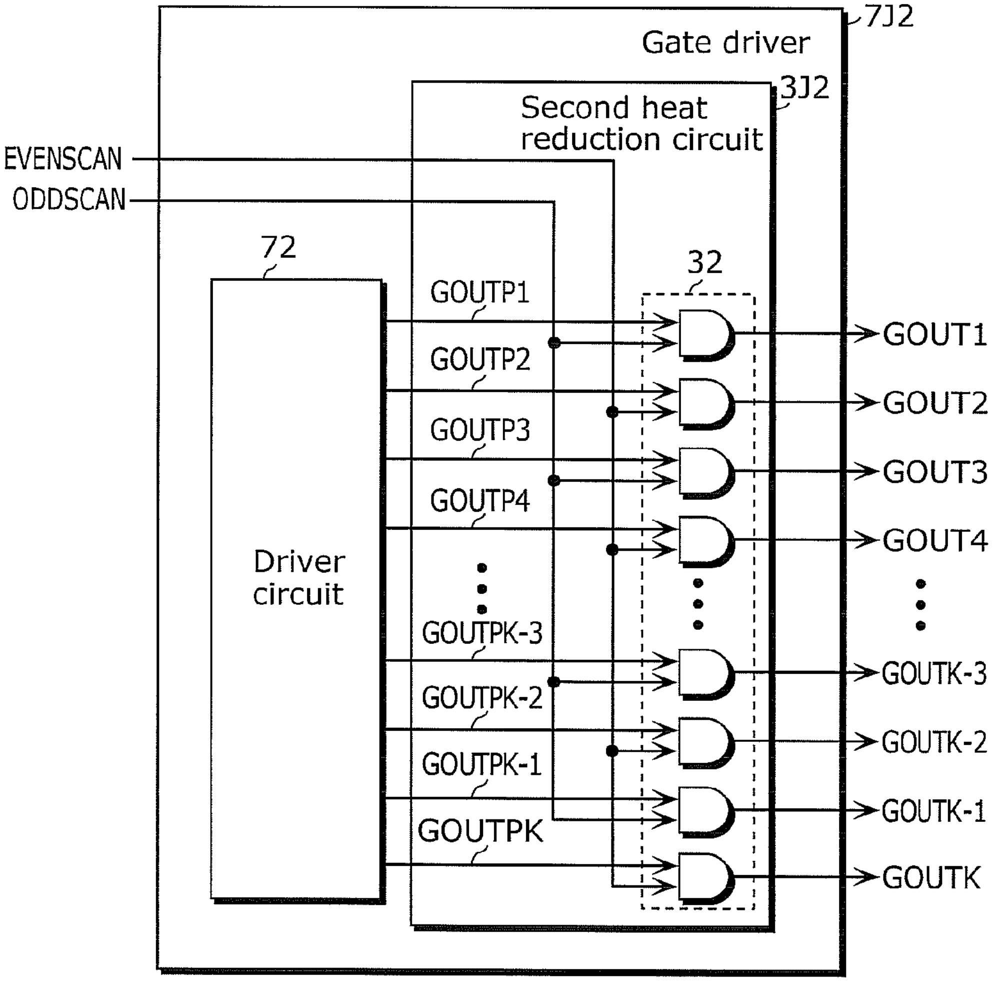
FIG. 18 illustrates an example of schematic configuration of a gate driver according to Embodiment 2.

FIG. 18 illustrates an example of schematic configuration of the gate driver 7J2 according to Embodiment 2. The gate driver 7J2 includes K output channels, a driver circuit 72, and a second heat reduction circuit 3J2. Note that, in Embodiment 2, K is also the number of pixel rows arranged in a matrix in the display unit 5, and is the number of scanning lines.

The driver circuit 72 outputs scanning line driving signals GOUTP1 to GOUTPK to the second heat reduction circuit 3J2 in response to the timing signal from the timing controller 8. Here, it is assumed that the driver circuit 72 does not have the output enabling function.

Note that, the output enabling function allows switching between ON/OFF of the output based on a predetermined signal. More specifically, the driver circuit 71 according to Embodiment 1 has the output enabling function, and can update the scanning line driving signals GOUT1 to GOUTK, based on the output enabling signal input from outside. In contrast, the driver circuit 72 according to Embodiment 2 cannot update the scanning line driving signals GOUT1 to GOUTK, even if the output enabling signal is input.

The second heat reduction circuit 3J2 controls signal masking by using the odd-row scanning signal ODDSCAN and the even-row scanning signal EVENSCAN output from the second heat detecting circuit 1J2 and outputs the scanning line driving signals GOUT1 to GOUTK to the display unit 5. More specifically, the second heat reduction circuit 3J2 is a circuit implementing function equivalent to the output enabling function of the driver circuit 71 in Embodiment 1.

Second Heat Reduction Circuit 3J2

The second heat reduction circuit 3J2 includes a mask unit 32. When the odd-row scanning signal ODDSCAN is L, the second heat reduction circuit 3J2 can set the scanning driving signals GOUT1, GOUT3 . . . , GOUTK−1, that is, the scanning line driving signals in odd rows to low level by the mask performed by the mask unit 32. When the even-row scanning signal EVENSCAN is L, the second heat reduction circuit 3J2 can set the scanning line driving signals GOUT2, GOUT4 . . . , GOUTK, that is, the scanning line driving signals in even rows to low level by the mask performed by the mask unit 32.

Detailed Description of Second Heat Detecting Circuit 1J2

Figure 19:
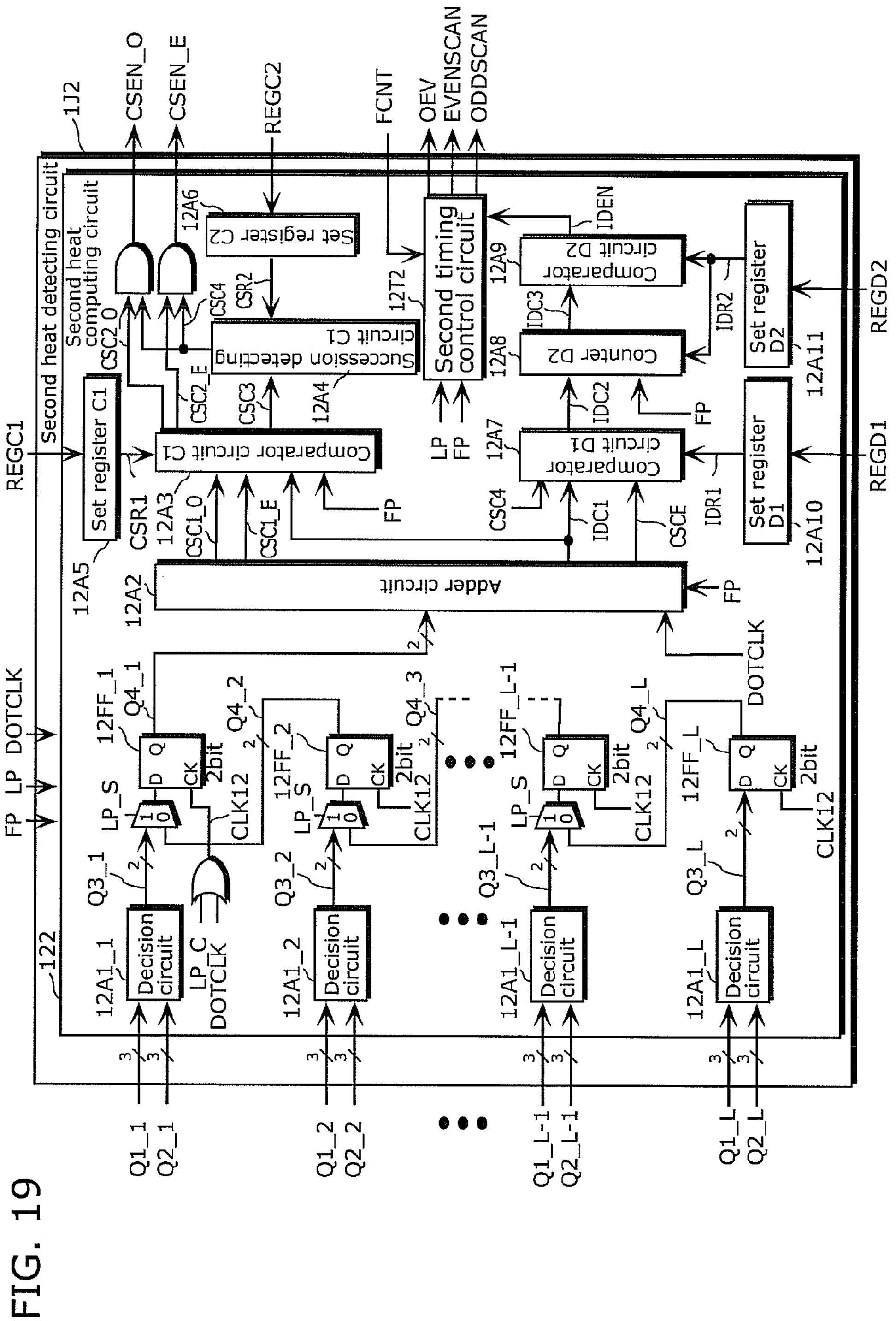
FIG. 19 illustrates a schematic configuration of a second heat detecting circuit according to Embodiment 2.

FIG. 19 illustrates an example of schematic configuration of the second heat detecting circuit 1J2 according to Embodiment 2. The second heat detecting circuit 1J2 includes a second heat computing circuit 122. The difference from the first heat detecting circuit 1J1 according to Embodiment 1 is that the first timing control circuit 12T1 is replaced with a second timing control circuit 12T2.

Figure 20:
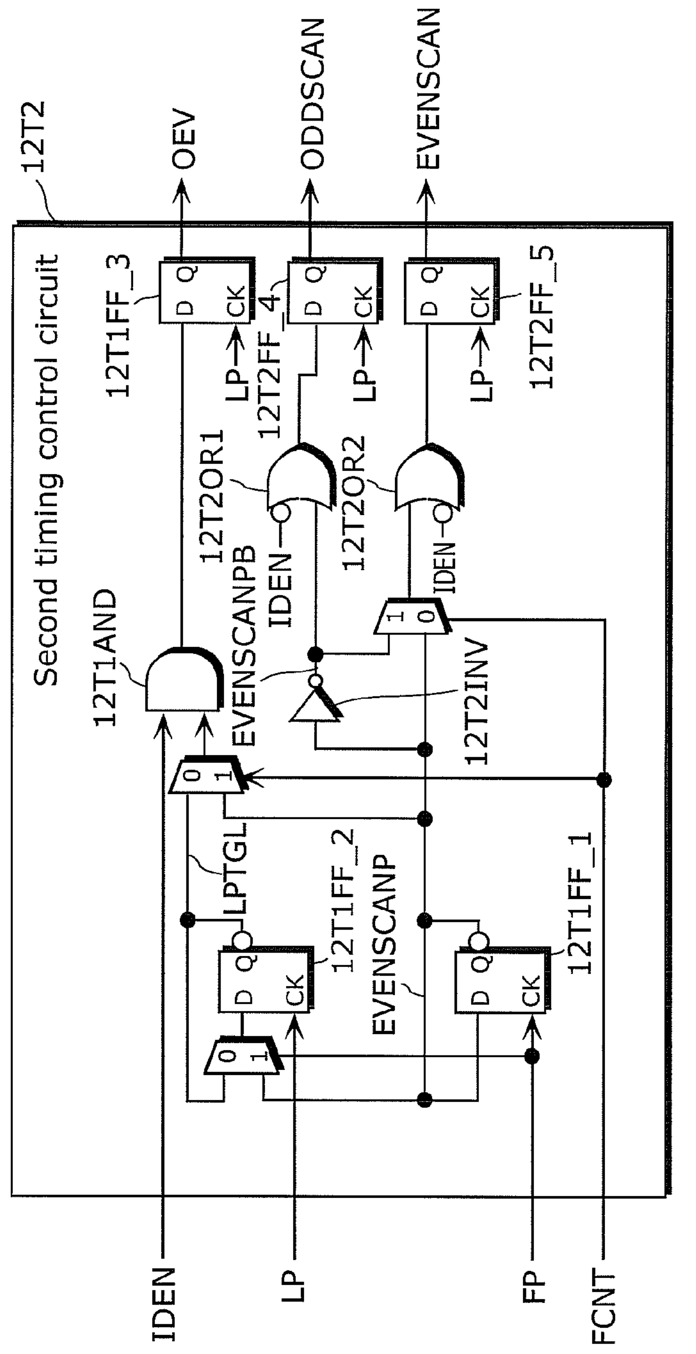
FIG. 20 illustrates a schematic configuration of a second timing control circuit according to Embodiment 2.

FIG. 20 illustrates an example of the schematic configuration of the second timing control circuit 12T2 according to Embodiment 2. The second timing control circuit 12T2 receives input of the frame pulse signal FP, a line pulse signal LP, a selection signal FCNT, and a driving method change enable signal IDEN from outside. Furthermore, the second timing control circuit 12T2 further includes, compared to the configuration of the first timing control circuit 12T1, logical OR circuits 12T2OR1 and 12T2OR2, flip-flops 12T2FF_4 and 12T2FF_5, and a logical NOT circuit 12T2INV. Furthermore, the front end on one of the input terminals of the logical OR circuit 12T2OR2 has a multiplexer.

The description for the logic of the output enable signal OEV is omitted, since it is completely identical to the first timing control circuit 12T1.

The frame toggle signal EVENSCANPB output from the logical NOT circuit 12T2INV is an inverted signal from the frame toggle signal EVENSCANP. In other words, the logical NOT circuit 12T2INV generates a signal obtained by inverting the logical value of the frame toggle signal EVENSCANP output by the flip-flop 12T1FF_1, and outputs the generated signal as the frame toggle signal EVENSCANB.

When the selection signal FCNT is L, and when the driving method change enable signal IDEN is H, the odd-row scanning signal ODDSCAN is the output from the flip-flop 12T1FF_4 which receives an input of the frame toggle signal EVENSCANPB. Furthermore, in the same case, the even-row scanning signal EVENSCAN is the output from the flip-flop 12T1FF_5 which receives an input of the frame toggle signal EVENSCANP. Accordingly, these signals have the opposite logic, and the second timing control circuit 12T2 outputs the odd-row scanning signal ODDSCAN and the even-row scanning signal EVENSCAN to the second heat reduction circuit 3J2 with the timing synchronized to the interlaced driving.

When the selection signal FCNT is H, and when the driving method change enable signal IDEN is H, the odd-row scanning signal ODDSCAN is the output from the flip-flop 12T1FF_4 which receives an input of the frame toggle signal EVENSCANPB. Furthermore, in the same case, the even-row scanning signal EVENSCAN is also the output from the flip-flop 12T1FF_5 which receives an input of the frame toggle signal EVENSCANPB. Accordingly, these signals have the same logic, and the second timing control circuit 12T2 outputs the odd-row scanning signal ODDSCAN and the even-row scanning signal EVENSCAN to the second heat reduction circuit 3J2 with the timing synchronized to the frame thinning driving to the second heat reduction circuit 3J2.

However, when the driving method change enable signal IDEN is L, the odd-row scanning signal ODDSCAN and the even-row scanning signal EVENSCAN are always H due to the mask by the logical OR circuit 12T2OR1 and the logical OR circuit 12T2OR2, and the change in the display driving method as the second step of the heat reduction method is not performed.

Description of Overall Operation of Change in Display Driving Method as the Second Step of Heat Reduction Method Based on the description above, an overall operation for changing the display driving method as the second step of the heat reduction method including the driver circuit 61 and the gate driver 7J2 shall be described with reference to FIGS. 21 and 22.

Figure 21:
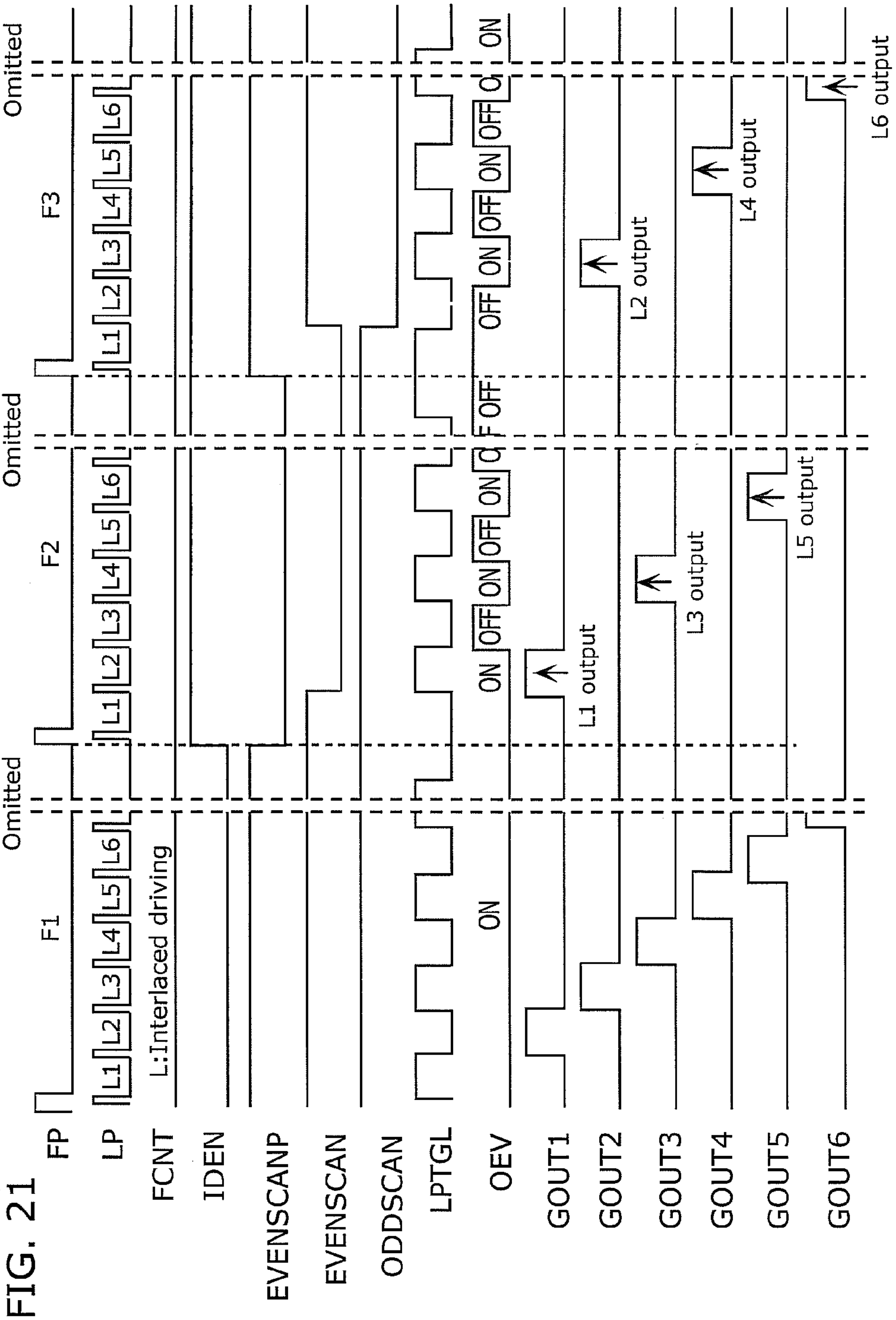
FIG. 21 is an example of a timing chart for an interlaced driving according to Embodiment 2.

FIG. 21 is an example of the timing chart for the interlaced driving according to Embodiment 2. F1 to F3 each indicates a frame period, and L1 to L6 each indicates a period for one row. Here, the scanning line driving signals GOUT1 to GOUT6 are outputs from the gate driver 7J2, and are scanning line driving signals for driving the scanning lines 1 to 6. In periods when the scanning line driving signals GOUT1 to GOUT6 are H, the driver circuit 61 in the source driver 6J2 can update the pixels in the corresponding rows of the display unit 5.

Note that, the configuration is identical to FIG. 13 except for the relationship between the odd-row scanning signal ODDSCAN, the even-row scanning signal EVENSCAN, and the gate driver 7J2. Thus, the description for the overlapping part shall be omitted. Furthermore, in the example illustrated in FIG. 21, the selection signal FCNT is L. Thus, the second timing control circuit 12T2 ouptuts the odd-row scanning signal ODDSCAN and the even-row scanning signal EVENSCAN to implement the interlaced scanning.

In the period F1, the driving method change enable signal IDEN is L, and is masked by the logical OR circuit 12T2OR1 and the logical OR circuit 12T2OR2 in FIG. 20. Thus, the odd-row scanning signal ODDSCAN and the even-row scanning signal EVENSCAN are in high level (H). When the odd-row scanning signal ODDSCAN and the even-row scanning signal EVENSCAN are H, the second heat reduction circuit 3J2 does not perform the mask. Thus, the progressive driving is performed as usual. In other words, the display driving method is not changed.

In the period F2, the driving method change enable signals IDEN is H, and the D terminal of the flip-flop 12T2FF_4 receives an input of a signal of the same logic as the frame toggle signal EVENSCANPB. The odd-row scanning signal ODDSCAN which is the output of the flip-flop 12T2FF_4 has a timing one row after the frame toggle signal EVENSCANPB. The timing control is performed such that the image data in row 1 loaded in the period L1 is output from the driver circuit 61 in the period L2. In the row after L2, the odd-row scanning signal ODDSCAN holds H until the next frame. Thus, the second heat reduction circuit 3J2 does not perform the mask on the odd rows of the gate line driving signals GOUT1, GOUT3 . . . , GOUTL−1.

The D terminal of the flip-flop 12T2FF_5 receives an input of a signal having the same logic as the frame toggle signal EVENSCANP. The timing for the even-row scanning signal EVENSCAN which is an output of the flip-flop 12T2FF_5 has a timing one row after the frame toggle signal EVENSCANP. The timing control is performed such that the image data in row 1 loaded in the period L1 is output from the driver circuit 61 in the period L2. In the row L2 or after, the even-row scanning signal EVENSCAN holds L until the next frame. Thus, the second heat reduction circuit 3J2 performs the mask on the even rows of the gate line driving signals GOUT2, GOUT4 . . . , GOUTL. Thus, in the period F2, both the driver circuit 61 and the gate driver 7J2 drives only the odd scanning lines.

In the period F3, the driving method change enable signals IDEN is H, and the D terminal of the flip-flop 12T2FF_4 receives an input of a signal of the same logic as the frame toggle signal EVENSCANPB. The odd-row scanning signal ODDSCAN which is the output of the flip-flop 12T2FF_4 has a timing one row after the frame toggle signal EVENSCANPB. The timing control is performed such that the image data in row 1 loaded in the period L1 is output from the driver circuit 61 in the period L2. In the row L2 or after, the odd-row scanning signal ODDSCAN holds L until the next frame, and thus the second heat reduction circuit 3J2 masks the odd rows of gate line driving signals GOUT1, GOUT3 . . . , GOUTL−1.

The D terminal of the flip-flop 12T2FF_5 receives an input of a signal having the same logic as the frame toggle signal EVENSCANP. The timing for the even-row scanning signal EVENSCAN which is an output of the flip-flop 12T2FF_5 is one row after the frame toggle signal EVENSCANP. The timing control is performed such that the image data in row 1 loaded in the period L1 is output from the driver circuit 61 in the period L2. In the row L2 or after, the even-row scanning signal EVENSCAN holds H until the next frame. Thus, the second heat reduction circuit 3J2 does not mask the even rows in the gate line driving signals GOUT2, GOUT4 . . . , GOUTL. Thus, in the period F3, both the driver circuit 61 and the gate driver 7J2 drives only the even scanning lines.

After the period F4, the operation identical to that of F2 is performed in even frames, and the operation identical to that of F3 is performed in odd frames. As such, the second timing control circuit 12T2 can perform the interlaced driving illustrated in FIG. 10 when the driving method change enable signal IDEN is H and when the change in the display driving method as the second step of the heat reduction method is permitted.

As such, the source driver 6J2 can change from the progressive driving to the interlaced driving when receiving the output enable signal OEV alternating between high and low for each line as the heat detection signal. Furthermore, the gate driver 7J2 can change from the progressive driving to the interlaced driving when receiving the odd-row scanning signal ODDSCAN and the even-row scanning signal EVENSCAN alternating each frame as the heat detection signal.

Figure 22:
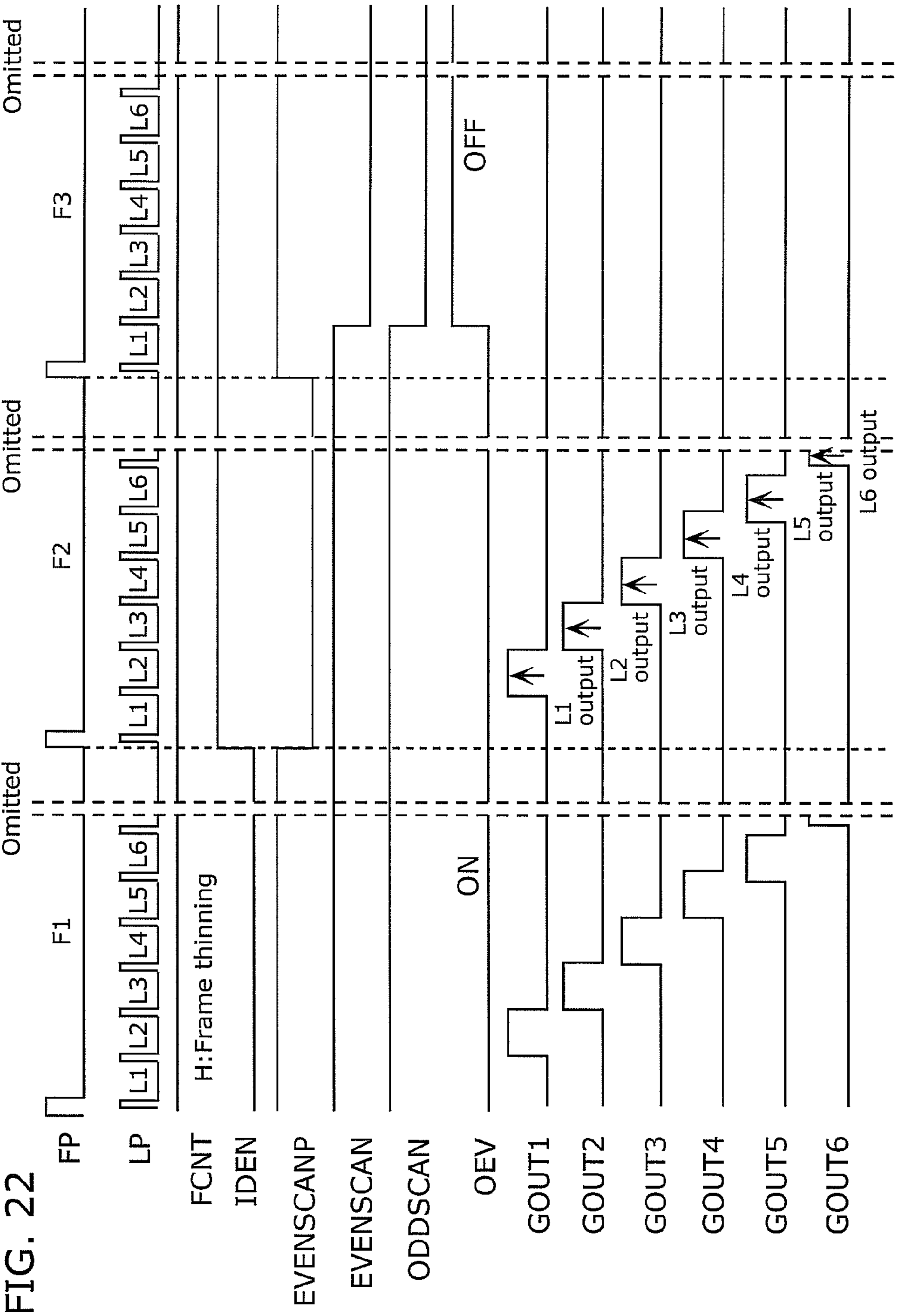
FIG. 22 is an example of a timing chart for frame thinning driving according to Embodiment 2.

FIG. 22 is an example of timing chart for frame thinning driving according to Embodiment 2.

F1 to F3 each indicates a frame period, and L1 to L6 each indicates a period for one row. Here, the scanning line driving signals GOUT1 to GOUT6 are outputs from the gate driver 7J2, and are scanning line driving signals for driving the scanning lines 1 to 6. In periods when the scanning line driving signals GOUT1 to GOUT6 are H, the driver circuit 61 in the source driver 6J2 can update the pixels in the corresponding rows of the display unit 5.

Note that, the configuration is identical to FIG. 13 except for the relationship between the odd-row scanning signal ODDSCAN, the even-row scanning signal EVENSCAN, and the gate driver 7J2. Thus, the description for the overlapping part shall be omitted. Furthermore, in the example illustrated in FIG. 22, the selection signal FCNT is H. Thus, the second timing control circuit 12T2 outputs the odd-row scanning signal ODDSCAN and the even-row scanning signal EVENSCAN to implement the frame thinning driving.

In the period F1, the driving method change enable signal IDEN is L, and is masked by the logical OR circuit 12T2OR1 and the logical OR circuit 12T2OR2 in FIG. 20. Thus, the odd-row scanning signal ODDSCAN and the even-row scanning signal EVENSCAN are in high level (H). When the odd-row scanning signal ODDSCAN and the even-row scanning signal EVENSCAN are H, the second heat reduction circuit 3J2 does not perform the mask. Thus, the progressive driving is performed as usual. In other words, the display driving method is not changed.

In the period F2, the driving method change enable signals IDEN is H, and the D terminals of the flip-flop 12T2FF_4 and the flip-flop 12T2FF_5 receive an input of a signal of the same logic as the frame toggle signal EVENSCANPB. The odd-row scanning signal ODDSCAN which is the output of the flip-flop 12T2FF_4 and the even-row scanning signal EVENSCAN which is the output of the flip-flop 12T2FF_5 have a timing one row after the frame toggle signal EVENSCANPB. The timing control is performed such that the image data in row 1 loaded in the period L1 is output from the driver circuit 61 in the period L2. In the row L2 and after, the odd-row scanning signal ODDSCAN and the even-row scanning signal EVENSCAN holds H until the next frame, and the second heat reduction circuit 3J2 does not mask the gate line driving signal GOUT1 to GOUTK. Accordingly, the gate driver 7J2 performs the progressive driving as usual. In other words, the display driving method is not changed.

In the period F3, the driving method change enable signals IDEN is H, and the D terminals of the flip-flop 12T2FF_4 and the flip-flop 12T2FF_5 receive an input of a signal of the same logic as the frame toggle signal EVENSCANPB. The odd-row scanning signal ODDSCAN which is the output of the flip-flop 12T2FF_4 and the even-row scanning signal EVEN-SCAN which is the output of the flip-flop 12T2FF_5 have a timing one row after the frame toggle signal EVENSCANPB. The timing control is performed such that the image data in row 1 loaded in the period L1 is output from the driver circuit 61 in the period L2. In the row L2 and after, the odd-row scanning signal ODDSCAN and the even-row scanning signal EVENSCAN hold L until the next frame, and thus, the second heat reduction circuit 3J2 masks the gate line driving signals GOUT1 to GOUTL. Thus, the gate driver 7J2 does not drive anything.

In the period F4 and after, the operation identical to that of F2 is performed in even frames, and the operation identical to that of F3 is performed in odd frames. As described above, the second timing control circuit 12T2 can perform the frame thinning driving illustrated in FIG. 11 when the driving method change enable signal IDEN is H and the change in the display driving method as the second step of the heat reduction method is permitted.

As described above, the source driver 6J2 can change the driving method from the progressive driving to the frame thinning driving when receiving the output enable signal OEV alternating between high and low for each frame as the heat detection signal. Furthermore, the gate driver 7J2 can change the driving method from the progressive driving to the frame thinning driving when receiving the odd-row scanning signal ODDSCAN and the even-row scanning signal EVEN-SCAN with the same polarity alternating between high and low for each frame as the heat detection signal.

Note that, in Embodiment 2, the description is made using the display apparatus as an example. However, the present invention can also be implemented as a driving circuit for display apparatus. For example, the display apparatus driving circuit according to Embodiment 2 includes the source driver 6J2 and the gate driver 7J2.

Effects of Embodiment 2

As described above, the display apparatus and the display apparatus driving circuit in Embodiment 2 includes a heat detecting circuit which detects the amount of heat generated at the source driver, and determines whether or not the detected amount of generated heat exceeds one or more set reference values, in the same manner as Embodiment 1. After that, the display apparatus and the display apparatus driving circuit according to Embodiment 2 changes the display driving method to reduce the amount of generated heat according to the level of the detected amount of generated heat, that is, according to the magnitude relationship between the detected amount of generated heat and the reference value.

Furthermore, the display apparatus and the display apparatus driving circuit according to Embodiment 2 can achieve the same effect as Embodiment 2, even when there is no output enabling function (the output enabling signal OEV is not available), or when the output enabling function is not used for some reason, as illustrated in Embodiment 2.

With this, the display apparatus and the display apparatus driving circuit according to Embodiment 2 can effectively reduce the amount of heat generated at the source driver. More specifically, in the still image determined to have small amount of generated heat, the display driving method is not switched. In addition, continuing real-time heat detection allows suppressing the degradation in the image quality as much as possible without unnecessarily switching the display driving method.

Therefore, Embodiment 2 is applicable to a high-quality display panel. Furthermore, since it is possible to suppress the amount of generated heat, it is possible to increase the number of output buffers for one source driver, or a heat radiating sheet is not necessary. As a result, it is possible to reduce the set cost.

Note on Variation of Embodiment 2

In the display apparatus and the display apparatus driving circuit according to Embodiment 2, the second heat detecting circuit 1J2 detects the heat for two steps. However, more detailed control with three or more steps are possible. Furthermore, the order of performing the heat reduction method is not limited to the description described above. In addition, the heat detection may include one step.

In addition, in the display apparatus and the display apparatus driving circuit according to Embodiment 2, two-step operation including the charge sharing and the change from the progressive driving is described as an example of the change in the display driving method for reducing heat. However, the operation may include three or more steps. The operation may also include one step, and may perform only one of the charge sharing and the change from the progressive driving.

Variation of Embodiment 2

As described above, Embodiment 2 is an example in which the present invention is applied to the case in which the gate driver that does not have the output enabling function (output enable signal OEV not available) or that does not use the output enabling function for some reason, by adding the second heat reduction circuit 3J2.

In the variation of Embodiment 2 as follows describes a variation of the present invention that does not require the second heat reduction circuit 3J2 even when the gate driver that does not have the output enabling function (output enable signal OEV not available) or that does not use the output enabling function for some reason.

Figure 23:
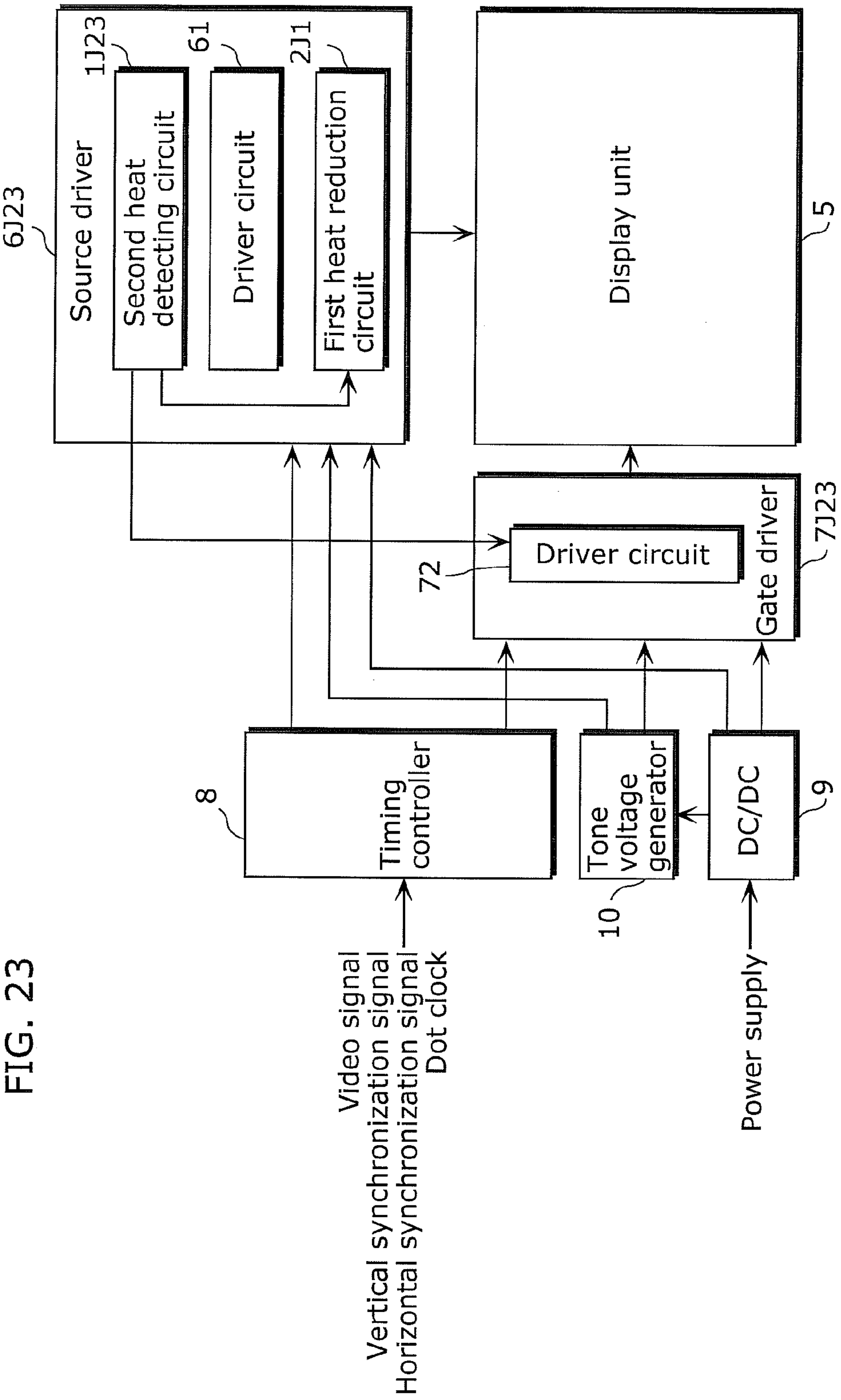
FIG. 23 illustrates an example of block configuration of a display apparatus according to a variation of Embodiment 2.

FIG. 23 illustrates an example of block configuration of the display apparatus according to a variation of Embodiment 2. The difference from the display apparatus according to Embodiment 2 is that the source driver 6J2 is replaced with the source driver 6J23, and the gate driver 7J2 is replaced with the gate driver 7J23. The gate driver 7J23 here is not limited to a gate driver IC.

Gate Driver 7J23

The gate driver 7J23 has a configuration with the driver circuit 72 only, that is, the second heat reduction circuit 3J2 is excluded from the gate driver 7J2.

Figure 24:
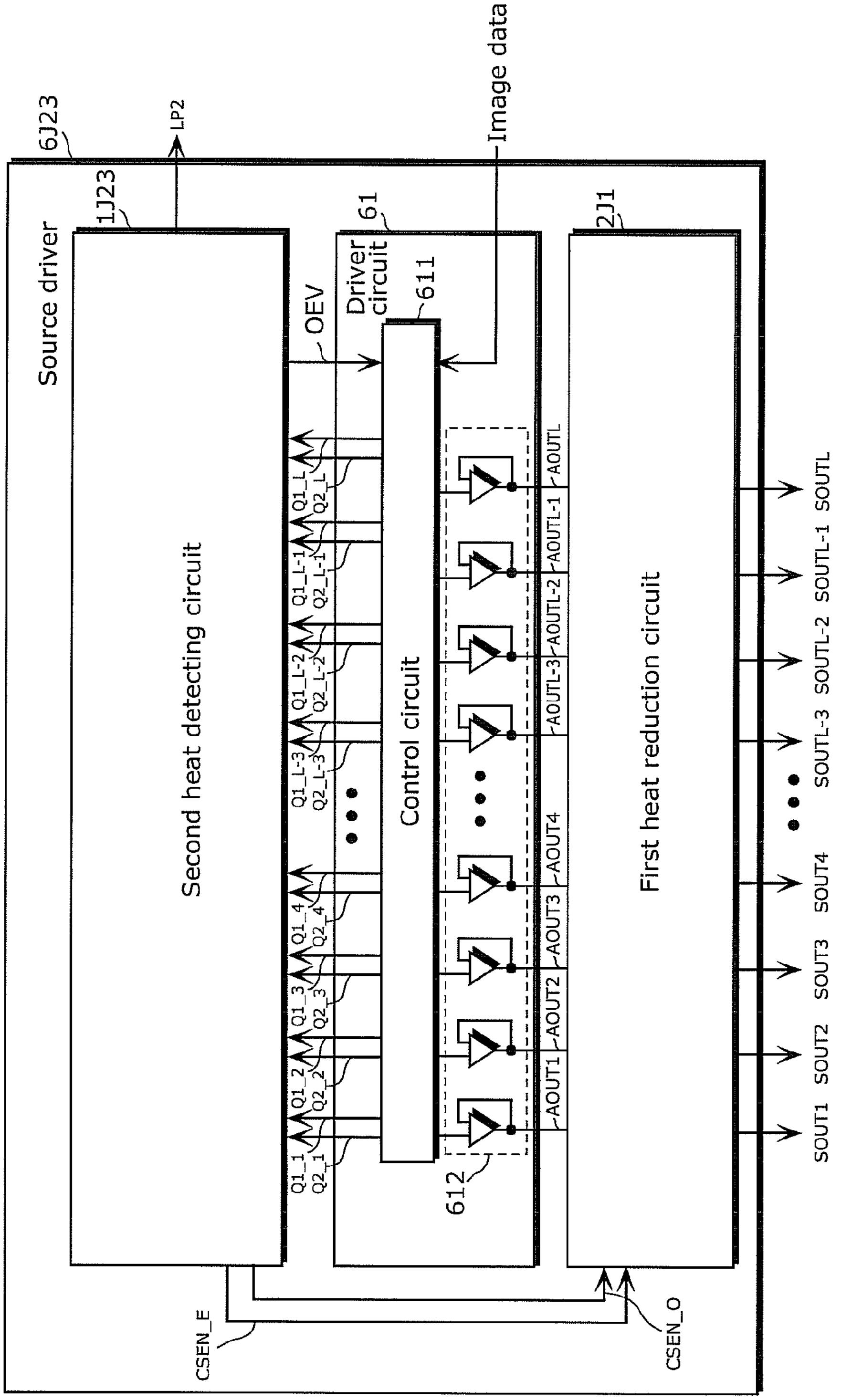
FIG. 24 illustrates an example of schematic configuration of a source driver according to a variation of Embodiment 2.

FIG. 24 illustrates a schematic configuration of the source driver 6J23 according to Embodiment 2. The source driver 6J23 includes L output channel, a driver circuit 61, a second heat detecting circuit 1J23, and a first heat reduction circuit 2J1. For description purpose, only signals transmitted and received between the driver circuit 61, the second heat detecting circuit 1J23 and the first heat reduction circuit 2J1, and between the source driver 6J23, the display unit 5, and the gate driver 7J23 are indicated in FIG. 24.

Second Heat Detecting Circuit 1J23

The second heat detecting circuit 1J23 calculates the amount of heat generated at the source driver 6J23 from the latch signals Q1_1 to Q1_L and the latch signals Q2_1 to Q2_L output from the driver circuit 61. Subsequently, when the calculated amount of generated heat is equal to or higher than the predetermined reference value, the second heat detecting circuit 1J23 outputs the heat detection signal.

More specifically, the second heat detecting circuit 1J23 determines whether or not the calculated amount of generated heat exceeds one or more set levels. More specifically, the second heat detecting circuit 1J23 outputs, odd-column charge sharing enable signal CSEN_O and the even-column charge sharing enable signal CSEN_E to the first heat reduction circuit 2J1, the output enable signal OEV to the driver circuit 61, and the line pulse signal LP2 to the gate driver 7J23, as the heat detection signals according to the level of the detected amount of generated heat.

Note that, in the same manner as Embodiment 2, the charge sharing is performed as the first step of heat reduction method, and the control for changing the display driving method from the progressive driving to the interlaced driving or the frame thinning driving is performed as the second step of heat reduction method.

Detailed Description of Second Heat Detecting Circuit 1J23

Figure 25:
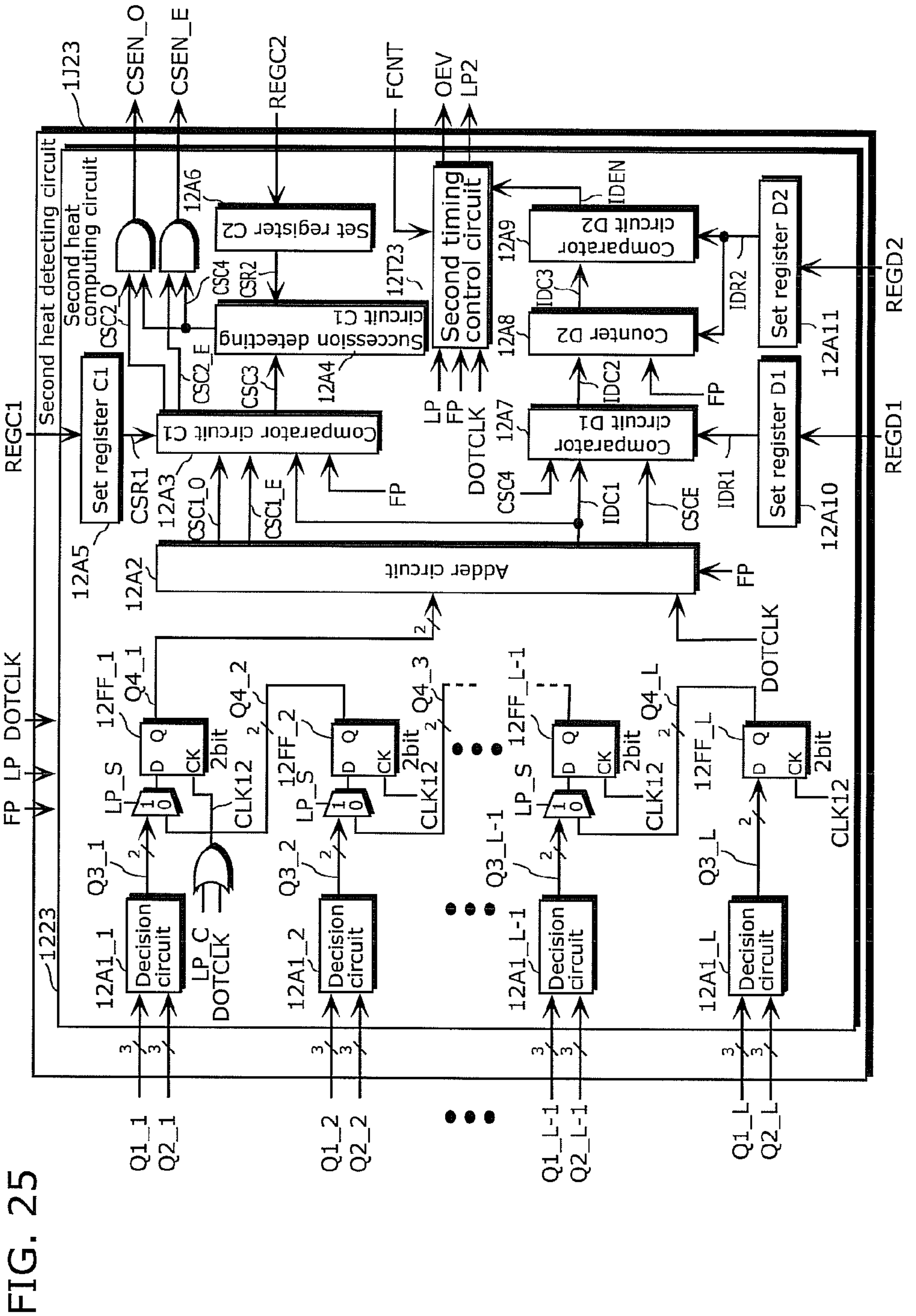
FIG. 25 illustrates a schematic configuration of a second heat detecting circuit according to a variation of Embodiment 2.

FIG. 25 illustrates an example of schematic configuration of the second heat detecting circuit 1J23 according to the variation of Embodiment 2. The second heat detecting circuit 1J23 includes a second heat computing circuit 1223. The difference from the second heat detecting circuit 1J2 is that the second timing control circuit 12T2 is replaced with the second timing control circuit 12T23.

Figure 26:
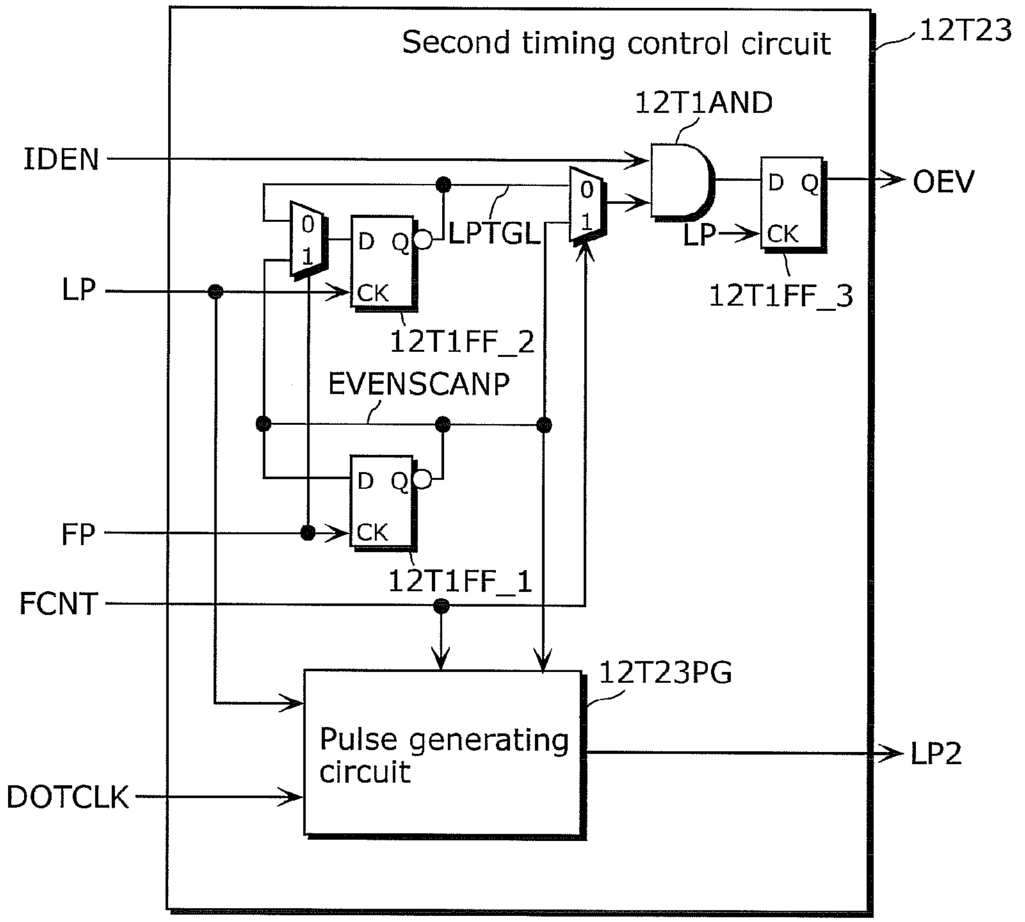
FIG. 26 illustrates an example of schematic configuration of a second timing control circuit according to a variation of Embodiment 2.

FIG. 26 illustrates an example of the schematic configuration of the second timing control circuit 12T23 according to a variation of Embodiment 2. The second timing control circuit 12T23 receives input of the frame pulse signal FP, a line pulse signal LP, a selection signal FCNT, and a driving method change enable signal IDEN from outside. The second timing control circuit 12T23 further includes a pulse generating circuit 12T23PG, compared to the configuration of the first timing control circuit 12T1.

The description for the logic of the output enable signal OEV is omitted, since it is completely identical to the first timing control circuit 12T1.

The difference from the second timing control circuit 12T2 is that there is no unit for generating the odd-row scanning signal ODDSCAN and the even-row scanning signal EVENSCAN, and a pulse generation circuit 12T23PG is newly added. The line pulse signal LP2 output from the pulse generating circuit 12T23PG is output to the gate driver 7J23 as a shift pulse. The gate driver 7J23 controls, with this signal, the change in the display driving method as the second step of heat reduction method.

Description of Overall Operation of Change in Display Driving Method as the Second Step of Heat Reduction Method Based on the description above, an overall operation for changing the display driving method as the second step of the heat reduction method including the driver circuit 61 and the gate driver 7J23 shall be described with reference to FIGS. 27 and 28.

Figure 27:
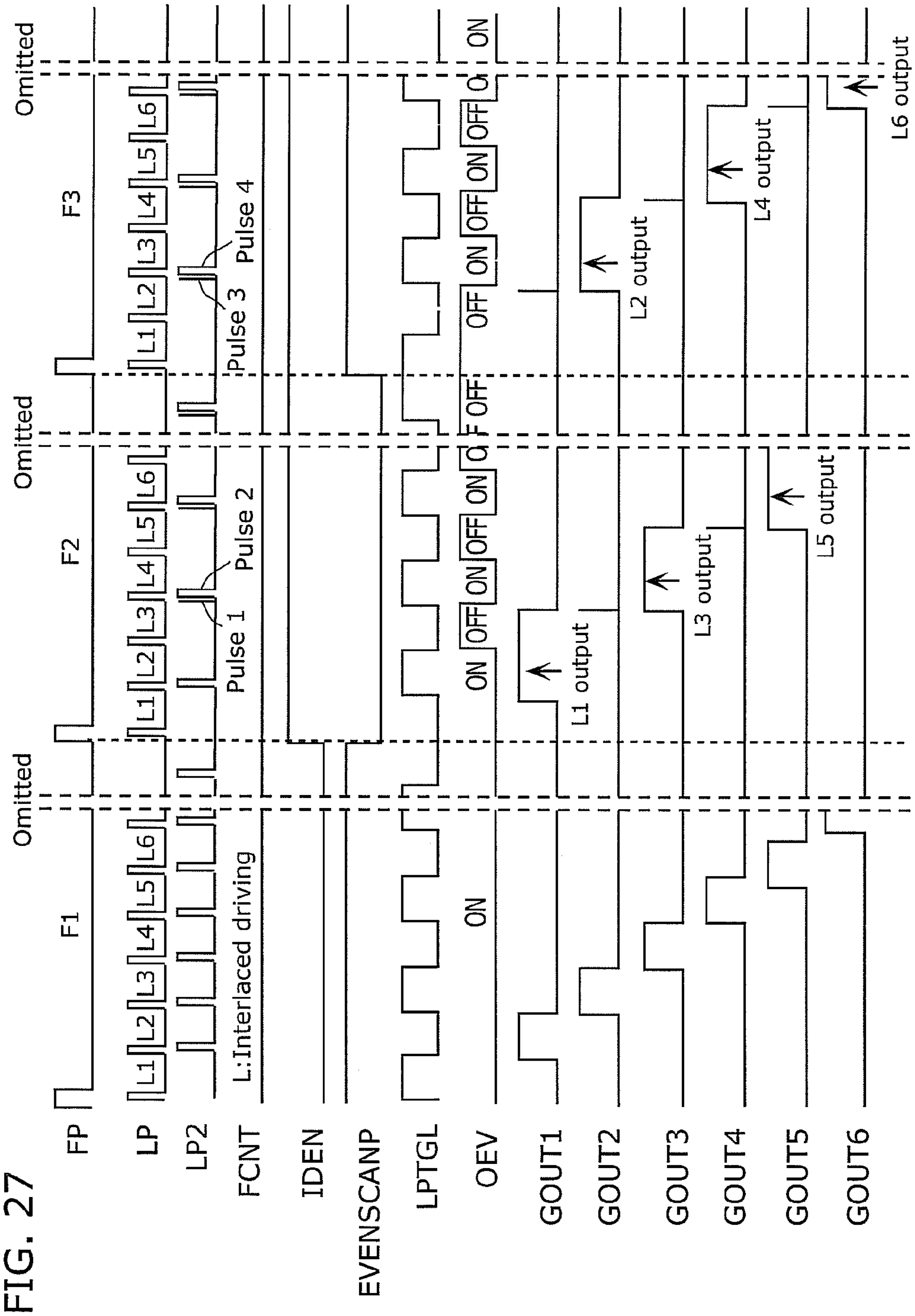
FIG. 27 is an example of a timing chart for an interlaced driving according to a variation of Embodiment 2.

FIG. 27 is an example of the timing chart for the interlaced driving according to a variation of Embodiment 2. F1 to F3 each indicates a frame period, and L1 to L6 each indicates a period for one row. Here, the scanning line driving signals GOUT1 to GOUT6 are outputs from the gate driver 7J23, and are scanning line driving signals for driving the scanning lines 1 to 6. In periods when the scanning line driving signals GOUT1 to GOUT6 are H, the driver circuit in the source driver 6J23 can update the pixels in the corresponding rows of the display unit 5.

The configuration is identical to FIG. 21 except for the relationship between the line pulse signal LP2 that the pulse generating circuit 12T23PG outputs and the gate driver 7J23. Accordingly, the overlapping description shall be omitted below. The driver circuit 72 receives an input of the line pulse signal LP2 output by the pulse generating circuit 12T23PG as shift clock. Furthermore, in the example illustrated in FIG. 27, the selection signal FCNT is L. Thus, the second timing control circuit 12T23 outputs the line pulse signal LP2 to implement the interlaced driving.

In the period F1, the driving method change enable signal IDEN is L. The pulse generating circuit 12T23PG outputs the line pulse signal LP2 with the same logic as the line pulse signal LP originally received by the gate driver 7J23, and thus the progressive driving is performed as usual. In other words, the display driving method is not changed.

In the period F2, the driving method change enable signal IDEN is H, and when the frame toggle signal EVENSCANP is L, the pulse generating circuit 12T23PG outputs shift pulses in the even-row periods only, the period L2, the period L4, the period L6 . . . and so on. In the period L4 and after, two pulses are output at once.

The first shift pulse is output with the minimum pulse width for the shift by the driver circuit 72. The pulse 1 in FIG. 27 is an example of the first shift pulse. Subsequent shift pulses are output with the regular pulse width, and the pulse 2 in FIG. 27 is an example.

The operation of the line pulse signal LP2 and the scanning line driving signals GOUT 1 to 6 shall be sequentially described. With the shift pulse in the period L2, the scanning line driving signal GOUT1 is H. With the pulse 1 in the period L4, the scanning line driving signal GOUT2 is H, but turns to L immediately by the pulse 2. Instead, the scanning line driving signal GOUT3 is H. The scanning line driving signal GOUT2 has a pulse width as low as possible for the shift operation. Subsequently, the same operation is repeated in the period L6 and after. Thus, in the period F2, both the driver circuit 61 and the gate driver 7J23 drives only the odd scanning lines.

In the period F3, the driving method change enable signal IDEN is H, and when the frame toggle signal EVENSCANP is H, the pulse generating circuit 12T23PG outputs shift pulses only in the odd-row periods, the period L3, the period L5, the period L7 . . . and so on. In the period L3 and after, two pulses are output at once.

The first shift pulse is output with the minimum pulse width for the shift by the driver circuit 72. The pulse 3 in FIG. 27 is an example. Subsequent shift pulses are output with the regular pulse width, and the pulse 4 in FIG. 27 is an example.

The operation of the line pulse signal LP2 and the scanning line driving signals GOUT 1 to 6 shall be sequentially described. With the pulse 3 in the period L3, the scanning line driving signal GOUT1 is H, but the scanning line driving signal GOUT1 is L immediately after that with the pulse 4, and the scanning line driving signal GOUT2 is H instead. The same operation is repeated in the period L4 and after. Thus, in the period F3, both the driver circuit 61 and the gate driver 7J23 drives only the even scanning lines.

In the period F4 and after, the operation identical to that of F2 is performed in even frames, and the operation identical to that of F3 is performed in odd frames. As such, the second timing control circuit 12T23 can perform the interlaced driving illustrated in FIG. 10 when the driving method change enable signal IDEN is H and when the change in the display driving method as the second step of the heat reduction method is permitted.

As such, when receiving the line pulse signal LP2 as the heat detection signal, the gate driver 7J23 can change the driving method from the progressive driving to the interlaced driving. The source driver 6J2 is identical to the same in Embodiment 2.

Figure 28:
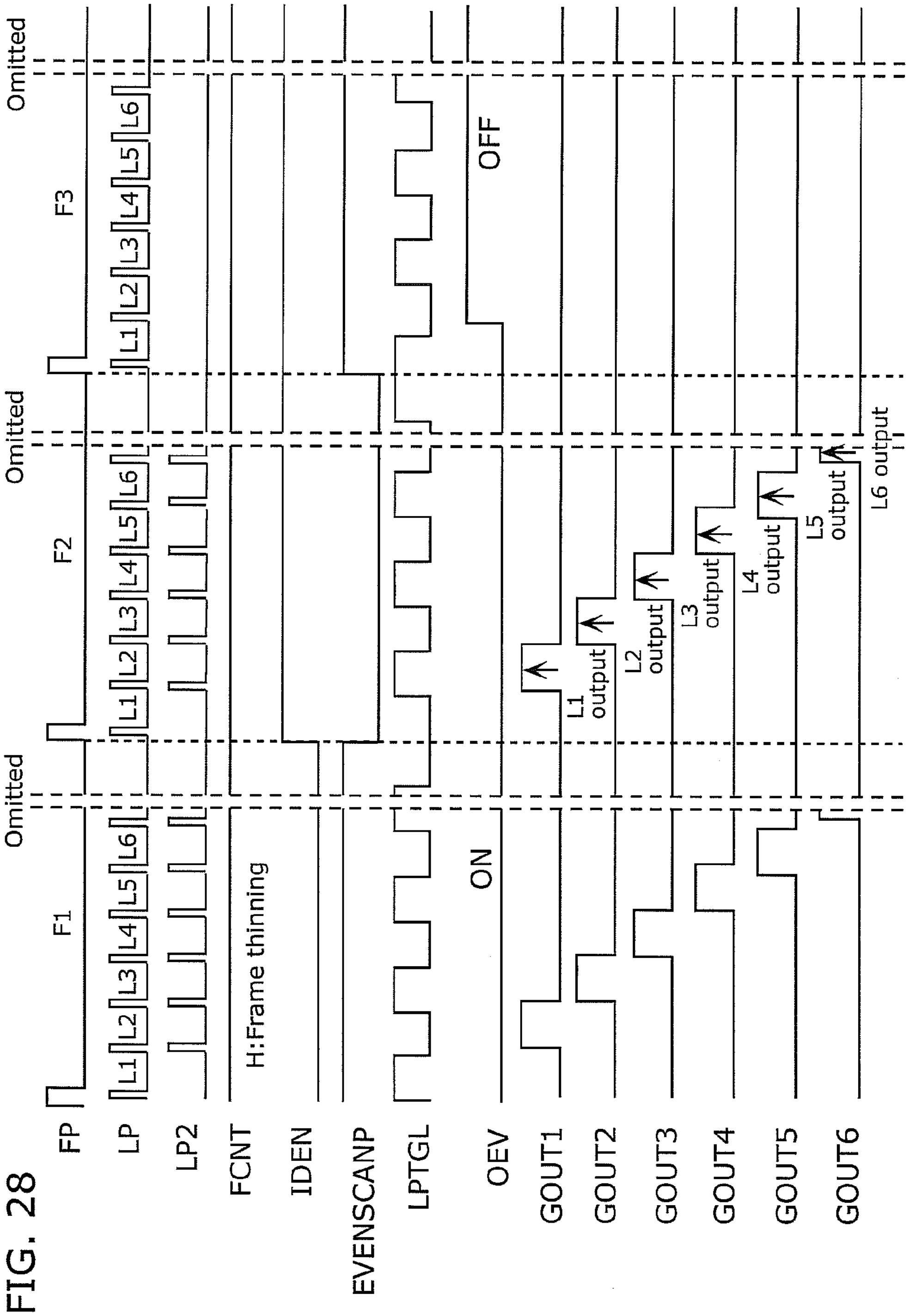
FIG. 28 is an example of a timing chart for frame thinning driving according to a variation of Embodiment 2.

FIG. 28 is an example of timing chart for frame thinning driving according to a variation of Embodiment 2. F1 to F3 each indicates a frame period, and L1 to L6 each indicates a period for one row. Here, the scanning line driving signals GOUT1 to GOUT6 are outputs from the gate driver 7J23, and are scanning line driving signals for driving the scanning lines 1 to 6. In periods when the scanning line driving signals GOUT1 to GOUT6 are H, the driver circuit 61 in the source driver 7J23 can update the pixels in the corresponding rows of the display unit 5.

The configuration is identical to FIG. 22 except for the relationship between the line pulse signal LP2 that the pulse generating circuit 12T23PG and the gate driver 7J23. Accordingly, the description shall be omitted below. The driver circuit 72 receives an input of the line pulse signal LP2 output by the pulse generating circuit 12T23PG as shift clock. Furthermore, in the example illustrated in FIG. 28, the selection signal FCNT is H. Thus, the second timing control circuit 12T23 outputs the line pulse signal LP2 to implement the frame thinning driving.

In the period F1, the driving method change enable signal IDEN is L. The pulse generating circuit 12T23PG outputs the line pulse signal LP2 with the same logic as the line pulse signal LP that should originally be received by the gate driver 7J23, and thus the progressive driving is performed as usual. In other words, the display driving method is not changed.

In the period F2, the driving method change enable signal IDEN is H. When the frame toggle signal EVENSCANP is L, the pulse generating circuit 12T23PG outputs the line pulse signal LP2 with the same logic as the line pulse signal LP that should originally be received by the gate driver 7J23, and thus performs the progressive driving as usual. In other words, the display driving method is not changed.

In the period F3, the driving method change enable signal IDEN is H, and the pulse generating circuit 12T23PG does not generate the pulse signal when the frame toggle signal EVENSCANP is H. In other words, as illustrated in FIG. 28, the line pulse signal LP2 is L in the period F3. Accordingly, the gate driver 7J23 does not drive anything.

In the period F4 and after, the operation identical to that of F2 is performed in even frames, and the operation identical to that of F3 is performed in odd frames. As described above, the second timing control circuit 12T23 can perform the frame thinning driving illustrated in FIG. 11 when the driving method change enable signal IDEN is H and the change in the display driving method as the second step of the heat reduction method is permitted.

As such, when receiving the line pulse signal LP2 alternating between a regular pulse and low level for each frame as the heat detection signal, the gate driver 7J23 can change the driving method from the progressive driving to the frame thinning driving. The source driver 6J2 is identical to the same in Embodiment 2.

As such, the display apparatus according to a variation of Embodiment 2 can apply the present invention when using the gate driver without output enabling function (the output enable signal OEV not available) or that does not use the output enabling function for some reason, without adding the second heat reduction circuit 3J2. Accordingly, even though it is as effective as Embodiment 2, the second heat reduction circuit 3J2 is not used, which allows further reduction in the set cost.

Embodiment 3

A large display apparatus may include more than one source drivers. In Embodiment 3, an application example of the present invention to a case in which more than one source drivers are used.

Figure 29:
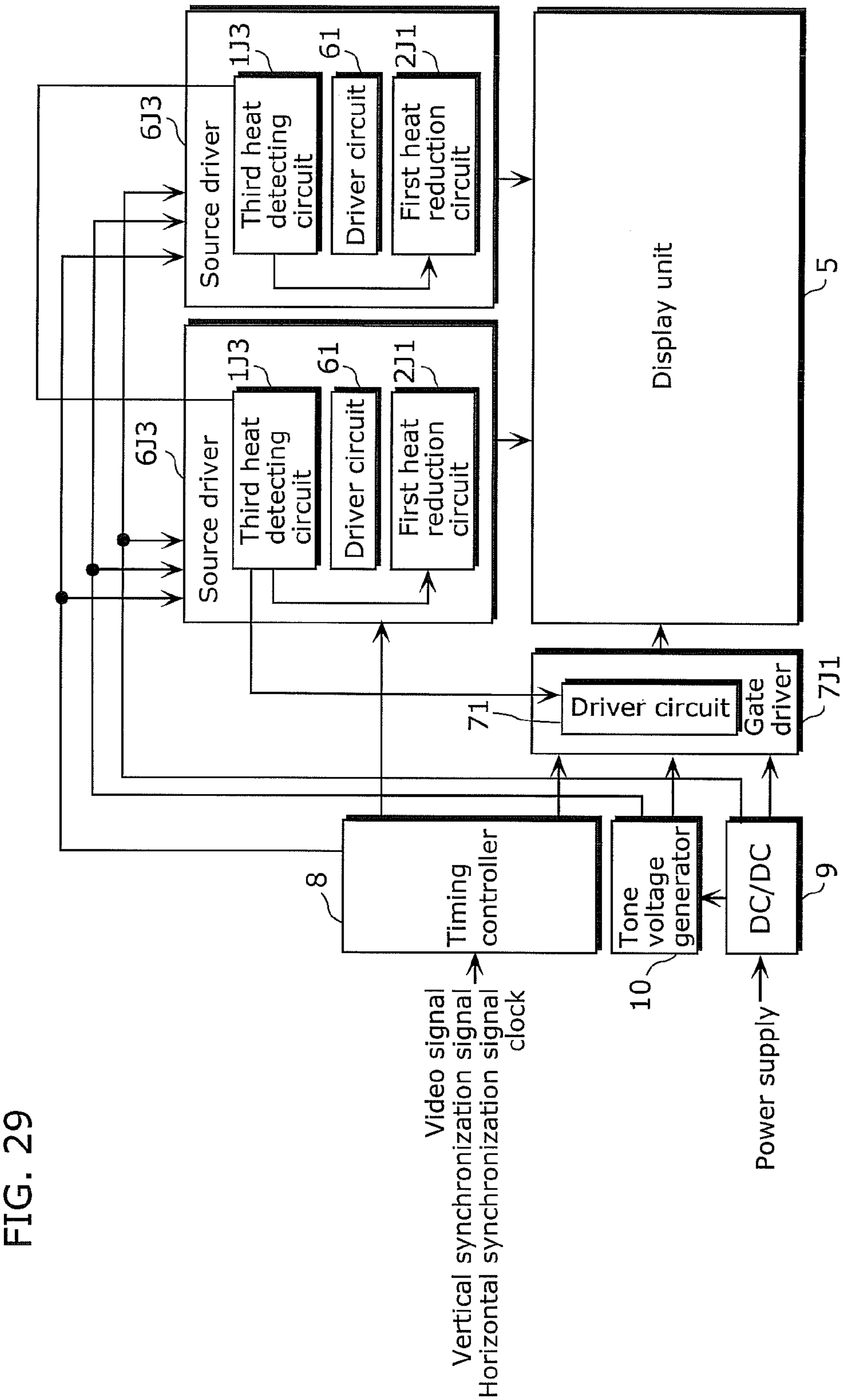
FIG. 29 illustrates an example of block configuration of a display apparatus according to Embodiment 3.

FIG. 29 illustrates an example of block configuration of the display apparatus according to Embodiment 3. The difference from the display apparatus according to Embodiment 1 is that more than one source drivers are included. More specifically, as illustrated in FIG. 29, the display apparatus according to Embodiment 3 has two source drivers 6J3 instead of the source driver 6J1.

Figure 30:
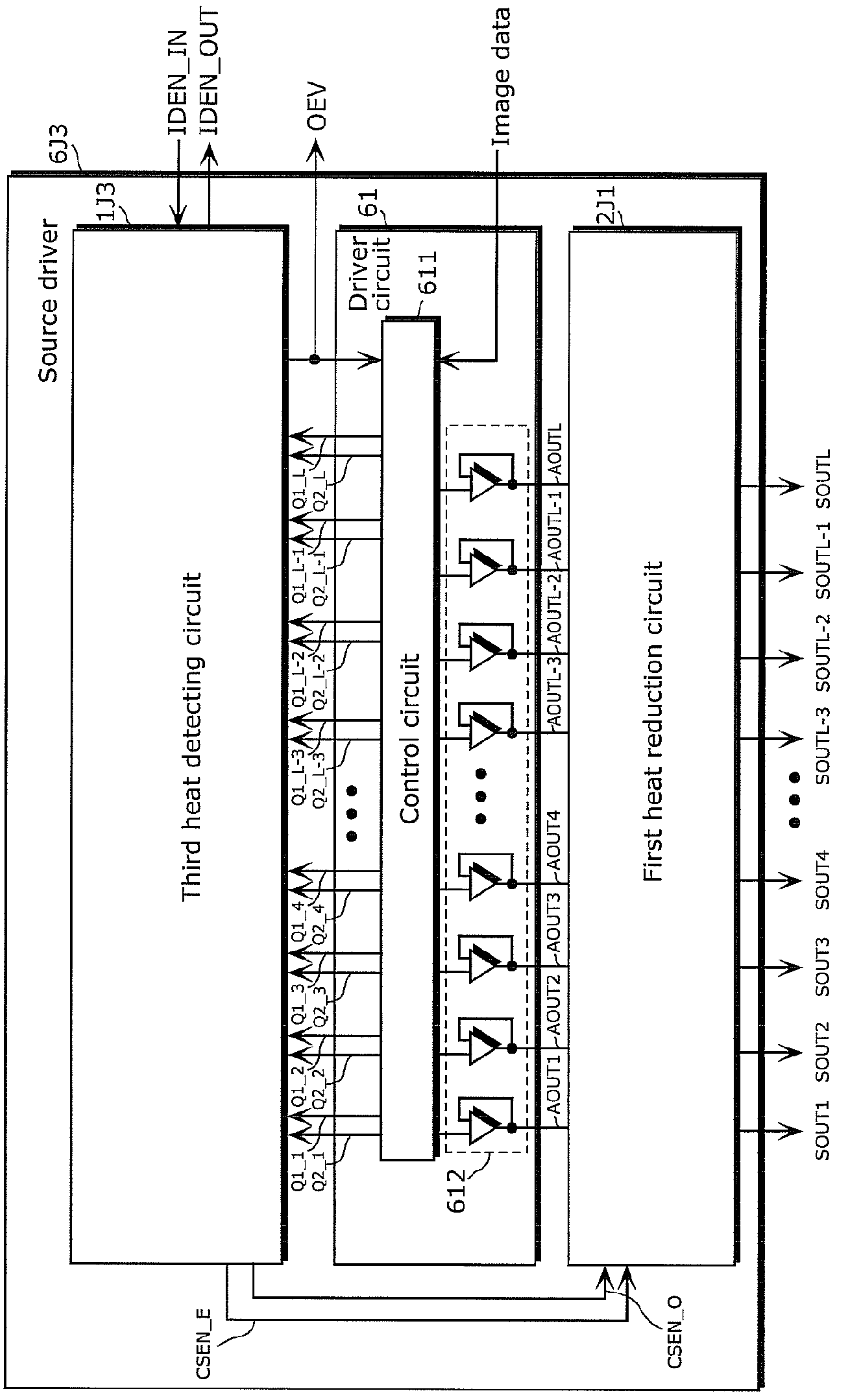
FIG. 30 illustrates an example of schematic configuration of a source driver according to Embodiment 3.

FIG. 30 illustrates a schematic configuration of the source driver 6J3 according to Embodiment 3. The source driver 6J3 includes L output channel, a driver circuit 61, a third heat detecting circuit 1J3, and a first heat reduction circuit 2J1. Note that, L in Embodiment 3 is the number of pixel columns arranged in a matrix; that is, the number obtained by dividing the number of the data lines by the number of the source driver 6J3. For description purpose, only signals transmitted and received between the driver circuit 61, the third heat detecting circuit 1J3 and the first heat reduction circuit 2J1, and between the source driver 6J3, the display unit 5, and the gate driver 7J1 are indicated in FIG. 30.

Third Heat Detecting Circuit 1J3

The third heat detecting circuit 1J3 calculates the amount of heat generated at the source driver 6J3 from the latch signals Q1_1 to Q1_L and the latch signals Q2_1 to Q2_L output from the driver circuit 61. Subsequently, when the calculated amount of generated heat is equal to or higher than the predetermined reference value, the third heat detecting circuit 1J3 outputs the heat detection signal.

More specifically, the third heat detecting circuit 1J3 determines whether or not the calculated amount of generated heat exceeds one or more set levels. More specifically, the third heat detecting circuit 1J3 includes one of more set levels which are one or more reference values, and determines whether or not the calculated amount of generated heat exceeds which one of the set levels.

The third heat detecting circuit 1J3 then outputs the heat detection signal according to the set level at which the amount of generated heat exceeds. More specifically, the third heat detecting circuit 1J3 outputs an odd-column charge sharing enable signal CSEN_O, and an even-column charge sharing enable signal CSEN_E to the first heat reduction circuit 2J1 and an output enable signal OEV to the driver circuit 61 and the gate driver 7J1, as the heat detection signals according to the level of the detected amount of generated heat.

Note that, in the same manner as Embodiments 1 and 2, the charge sharing is performed as the first step of heat reduction method, and the control for changing the display driving method from the progressive driving to the interlaced driving or the frame thinning driving is performed as the second step of heat reduction method.

Furthermore, between source drivers 6J3, whether or not the display driving method is changed as the second step of the heat reduction method is shared by the driving method change enable signal IDEN_IN and the driving method change enable signal IDEN_OUT. More specifically, in the display apparatus according to Embodiment 3, the heat detecting circuits share the detection results.

When one of the source drivers 6J3 detects the generated heat amount exceeding the generated heat amount reference value in the second time-series, it is necessary to share the necessity of changing the display driving method by controlling the gate driver 7J1. More specifically, all of the source drivers 6J3 change the driving method to the same driving method when one of the third heat detecting circuits 1J3 outputs the heat detection signal. However, whether or not the charge sharing is performed can be controlled by each source driver. Thus, it is not necessary for each of the heat detecting circuits to share all of the detection results. More specifically, when one of the third heat detecting circuits 1J3 outputs the heat detection signal, the source drivers 6J3 does not have to change the driving methods to the same driving method.

Detailed Description of Third Heat Detecting Circuit 1J3

Figure 31:
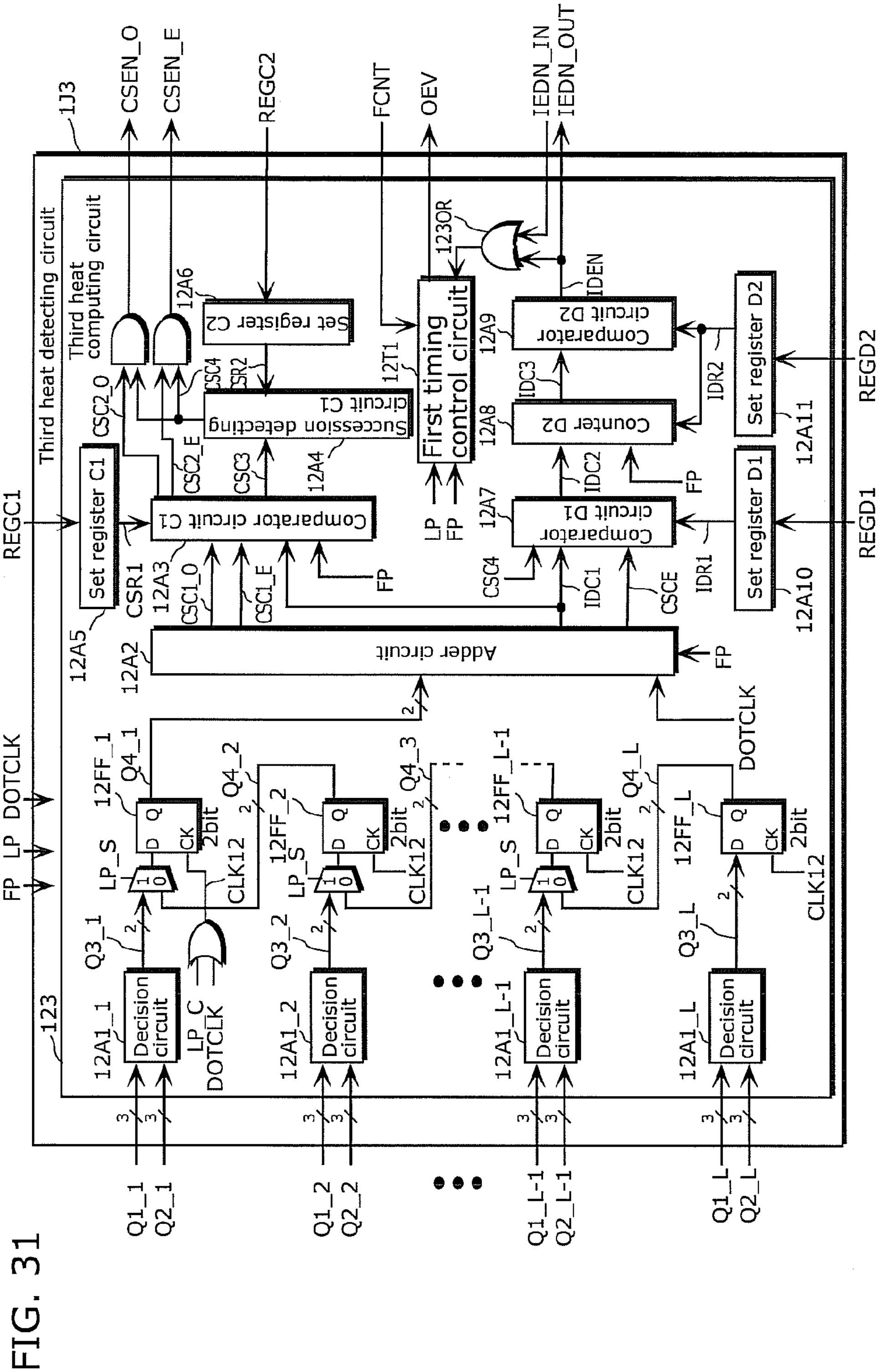
FIG. 31 illustrates a schematic configuration of a third heat detecting circuit according to Embodiment 3.

FIG. 31 illustrates an example of schematic configuration of the third heat detecting circuit 1J3 according to Embodiment 3. The third heat detecting circuit 1J3 includes a third heat computing circuit 123. The difference from the first heat detecting circuit 1J1 according to Embodiment 1 is that a logical OR circuit 123OR is included.

More specifically, the third heat computing circuit 123 receives the driving method change enable signal IDEN_OUT output from the other source drivers 6J3 included in the display apparatus as the driving method change enable signal IDEN_IN Subsequently, the third heat computing circuit 123 computes a logical OR between the received driving method change enable signal IDEN_IN and the driving method change enable signal IDEN_OUT in the third heat computing circuit 123, and provides the computation result to the first timing control circuit 12T1 as an input. Furthermore, the third heat computing circuit 123 outputs the driving method change enable signal IDEN_OUT in the third heat computing circuit 123 to another source driver 6J3 among the source drivers 6J3.

With this, when one of the source drivers 6J3 changes the display driving method as the second step of the heat reduction method; it is possible to cause the other source drivers 6J3 to follow. As such, the present invention can be applied to a case in which more than one source drivers are used.

Note on Variation of Embodiment 3

In Embodiment 3, the number of source drivers 6J3 is two. However, the source drivers 6J3 may be three or more. The source driver including the heat detecting circuit and the source driver not including heat detecting circuit may also be used together. For example, the display apparatus may include two source drivers and one heat detecting circuit and the heat detecting circuit may be incorporated into one of the two source drivers.

The third heat detecting circuit 1J3 detects the heat for two steps. However, more detailed control with three or more steps are possible. Furthermore, the order of performing the heat reduction method is not limited to the description described above. In addition, the heat detection may include one step.

Furthermore, as a method of sharing the change in the display driving method as the second step of the heat reduction method with the other source drivers 6J3, other methods such as using a wired OR as the display driving method change enable signal IDEN instead of the logical OR circuit 123OR may be used.

Note that, in Embodiment 3, the description is made using the display apparatus as an example. However, the present invention can also be implemented as a driving circuit for display apparatus. For example, the display apparatus driving circuit according to Embodiment 3 includes the source driver 6J3.

Effects of Embodiment 3

As described above, the display apparatus and the display apparatus driving circuit include n (n is a natural number) source drivers. Furthermore, at least one heat detecting circuit is incorporated in at least one of the n source drivers.

The display apparatus and the display apparatus driving circuit according to Embodiment 3 includes, in the same manner as Embodiments 1 and 2, a heat detecting circuit which detects the amount of heat generated at the source driver, and determines whether or not the detected amount of generated heat exceeds one or more set reference values. After that, the display apparatus and the display apparatus driving circuit according to Embodiment 3 changes the display driving method to reduce the amount of generated heat according to the level of the detected amount of generated heat, that is, according to the magnitude relationship between the detected amount of generated heat and the reference value.

Furthermore, the display apparatus and the display apparatus driving circuit according to Embodiment 3 can achieve the same effect as in Embodiment 1 as described above, even when more than one source drivers are included. According to Embodiment 3, including more than one source drivers allows to reduce the generated heat amount in a large display apparatus or a high-definition display apparatus with a large number of pixels.

With this, the display apparatus and the display apparatus driving circuit according to Embodiment 3 can effectively reduce the amount of heat generated at the source driver. More specifically, in the still image determined to have small amount of generated heat, the display driving method is not switched. In addition, continuing real-time heat detection allows suppressing the degradation in the image quality as much as possible without unnecessarily switching the display driving method.

Therefore, Embodiment 3 is applicable to a high-quality display panel. Furthermore, since it is possible to suppress the amount of generated heat, it is possible to increase the number of output buffers for one source driver, or a heat radiating sheet is not necessary. As a result, it is possible to reduce the set cost.

Embodiment 4

A large display apparatus may include multiple source drivers. In Embodiment 4, an application example of the present invention to a case where more than one source drivers are used, and when a gate driver without the output enabling function (the output enable signal OEV unavailable) or that does not use the output enable function for some reason.

Figure 32:
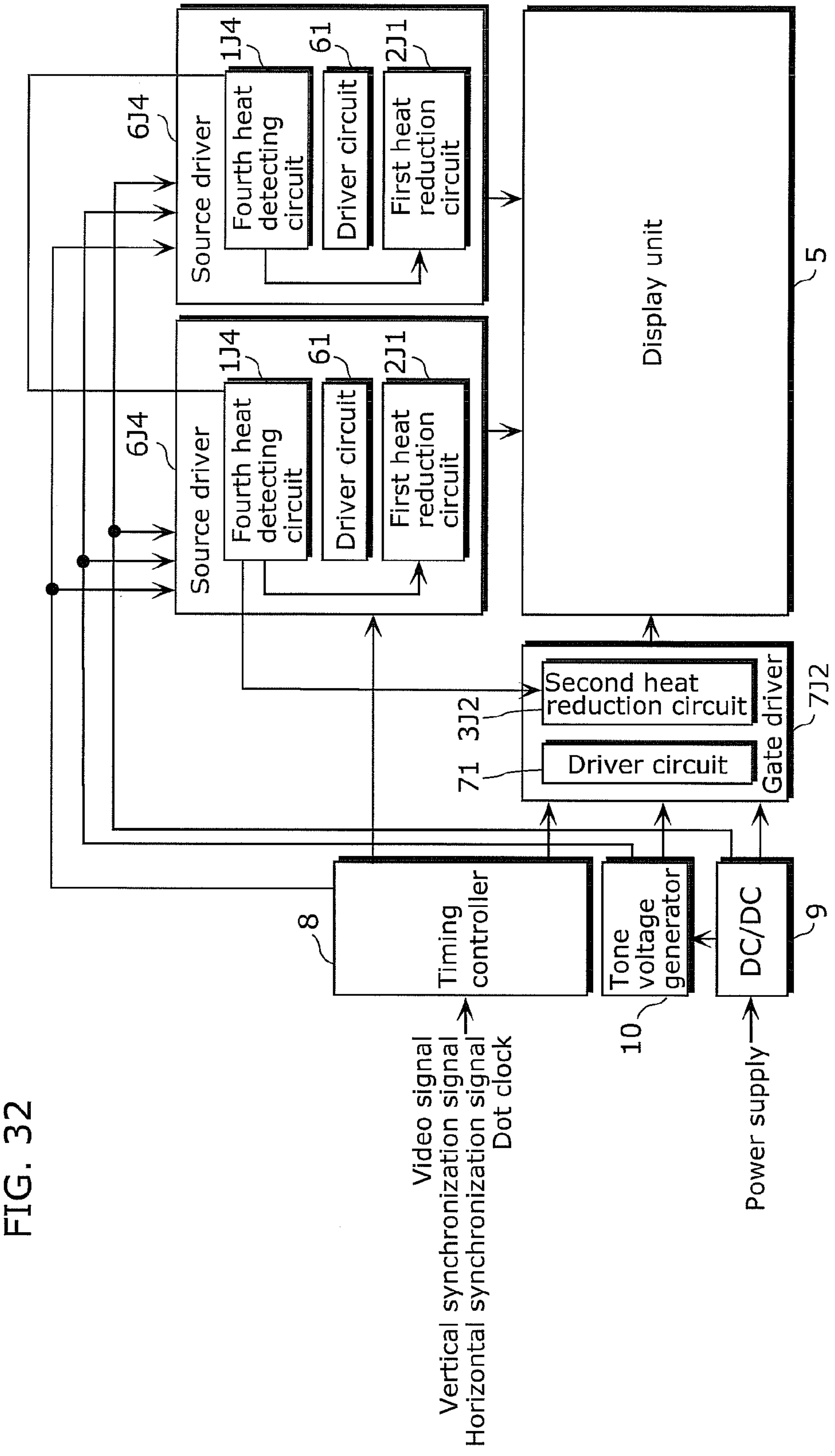
FIG. 32 illustrates an example of block configuration of a display apparatus according to Embodiment 4.

FIG. 32 illustrates an example of block configuration of the display apparatus according to Embodiment 4. The difference from the display apparatus according to Embodiment 3 is that the source driver 6J3 is replaced with the source driver 6J4, and the gate driver 7J1 is replaced with the gate driver 7J2.

Figure 33:
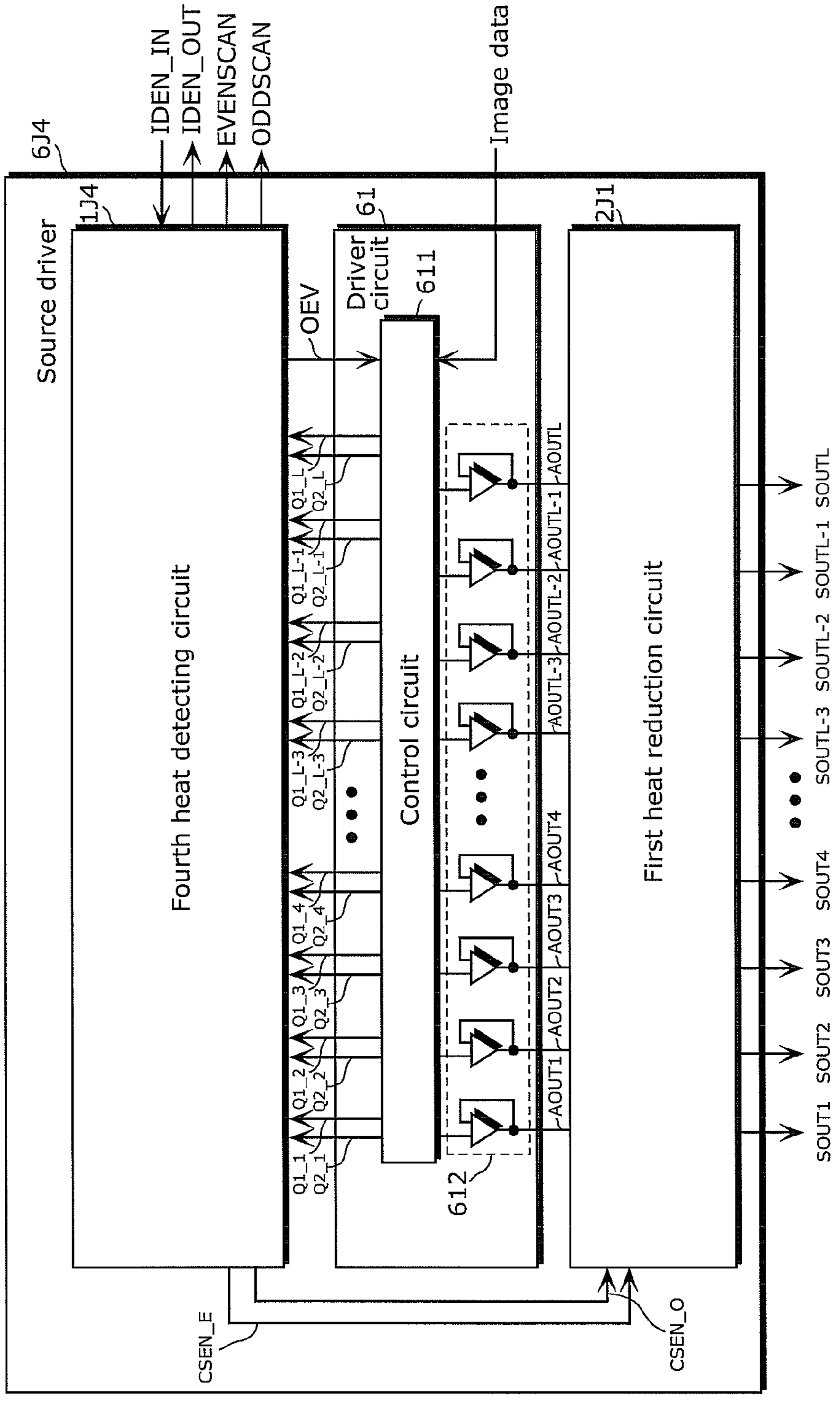
FIG. 33 illustrates an example of schematic configuration of a source driver according to Embodiment 4.

FIG. 33 illustrates a schematic configuration of the source driver 6J4 according to Embodiment 4. The source driver 6J4 includes L output channel, a driver circuit 61, a fourth heat detecting circuit 1J4, and a first heat reduction circuit 2J1. Note that, in the same manner as Embodiment 3, L is the number of pixel columns arranged in a matrix; that is, the number obtained by dividing the number of the data lines by the number of the source driver 6J4. For description purpose, only signals transmitted and received between the driver circuit 61, the fourth heat detecting circuit 1J4 and the first heat reduction circuit 2J1, and between the source driver 6J4, the display unit 5, and the gate driver 7J2 are indicated.

Fourth Heat Detecting Circuit 1J4

The fourth heat detecting circuit 1J4 calculates the amount of heat generated at the source driver 6J4 from the latch signals Q1_1 to Q1_L and the latch signals Q2_1 to Q2_L output from the driver circuit 61. Subsequently, when the calculated amount of generated heat is equal to or higher than the predetermined reference value, the fourth heat detecting circuit 1J4 outputs the heat detection signal.

More specifically, the fourth heat detecting circuit 1J4 determines whether or not the calculated amount of generated heat exceeds one or more set levels. More specifically, the fourth heat detecting circuit 1J4 includes one or more set levels which are one or more reference values, and determines whether or not the calculated amount of generated heat exceeds which one of the set levels.

The fourth heat detecting circuit 1J4 then outputs the heat detection signal according to the set level at which the amount of generated heat exceeds. More specifically, the fourth heat detecting circuit 1J4 outputs the odd-column charge sharing enable signal CSEN_O and the even-column charge sharing enable signal CSEN_E to the first heat reduction circuit 2J1, outputs the output enable signal OEV to the driver circuit 61, and outputs an odd-row scanning signal ODDSCAN and an even-row scanning signal EVENSCAN to the gate driver 7J2, as the heat detection signals according to the level of the detected amount of generated heat.

Note that, in the same manner as Embodiments 1 to 3, the charge sharing is performed as the first step of heat reduction method, and the control for changing the display driving method from the progressive driving to the interlaced driving or the frame thinning driving is performed as the second step of heat reduction method.

Furthermore, between the other source drivers 6J4, whether or not the display driving method is changed as the second step of the heat reduction method is shared by the driving method change enable signal IDEN_IN and the driving method change enable signal IDEN_OUT. More specifically, in the display apparatus according to Embodiment 4, the heat detecting circuits shares the detection results.

When one of the source drivers 6J4 detects the generated heat amount exceeding the generated heat amount reference value in the second time-series, it is necessary to share the necessity of changing the display driving method by controlling the gate driver 7J2. More specifically, all of the source drivers 6J4 change the driving method to the same driving method when one of the fourth heat detecting circuits 1J4 outputs the heat detection signal. However, whether or not the charge sharing is performed can be controlled by each source driver. Thus, it is not necessary for each of the heat detecting circuit to share all of the detection results. More specifically, when one of the third heat detecting circuits 1J4 outputs the heat detection signal, the source drivers 6J4 does not have to change the driving methods to the same driving method.

Detailed Description of Fourth Heat Detecting Circuit 1J4

Figure 34:
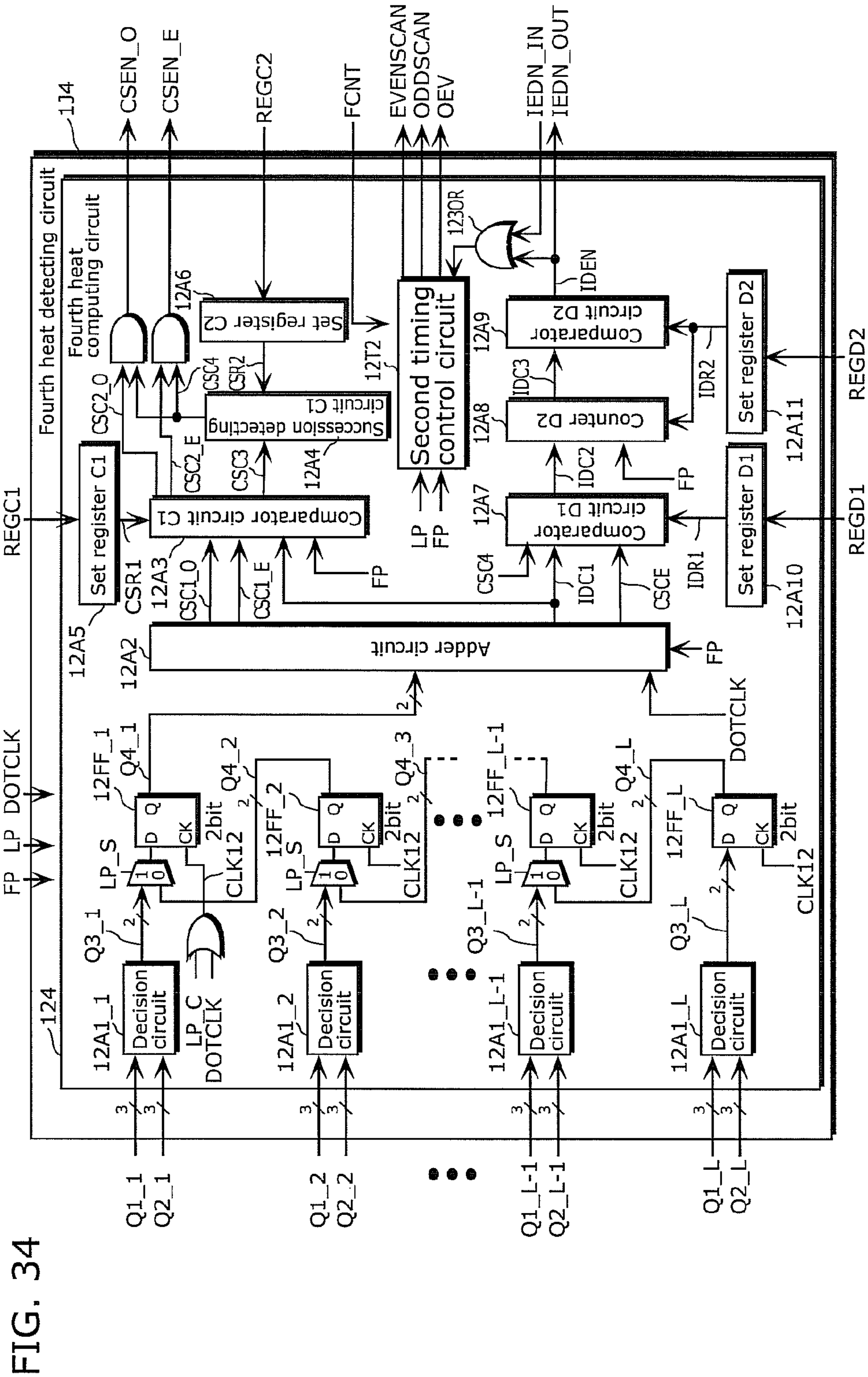
FIG. 34 illustrates a schematic configuration of a fourth heat detecting circuit according to Embodiment 4.

FIG. 34 illustrates an example of schematic configuration of the fourth heat detecting circuit 1J4 according to Embodiment 4. The fourth heat detecting circuit 1J4 includes a fourth heat computing circuit 124. The difference from the third heat detecting circuit 1J3 according to Embodiment 3 is that the first timing control circuit 12T1 is replaced with a second timing control circuit 12T2. With this, as illustrated in Embodiment 2, the present invention is applicable to a case in which a gate driver without the output enabling function (output enable signal OEV unavailable) or that does not use the output enable function for some reason.

Note on Variation of Embodiment 4

In Embodiment 4, the number of source drivers 6J4 is two. However, the source drivers 6J4 may be three or more. The source driver including the heat detecting circuit and the source driver including heat detecting circuit may also be used together.

The fourth heat detecting circuit 1J4 detects the heat for two steps. However, more detailed control with three or more steps are possible. Furthermore, the order of performing the heat reduction method is not limited to the description described above. In addition, the heat detection may include one step.

Furthermore, as a method of sharing the change in the display driving method as the second step of the heat reduction method with the other source drivers 6J4, other methods such as using a wired OR as the display driving method change enable signal IDEN instead of the logical OR circuit 123OR.

Furthermore, when more than one source drivers are used, the variation of Embodiment 2 may be applied.

Note that, in Embodiment 4, the description is made using the display apparatus as an example. However, the present invention can also be implemented as a driving circuit for display apparatus. For example, the display apparatus driving circuit according to Embodiment 4 includes the source driver 6J4 and the gate driver 7J2.

Effects of Embodiment 4

As described above, the display apparatus and the display apparatus driving circuit according to Embodiment 4 include n (n is a natural number) source drivers. Furthermore, at least one heat detecting circuit is incorporated in at least one of the n source drivers.

The display apparatus and the display apparatus driving circuit according to Embodiment 4 includes, in the same manner as Embodiments 1 to 3, a heat detecting circuit which detects the amount of heat generated at the source driver, and determines whether or not the detected amount of generated heat exceeds one or more set reference values. After that, the display apparatus and the display apparatus driving circuit according to Embodiment 4 changes the display driving method to reduce the amount of generated heat according to the level of the detected amount of generated heat, that is, according to the magnitude relationship between the detected amount of generated heat and the reference value.

Furthermore, the display apparatus and the display apparatus driving circuit according to Embodiment 4 can achieve the same effect as in Embodiment 1 as described above, even when the gate driver without the output enabling function (the output enable signal OEV unavailable) or that does not use the output enabling function for some reason is included. According to Embodiment 4, including more than one source drivers allows to reduce the generated heat amount in a large display apparatus or a high-definition display apparatus with a large number of pixels.

With this, the display apparatus and the display apparatus driving circuit according to Embodiment 4 can effectively reduce the amount of heat generated at the source driver. More specifically, in the still image determined to have small amount of generated heat, the display driving method is not switched. In addition, continuing real-time heat detection allows suppressing the degradation in the image quality as much as possible without unnecessarily switching the display driving method.

Therefore, Embodiment 4 is applicable to a high-quality display panel. Furthermore, since it is possible to suppress the amount of generated heat, it is possible to increase the number of output buffers for one source driver, or a heat radiating sheet is not necessary. As a result, it is possible to reduce the set cost.

Embodiment 5

Embodiment 5 describes an example of the present invention applied to a case in which the heat detecting circuit is incorporated into a timing controller, instead of the source driver. Although Embodiment 5 is applicable to all of Embodiments 1 to 4, the following description includes only an example applied to Embodiment 1.

Figure 35:
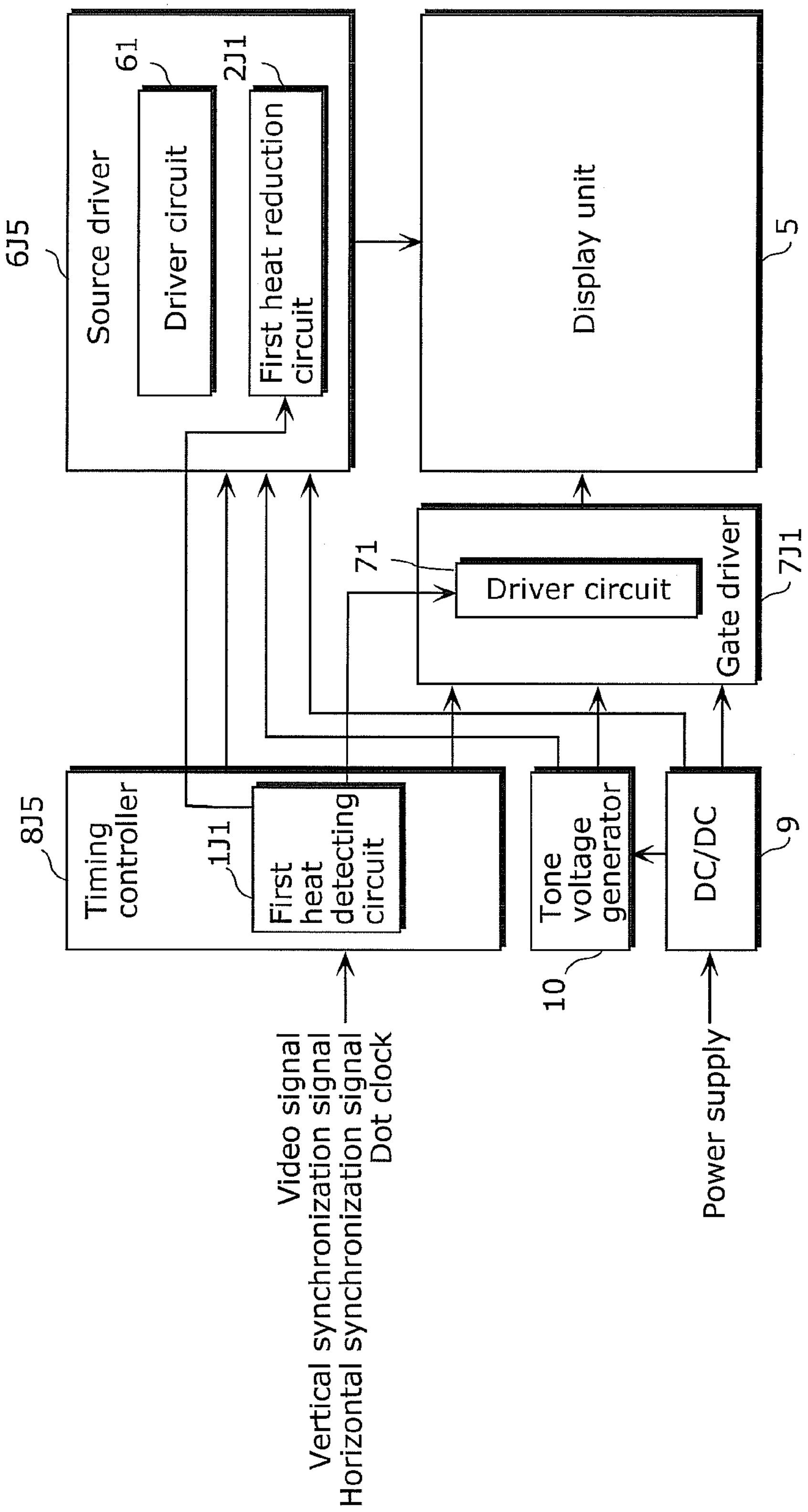
FIG. 35 illustrates an example of block configuration of a display apparatus according to Embodiment 5.

FIG. 35 illustrates an example of block configuration of the display apparatus according to Embodiment 5. The difference from the display apparatus according to Embodiment 1 is that the source driver 6J1 is replaced with the source driver 6J5, and the timing controller 8 is replaced with the timing controller 8J5.

The difference of the source driver 6J5 from the source driver 6J1 is that the first heat detecting circuit 1J1 is not included. The difference of the timing controller 8J5 from the timing controller 8 is that the first heat detecting circuit 1J1 is included. In other words, the change in the configuration from Embodiment 1 is that the first heat detecting circuit 1J1 in the source driver is moved to the timing controller.

Figure 36:
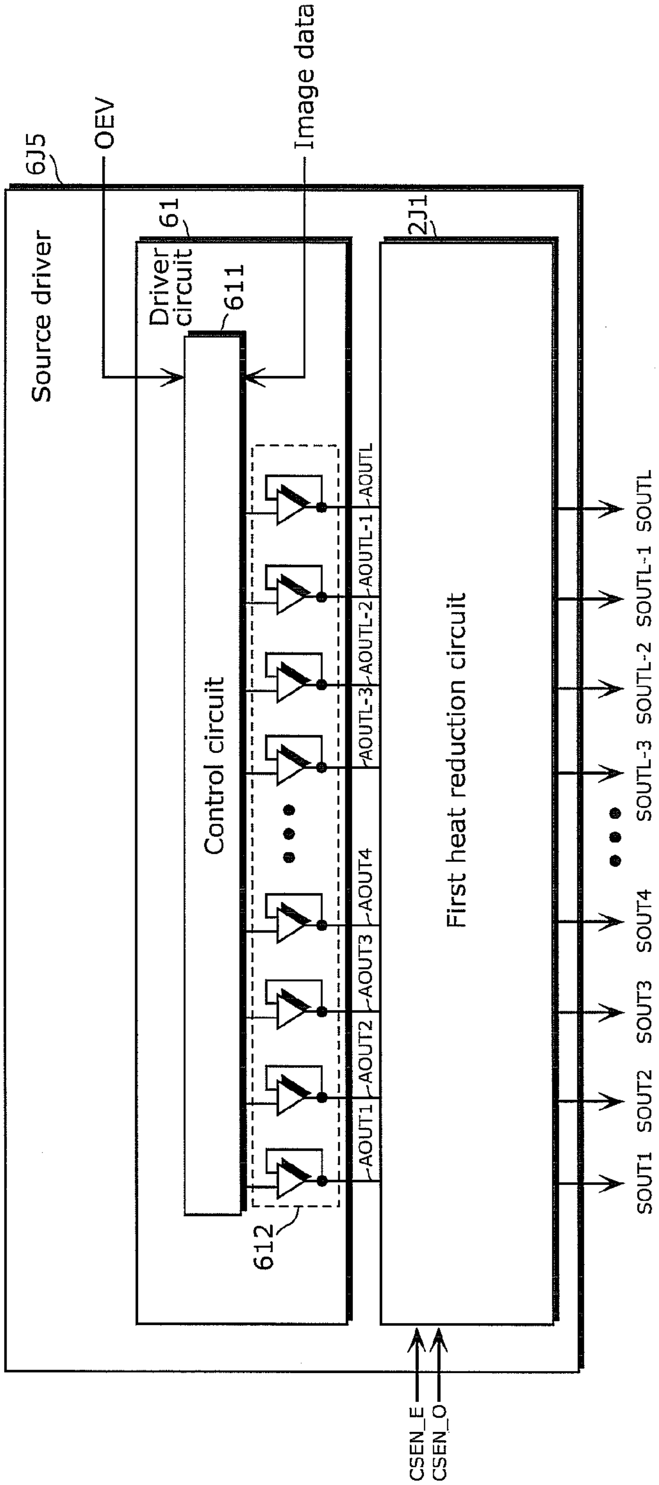
FIG. 36 illustrates an example of schematic configuration of a source driver according to Embodiment 5.

FIG. 36 illustrates a schematic configuration of the source driver 6J5 according to Embodiment 5. The gate driver 6J5 includes L output channels, a driving circuit 61, and a first heat reduction circuit 2J1. For description purpose, only signals transmitted and received between the driver circuit 61, the first heat reduction circuit 2J1, and between the source driver 6J3, the display unit 5, and the gate driver 7J1 are indicated.

Since the first heat detecting circuit 1J1 is incorporated into the source driver in Embodiments 1 to 4, the image data is loaded as the latch signals Q1_1 to L, and the latch signals Q2_1 to L. However, the image data is originally issued by the timing controller, and the image data is held in the memory in the timing controller. Accordingly, there is no problem in loading the image data by the first heat detecting circuit 1J1.

Accordingly, the first heat detecting circuit 1J1 can compute the amount of heat generated at the source driver 6J5 even when the first heat detecting circuit 1J1 is incorporated in the timing controller 8J5. The same also applies to the timing signals such as the frame pulse signals FP and the line pulse signals LP, and thus it is possible to control the source driver 6J5 and the gate driver 7J1.

The first heat detecting circuit 1J1 incorporated in the timing controller 8J5 computes the amount of heat generated at the source driver 6J5 from the image data held in the timing controller 8J5. Subsequently, when the calculated amount of generated heat is equal to or higher than the predetermined reference value, the first heat detecting circuit 1J1 outputs the heat detection signal.

More specifically, the first heat detecting circuit 1J1 determines whether or not the calculated amount of generated heat exceeds one or more set levels. More specifically, the first heat detecting circuit 1J1 includes one of more set levels which are one or more reference values, and determines whether or not the calculated amount of generated heat exceeds which one of the set levels.

The first heat detecting circuit 1J1 then outputs the heat detection signal according to the set level at which the amount of generated heat exceeds. More specifically, the third heat detecting circuit 1J1 outputs, an odd-column charge sharing enable signal CSEN_O, and an even-column charge sharing enable signal CSEN_E to the first heat reduction circuit 2J1 and an output enable signal OEV to the driver circuit 61 and the gate driver 7J1, as the heat detection signals according to the level of the detected amount of generated heat.

Note that, in the same manner as Embodiments 1 to 4, the charge sharing is performed as the first step of heat reduction method, and the control for changing the display driving method from the progressive driving to the interlaced driving or the frame thinning driving is performed as the second step of heat reduction method. As such, the present invention can be applied to a case in which the heat detecting circuit is incorporated in the timing controller.

Furthermore, in Embodiments 1 to 4, the timing controller sends the data to be thinned to the source driver even when the display driving method is changed. However, in Embodiment 5, it is not necessary to send the data to be thinned in the first place. By not sending the data to be thinned by the control of the timing controller, the amount of image data transfer to the source driver is reduced, allowing further reduction in the heat generated at the source driver.

Note on Variation of Embodiment 5

Incorporating the heat detecting circuit into the timing controller is applicable, not only to Embodiment 1, but also to Embodiments 2 to 4.

Note that, in Embodiment 5, the description is made using the display apparatus as an example. However, the present invention can also be implemented as a driving circuit for display apparatus. For example, the display apparatus driving circuit according to Embodiment 5 includes the source driver 6J5 and the gate driver 8J5.

Effects of Embodiment 5

As described above, the display apparatus and the display apparatus driving circuit in Embodiment 5 includes a heat detecting circuit which detects the amount of heat generated at the source driver, and determines whether or not the detected amount of generated heat exceeds one or more set reference values, in the same manner as Embodiments 1 to 4. After that, the display apparatus and the display apparatus driving circuit according to Embodiment 5 changes the display driving method to reduce the amount of generated heat according to the level of the detected amount of generated heat, that is, according to the magnitude relationship between the detected amount of generated heat and the reference value.

Furthermore, the display apparatus and the display apparatus driving circuit according to Embodiment 5 do not have to send the image data to be thinned to the source driver when changing the display driving method by incorporating the heat detecting circuit in the timing controller. With this, it is possible to reduce the amount of image data transfer to the source driver, to further reduce the amount of heat generated at the source driver.

With this, the display apparatus and the display apparatus driving circuit according to Embodiment 5 can effectively reduce the amount of heat generated at the source driver.

More specifically, in the still image determined to have small amount of generated heat, the display driving method is not switched. In addition, continuing real-time heat detection allows suppressing the degradation in the image quality as much as possible without unnecessarily switching the display driving method.

Therefore, Embodiment 5 is applicable to a high-quality display panel. Furthermore, since it is possible to suppress the amount of generated heat, it is possible to increase the number of output buffers for one source driver, or a heat radiating sheet is not necessary. As a result, it is possible to reduce the set cost.

Embodiment 6

Embodiment 6 shall describe an application example of the present invention to in the case where the heat detecting circuit is not incorporated into the source driver and the timing controller for some reason. Although Embodiment 5 is applicable to all of Embodiments 1 to 4, the following description includes only an example applied to Embodiment 1.

Figure 37:
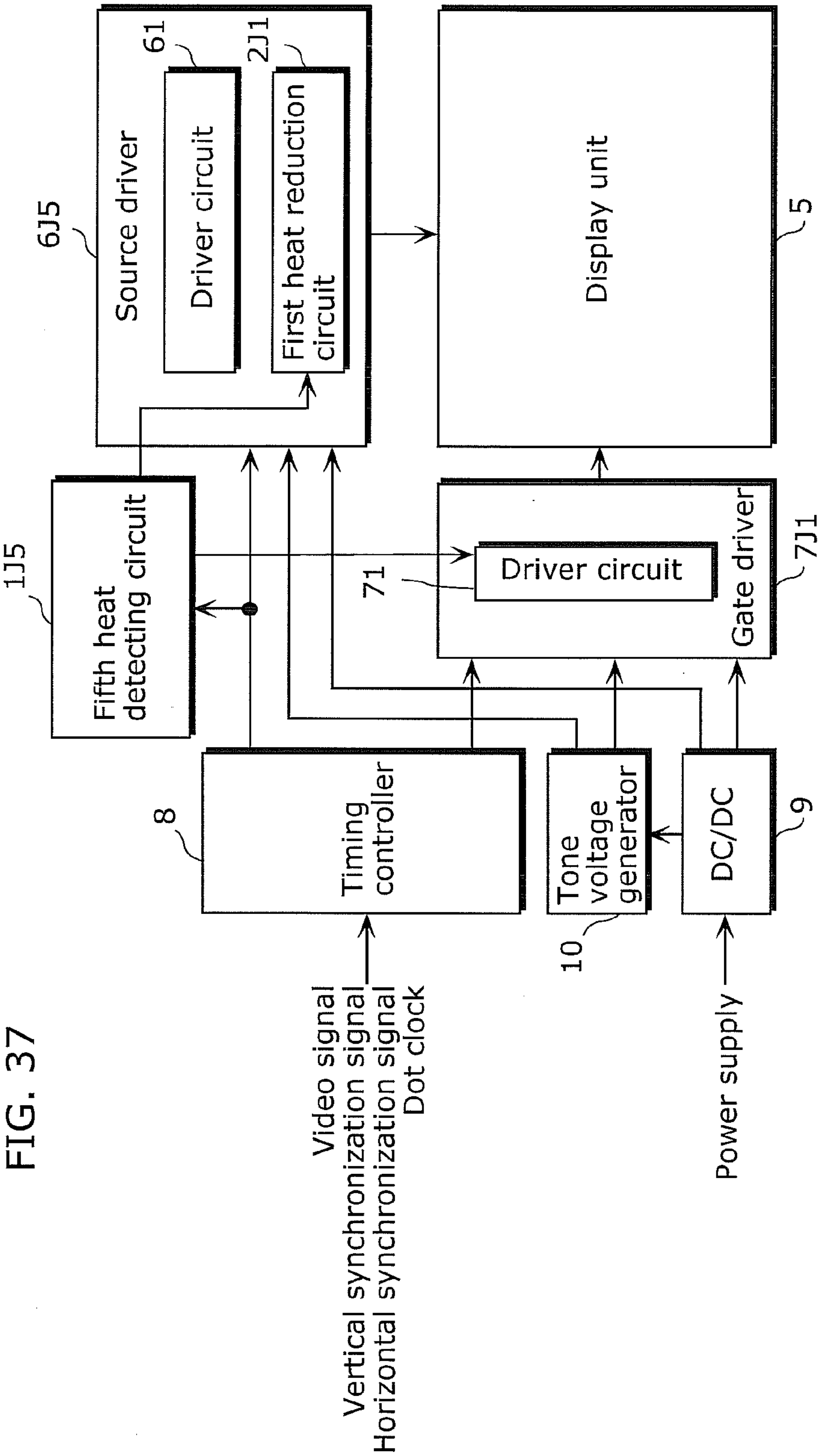
FIG. 37 illustrates an example of block configuration of a display apparatus according to Embodiment 6.

FIG. 37 illustrates an example of block configuration of the display apparatus according to Embodiment 6. The difference from the display apparatus according to Embodiment 1 is that the source driver 6J1 is replaced with the source driver 6J5, and a fifth heat detecting circuit 1J5 is added to the display apparatus.

The difference of the source driver 6J5 from the source driver 6J1 is that the first heat detecting circuit 1J1 is not included. In other words, the change in the configuration from Embodiment 1 is that the first heat detecting circuit 1J1 in the source driver is moved to outside of the source driver.

Fifth Heat Detecting Circuit 1J5

The fifth heat detecting circuit 1J5 calculates the amount of heat generated at the source driver 6J5 by loading and holding the image data stream from the timing controller 8 to the source driver 6J5. Subsequently, when the calculated amount of generated heat is equal to or higher than the predetermined reference value, the fifth heat detecting circuit 1J5 outputs the heat detection signal.

More specifically, the fifth heat detecting circuit 1J5 determines whether or not the calculated amount of generated heat exceeds one or more set levels. More specifically, the fifth heat detecting circuit 1J5 includes one or more set levels which are one or more reference values, and determines whether or not the calculated amount of generated heat exceeds which one of the set levels.

The fifth heat detecting circuit 1J5 then outputs the heat detection signal according to the set level at which the amount of generated heat exceeds. More specifically, the fifth heat detecting circuit 1J5 outputs, an odd-column charge sharing enable signal CSEN_O, and an even-column charge sharing enable signal CSEN_E to the first heat reduction circuit 2J1 and an output enable signal OEV to the driver circuit 61 and the gate driver 7J1, as the heat detection signals according to the level of the detected amount of generated heat.

Note that, in the same manner as Embodiments 1 to 5, the charge sharing is performed as the first step of heat reduction method, and the control for changing the display driving method from the progressive driving to the interlaced driving or the frame thinning driving is performed as the second step of heat reduction method.

Detailed Description of Fifth Heat Detecting Circuit 1J5

Figure 38:
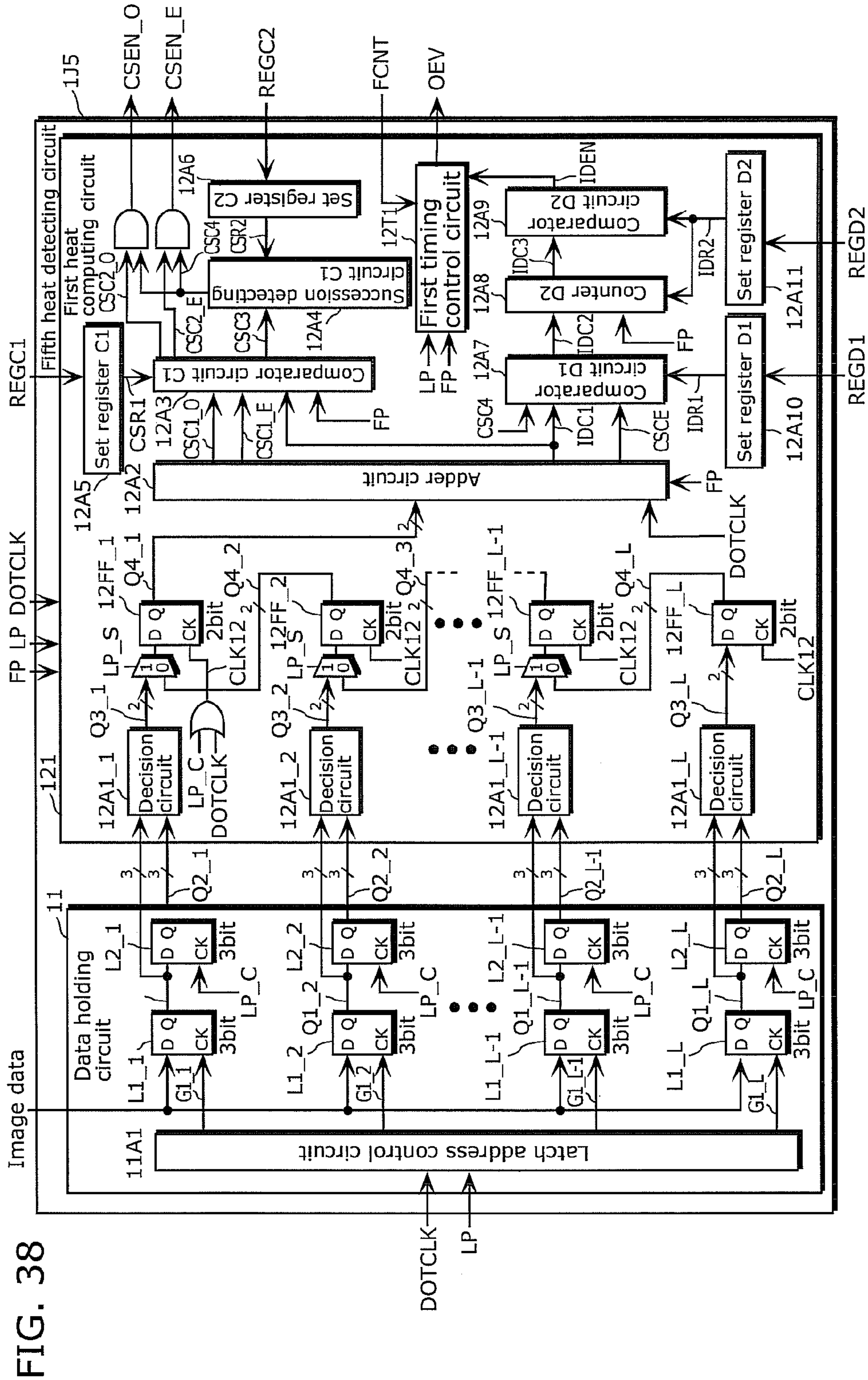
FIG. 38 illustrates a schematic configuration of a fifth heat detecting circuit according to Embodiment 6.

FIG. 38 illustrates an example of schematic configuration of the fifth heat detecting circuit 1J5 according to Embodiment 5. The difference from the first heat detecting circuit 1J1 is that a data holding circuit 11 is added. More specifically, the fifth heat detecting circuit 1J5 includes a first heat computing circuit 121 and the data holding circuit 11.

Note that, the driving circuit 61 includes the first latch group and the second latch group holding the image data. Accordingly, in Embodiment 1, the amount of heat generated at the source driver 6J1 can be calculated simply by loading the latch signals Q1_1 to Q1_L and the latch signals Q2_1 to Q2_L.

However, in Embodiment 6, the fifth heat detecting circuit 1J5 is outside of the source driver 6J5. Accordingly, it is necessary for the fifth heat detecting circuit 1J5 to have a data holding circuit 11 for holding the image data.

The following is the description for the data holding circuit 11. The data holding circuit 11 includes a latch address control circuit 11A1, the first latch group L1_1 to L1_L, and the second latch group L2_1 to L2_L. This is a configuration for generating signals identical to the latch signals Q1_1 to Q1_L output from the driving circuit 61.

The latch address control circuit 11A1 outputs, from the line pulse signal LP and the dot clock signal DOTCLK, latch enable signals G1_1 to G1_L for the first latch group L1_1 to L1_L synchronized to the image data transmitted from the timing controller 8. The latch group L1_1 to L1_L which received the image data and the latch enable signal G1_1 to G1_L sequentially loads and holds the image data for one row corresponding to the output channels.

At the timing before the rise of the next line pulse signal LP and the update of the image data for next row by the timing controller 8, the second latch group L2_1 to L2_L loads the latch signals Q1_1 to Q1_L to the second latch group all at once, and outputs the latch signals Q2_1 to Q2_L. As such, the data holding circuit 11 can generate signals identical to the latch signals Q1_1 to Q1_L and the latch signals Q2_1 to Q2_L output from the driving circuit 61. Here, as described in the description for the driving circuit 61 according to Embodiment 1, the latch signals Q1_1 to Q1_L, and the latch signals Q2_1 to Q2_L each has a width of 3 bits.

The first heat computing circuit 121 in the data holding circuit 11 or after is as described above. Accordingly, the fifth heat detecting circuit 1J5 can calculate the amount of heat generated at the source driver 6J5.

As described above, the present invention is applicable to a case in which the heat detecting circuit is not incorporated into the source driver and the timing controller for some reason.

Note on Variation of Embodiment 6

As described in Embodiment 1, the present invention can be implemented even if the source driver and the timing controller do not incorporate the heat detecting circuit. The same can be applied to Embodiments 2 to 4 in the present invention.

Note that, in Embodiment 6, the description is made using the display apparatus as an example. However, the present invention can also be implemented as a display apparatus driving circuit. For example, the display apparatus driving circuit according to Embodiment 6 includes a source driver 6J4 and a fifth heat detecting circuit 1J5.

Effects of Embodiment 6

As described above, in the display apparatus and the display apparatus driving circuit according to Embodiment 6, the heat detecting circuit is not incorporated in neither of the source driver nor the timing controller, and is provided separately.

According to the display apparatus and the display apparatus driving circuit according to Embodiment 6 includes, in the same manner as Embodiments 1 to 5, a heat detecting circuit which detects the amount of heat generated at the source driver, and determines whether or not the detected amount of generated heat exceeds one or more set reference values. After that, the display apparatus and the display apparatus driving circuit according to Embodiment 6 change the display driving method to reduce the amount of generated heat according to the level of the detected amount of generated heat, that is, according to the magnitude relationship between the detected amount of generated heat and the reference value.

Furthermore, the same effect as Embodiment 1 can be achieved even when the heat detecting circuit is not incorporated into the source driver and the timing controller for some reason.

With this, the display apparatus and the display apparatus driving circuit according to Embodiment 6 can effectively reduce the amount of heat generated at the source driver. More specifically, in the still image determined to have small amount of generated heat, the display driving method is not switched. In addition, continuing real-time heat detection allows suppressing the degradation in the image quality as much as possible without unnecessarily switching the display driving method.

Therefore, Embodiment 6 is applicable to a high-quality display panel. Furthermore, since it is possible to suppress the amount of generated heat, it is possible to increase the number of output buffers for one source driver, or a heat radiating sheet is not necessary. As a result, it is possible to reduce the set cost.

Embodiment 7

Embodiment 7 shall describe an application example of the present invention to a case in which the heat detecting circuit is implemented as an analog circuit using the bandgap characteristics. More specifically, in Embodiment 1 to 6, the value estimated using the image data is used as the generated heat amount. In contrast, in Embodiment 7, a temperature actually measured using a temperature measuring circuit is used as the generated heat amount. Although Embodiment 7 is applicable to all of Embodiments 1 to 4, the following description includes only an example applied to Embodiment 1.

Figure 39:
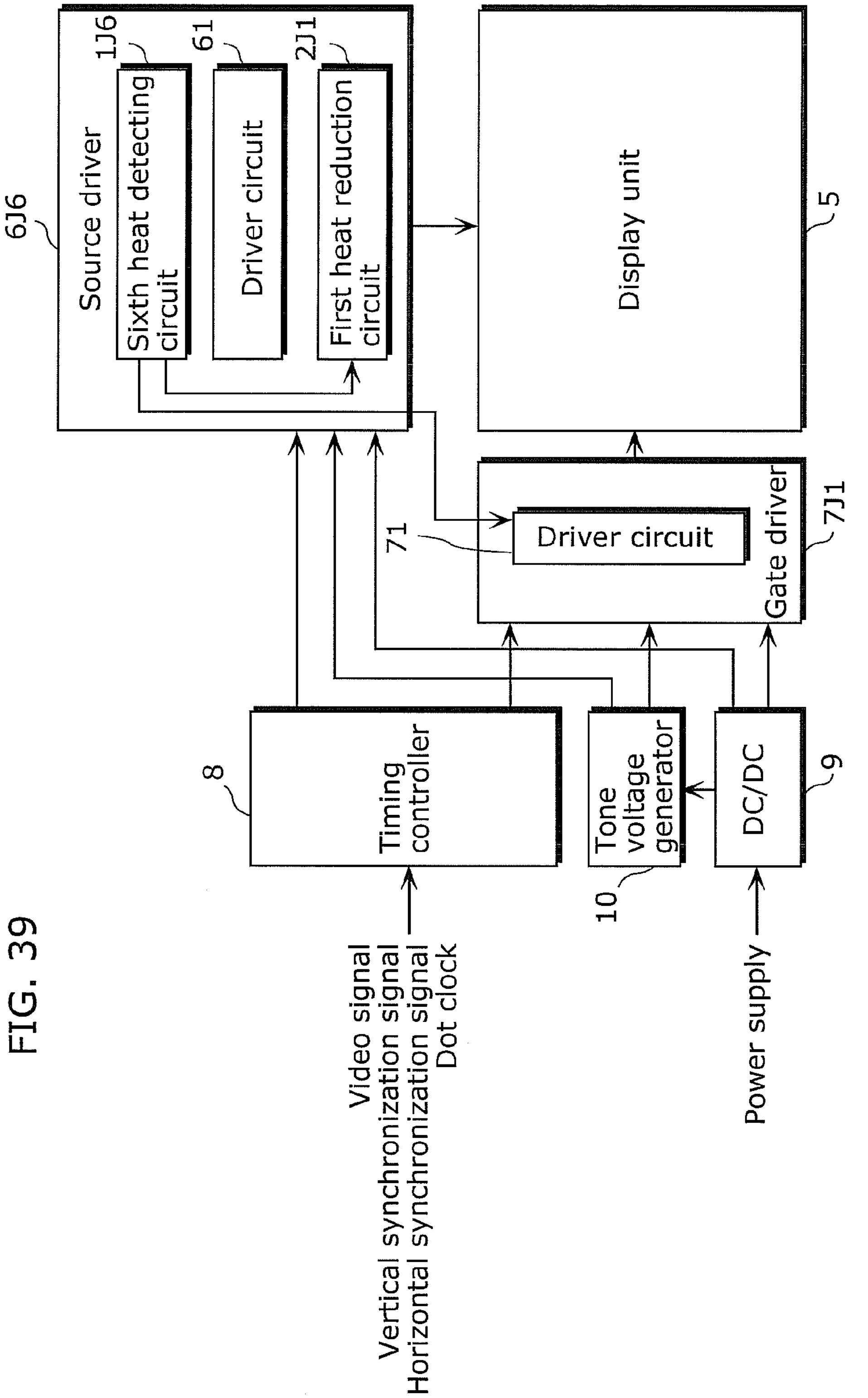
FIG. 39 illustrates an example of block configuration of a display apparatus according to Embodiment 7.

FIG. 39 illustrates an example of block configuration of the display apparatus according to Embodiment 7. The difference from the display apparatus according to Embodiment 1 is that the source driver 6J1 is replaced with the source driver 6J6.

Figure 40:
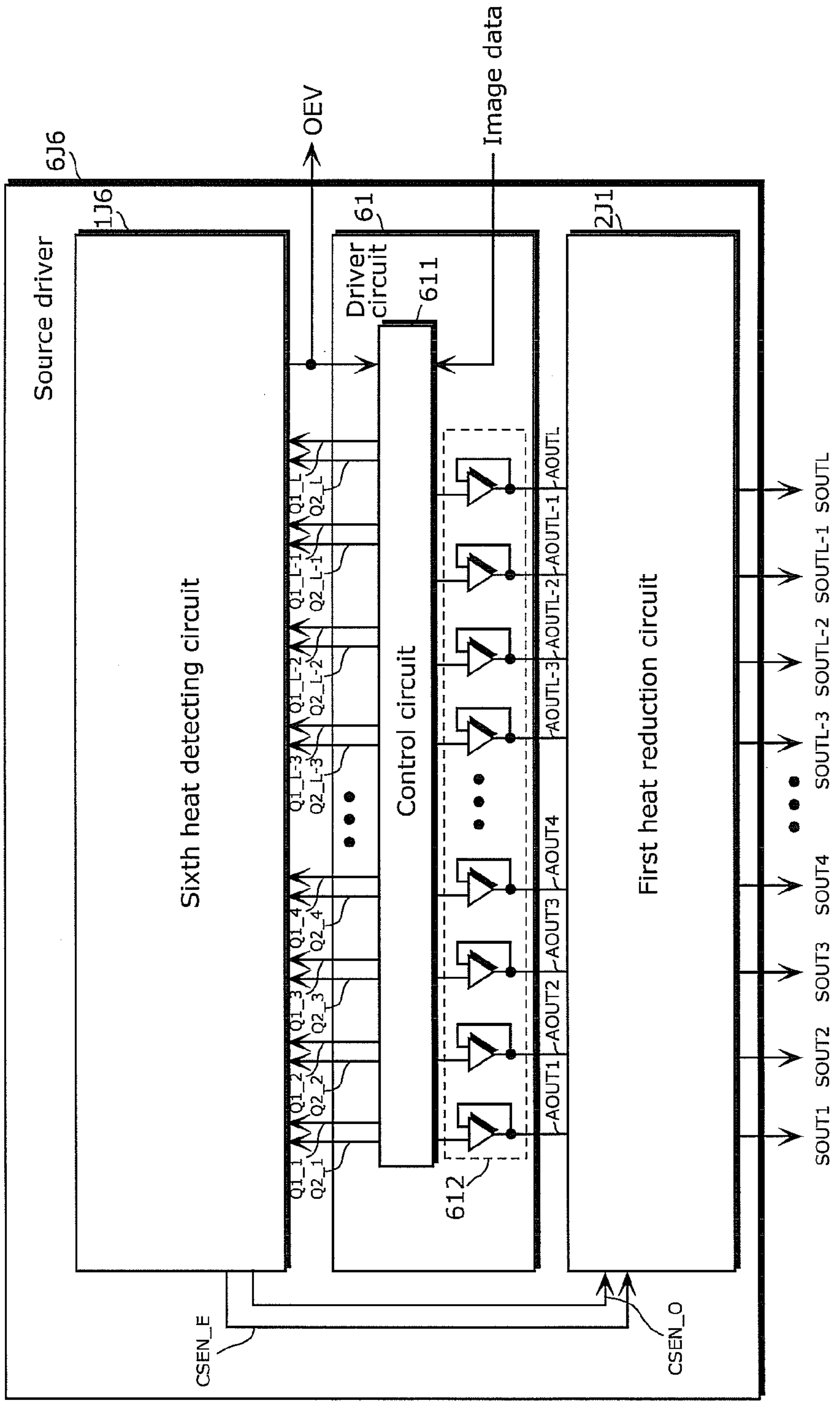
FIG. 40 illustrates an example of schematic configuration of a source driver according to Embodiment 7.

FIG. 40 illustrates a schematic configuration of the source driver 6J6 according to Embodiment 7. The source driver 6J6 includes L output channel, a driver circuit 61, a sixth heat detecting circuit 1J6, and a first heat reduction circuit 2J1. For description purpose, only signals transmitted and received between the driver circuit 61, the sixth heat detecting circuit 1J6 and the first heat reduction circuit 2J1, and between the source driver 6J6, the display unit 5, and the gate driver 7J1 are indicated in FIG. 40.

Sixth Heat Detecting Circuit 1J6

The sixth heat detecting circuit 1J6 calculates the amount of heat generated at the source driver 6J6 from the latch signals Q1_1 to Q1_L and the latch signals Q2_1 to Q2_L output from the driver circuit 61. Subsequently, when the calculated amount of generated heat is equal to or higher than the predetermined reference value, the sixth heat detecting circuit 1J6 outputs the heat detection signal.

More specifically, the sixth heat detecting circuit 1J6 determines whether or not the calculated amount of generated heat exceeds one or more set levels. More specifically, the sixth heat detecting circuit 1J6 includes one or more set levels which are one or more reference values, and determines whether or not the calculated amount of generated heat exceeds which one of the set levels.

The sixth heat detecting circuit 1J6 then outputs the heat detection signal according to the set level at which the amount of generated heat exceeds. More specifically, the sixth heat detecting circuit 1J6 outputs, an odd-column charge sharing enable signal CSEN_O, and an even-column charge sharing enable signal CSEN_E to the first heat reduction circuit 2J1, as the heat detection signals according to the level of the detected amount of generated heat.

The sixth heat detecting circuit 1J6 determines whether or not the source driver 6J6 exceeds one or more reference temperature by a first temperature sensor circuit 13 (see FIG. 41) included by the sixth heat detecting circuit 1J6. Subsequently, the sixth heat detecting circuit 1J6 outputs, according to a level of the detected temperature, the output enable signal OEV to the driver circuit 61 and the gate driver 7J1 as the heat detection signal.

The sixth heat detecting circuit 1J6 performs the charge sharing as the first step of the heat reduction method by detecting heat at a digital circuit generating the odd-column charge sharing enable signal CSEN_O and the even-column charge sharing enable signal CSEN_E described in Embodiment 1 for the description of the first heat detecting circuit 1J1. Furthermore, the sixth heat detecting circuit 1J6 performs control for changing the display driving method from the progressive driving to the interlaced driving or to the frame thinning driving as the second step of the heat reduction method by the first temperature sensor circuit 13.

Detailed Description of Sixth Heat Detecting Circuit 1J6

Figure 41:
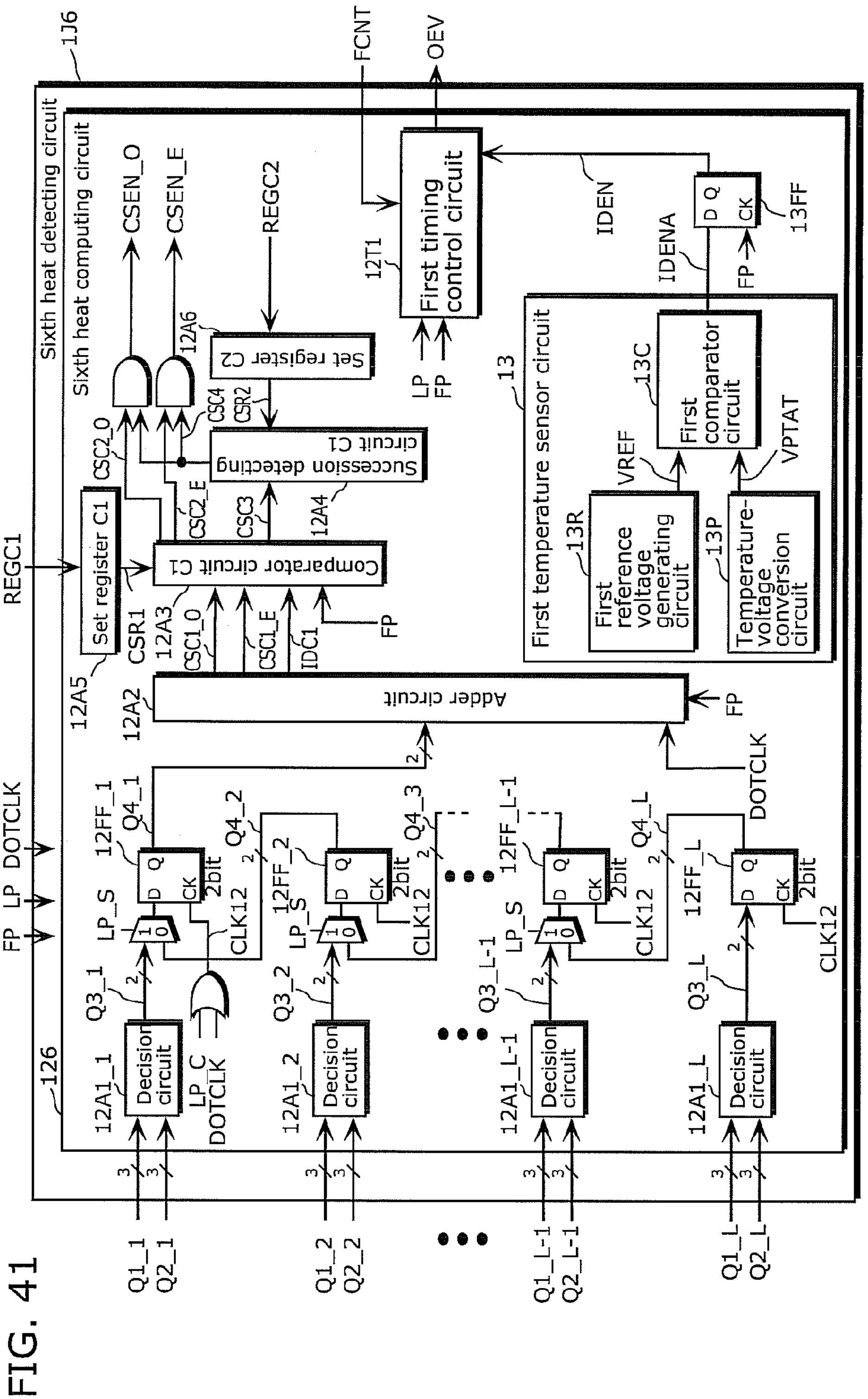
FIG. 41 illustrates a schematic configuration of a sixth heat detecting circuit 1J6 according to Embodiment 7.

FIG. 41 illustrates an example of schematic configuration of the sixth heat detecting circuit 1J6 according to Embodiment 7. The sixth heat detecting circuit 1J6 includes a sixth heat computing circuit 126. The difference from the first heat detecting circuit 1J1 is that a part of the circuit generating the driving method change enable signal IDEN by the comparator circuit D1 (second comparator circuit 12A7), a counter D2 (counter 12A8), the comparator circuit D2 (third comparator circuit 12A9), the set register D1 (third set register 12A10), and the set register D2 (fourth set register 12A11) is replaced with the first sensor circuit 13 configured with an analog circuit and a flip-flop 13FF.

The first temperature sensor circuit 13 shall be described. As illustrated in FIG. 41, the first temperature sensor circuit 13 includes a first reference voltage generating circuit 13R, a temperature-voltage conversion circuit 13P, and a first comparator circuit 13C.

The first reference voltage generating circuit 13R is an example of a reference circuit, and generates a reference voltage corresponding to a reference temperature using bandgap characteristics. The first reference voltage generating circuit 13R is a general reference voltage generating circuit using bandgap characteristics. The first reference voltage generating circuit 13R outputs a reference voltage signal VREF having characteristics not dependent on the output temperature. Here, the voltage value of the reference voltage signal VREF is a voltage value corresponding to a set reference temperature detecting the second step of the heat reduction method.

The temperature-voltage conversion circuit 13P is a voltage generating circuit using the bandgap characteristics (illustrated in FIG. 43, and shall be described later). The temperature-voltage conversion circuit 13P outputs a temperature proportional voltage signal VPTAT having characteristics proportional to temperature. In other words, the temperature-voltage conversion circuit 13P is an example of temperature measuring circuit, and measures a temperature which is an amount of heat generated at the source driver 6J6. Subsequently, the temperature-voltage conversion circuit 13P outputs the measured temperature as a temperature proportional voltage signal VPTAT (measured voltage). The temperature proportional voltage signal VPTAT is a signal representing a voltage level corresponding to a measured temperature.

The first comparator circuit 13C is a general comparator. The first comparator circuit 13C compares a reference voltage signal VREF (reference voltage) and the temperature proportional voltage signal VPTAT (measured voltage). Subsequently, the first comparator circuit 13C outputs H driving method enable signal IDENA when the temperature proportional voltage signal VPTAT is higher than the reference voltage signal VREF, and outputs L driving method enable signal IDENA when VPTAT is lower than VREF.

Note that, in order to synchronize the driving method change enable signal IDENA with the frame pulse signal FP, the driving method change enable signal IDENA is input to the D terminal of the flip-flop 13FF which received the frame pulse signal FP at the clock terminal. Subsequently, the flip-flop 13FF outputs the driving method enable signal IDEN to the first timing control circuit 12T1.

Figure 42:
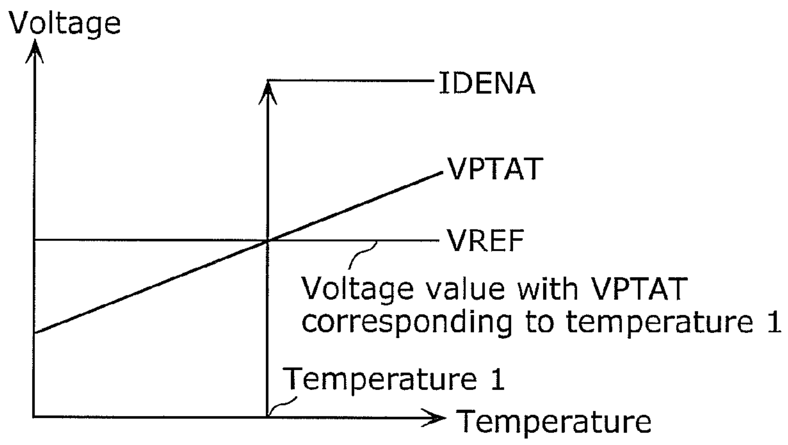
FIG. 42 illustrates an example of temperature-voltage relationship of a first temperature sensor circuit according to Embodiment 7.

FIG. 42 is a chart illustrating an example of a relationship between temperature and voltage in the first temperature sensor circuit 13, according to Embodiment 7. The horizontal axis denotes temperature, and the vertical axis denotes voltage, and “Temperature 1” indicates a reference temperature for detecting the second step of the heat reduction method. The reference voltage signal VREF is a voltage value at which the temperature proportional voltage signal VPTAT corresponds to Temperature 1, and is not dependent on temperature.

The temperature proportional voltage signal VPTAT has a property proportional to temperature. At “Temperature 1” where the temperature proportional voltage signal VPTAT exceeds the reference voltage signal VREF, the first comparator circuit 13C changes the driving method change enable signal IDENA to transition from L to H.

More specifically, the first comparator circuit 13C is an example of the temperature comparison circuit, and compares a measured temperature which is an example of the amount of heat generated at the source driver 6J6, and a reference temperature which is an example of the reference value. When the measured temperature is equal to or higher than a reference temperature, the first comparator circuit 13C outputs the driving method change enable signal IDENA as the heat detection signal.

With the configuration described above, the display apparatus according to Embodiment 7 determines whether or not the source driver 6J6 exceeds one or more set reference temperature.

Subsequently, according to a level of the detected temperature, the output enable signal OEV can be output to the driving circuit 61 and the gate driver 7J1 as the heat detection signal.

Temperature-voltage Conversion Circuit 13P

Figure 43:
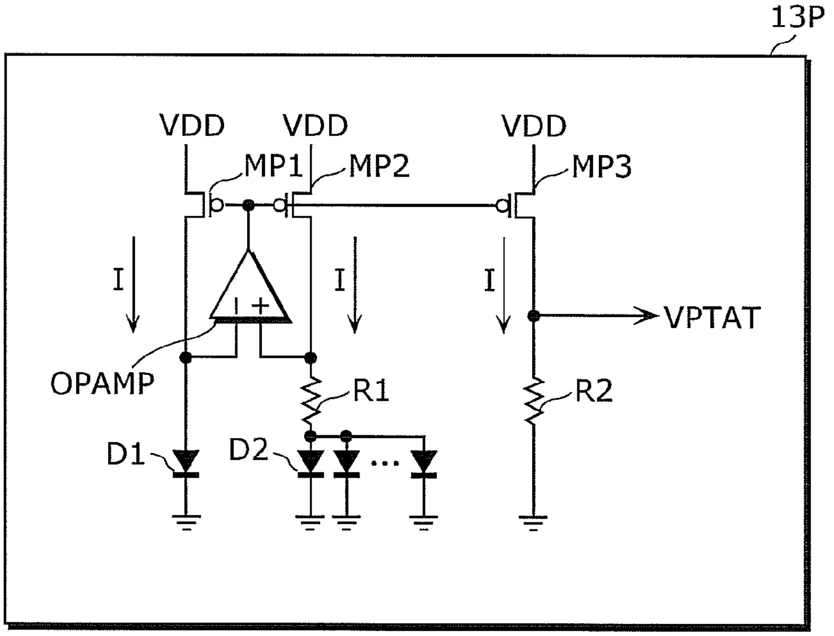
FIG. 43 illustrates a schematic configuration of a temperature-voltage conversion circuit according to Embodiment 7.

FIG. 43 illustrates an example of schematic configuration of the temperature-voltage conversion circuit 13P according to Embodiment 7.

The example of voltage generating circuit in Non-Patent Literature 1 (G. A. Rincon-Mora “Voltage References: From Diodes to Precision High-Order Bandgap Circuits”, IEEE Press, John Wiley & Sons Inc., p. 28, 2002) is applied to the temperature-voltage conversion circuit 13P. The temperature-voltage conversion circuit 13P in FIG. 43 is a circuit generating current proportional to an absolute temperature using a bandgap voltage of PN junction (referred to as Proportional to Absolute Temperature (PTAT) current source circuit).

In FIG. 43, the current flowing P-channel MOS transistors (hereafter referred to as PMOS transistors) MP1, MP2, and MP3 are equal due to a mirror effect. Furthermore, the input voltage of the operational amplifier OPAMP has the same potential on a non-inverted input side (+) and an inverted input side (−). Accordingly, in the temperature-voltage conversion circuit 13P illustrated in FIG. 43, the output current I flowing in the PMOS transistor M3 can be denoted as the following equation (1).

$$I=(1/R1)\times\ln(j)\times U\times T \quad (1)$$

Here, j denotes a ratio of the number of the diodes D1 and D2, and ln(j) denotes logarithm natural of j. U×T denotes a thermal potential kT/q (that is, K=k/q), k and q denote Boltzmann coefficient and unit charge, and T denotes the absolute temperature. Passing the output current I through a resistor R2 connected to a source side of the PMOS transistor M3 illustrated in FIG. 43 allows the representation of the output voltage VPTAT by the following equation (2) since ln(j)×U=G.

$$VPTAT=(R2/R1)\times G\times T \quad (2)$$

More specifically, the output voltage VPTAT is a voltage corresponding to the absolute temperature T.

As described above, the present invention can be applied to a case in which the circuit which detects the second step of heat reduction method is implemented as the analog circuit using the bandgap characteristics.

In Embodiment 1, the display driving method is changed as the second step of the heat reduction method when the frames in which the generated heat amount reference value in the second time-series continuously exceed. In contrast, in Embodiment 7, the determination as to whether the display driving method should be changed as the second step of the heat reduction method is made by detecting the actual temperature of the source driver 6J6, and by comparing the measured temperature with a set reference temperature.

The former is not affected by the process change in the semiconductor fabrication process, but the determination is made merely on the computation and estimation from the image data, and does not take factors other than the part after the buffer unit of the source driver. Accordingly, although it is possible to narrow down the generated heat amount reference value by on the specification of the display device, it is very time-consuming.

The latter can make a determination using an actual temperature to which the factors other than the amount of generated heat after the buffer unit of the source driver 6J6; however, it is affected by the process change in the semiconductor fabrication process. Either of them more suitable for the display apparatus may be selected.

Note that, in Embodiment 7, the description is made using the display apparatus as an example. However, the present invention can also be implemented as a driving circuit for display apparatus. For example, the display apparatus driving circuit according to Embodiment 7 includes the source driver 6J6.

Effects of Embodiment 7

As described above, the display apparatus and the display apparatus driving circuit in Embodiment 7 include a heat detecting circuit which detects the amount of heat generated at the source driver, and determines whether or not the detected amount of generated heat exceeds one or more set reference values, in the same manner as Embodiments 1 to 6. After that, the display apparatus and the display apparatus driving circuit according to Embodiment 7 changes the display driving method to reduce the amount of generated heat according to the level of the detected amount of generated heat, that is, according to the magnitude relationship between the detected amount of generated heat and the reference value.

Furthermore, the display apparatus and the display apparatus driving circuit according to Embodiment 7 can add the factors other than the heat generated by discharging power from the output buffer unit in the source driver 6J6 and after instead of an estimation by the computation of the image data upon changing the display driving method, and allows a control based on an actual temperature.

With this, the display apparatus and the display apparatus driving circuit according to Embodiment 7 can effectively reduce the amount of heat generated at the source driver. More specifically, in the still image determined to have small amount of generated heat, the display driving method is not switched. In addition, continuing real-time heat detection allows suppressing the degradation in the image quality as much as possible without unnecessarily switching the display driving method.

Therefore, Embodiment 7 is applicable to a high-quality display panel. Furthermore, since it is possible to suppress the amount of generated heat, it is possible to increase the number of output buffers for one source driver, or a heat radiating sheet is not necessary. As a result, it is possible to reduce the set cost.

Note on Variation of Embodiment 7

Implementing the heat detecting circuit by an analog circuit using bandgap characteristics is applicable to Embodiments 1 to 4.

The sixth heat detecting circuit 1J6 detects the heat for one step. However, more detailed control with two or more steps are possible. Furthermore, the order of performing the heat reduction method is not limited to the description above.

Variation of Embodiment 7

Embodiment 7 is an example in which the present invention is applied to a case where the detection of the heat reduction method only in the second step is implemented by the analog circuit utilizing the bandgap characteristics.

In the following variation of Embodiment 7 describes an application example of the present invention in which the detection of the heat reduction method in the first step and the second step is implemented by the analog circuit utilizing bandgap characteristics. Although Embodiment 7 is applicable to all of Embodiments 1 to 4, the following description includes only an example applied to Embodiment 1.

Figure 44:
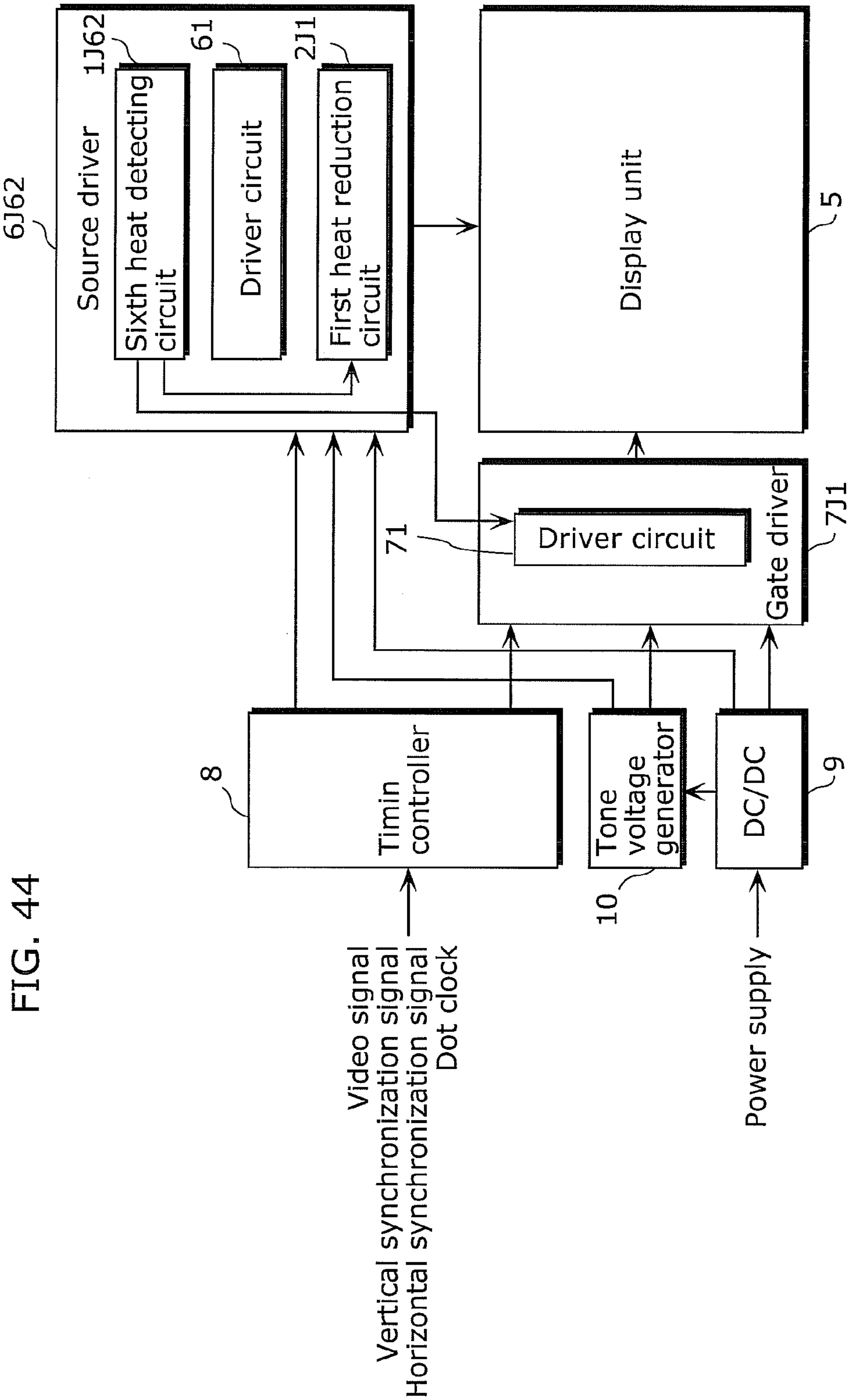
FIG. 44 illustrates an example of block configuration of a display apparatus according to a variation of Embodiment 7.

FIG. 44 illustrates an example of block configuration of the display apparatus according to a variation of Embodiment 7. The difference from the display apparatus according to Embodiment 1 is that the source driver 6J1 is replaced with the source driver 6J62.

Figure 45:
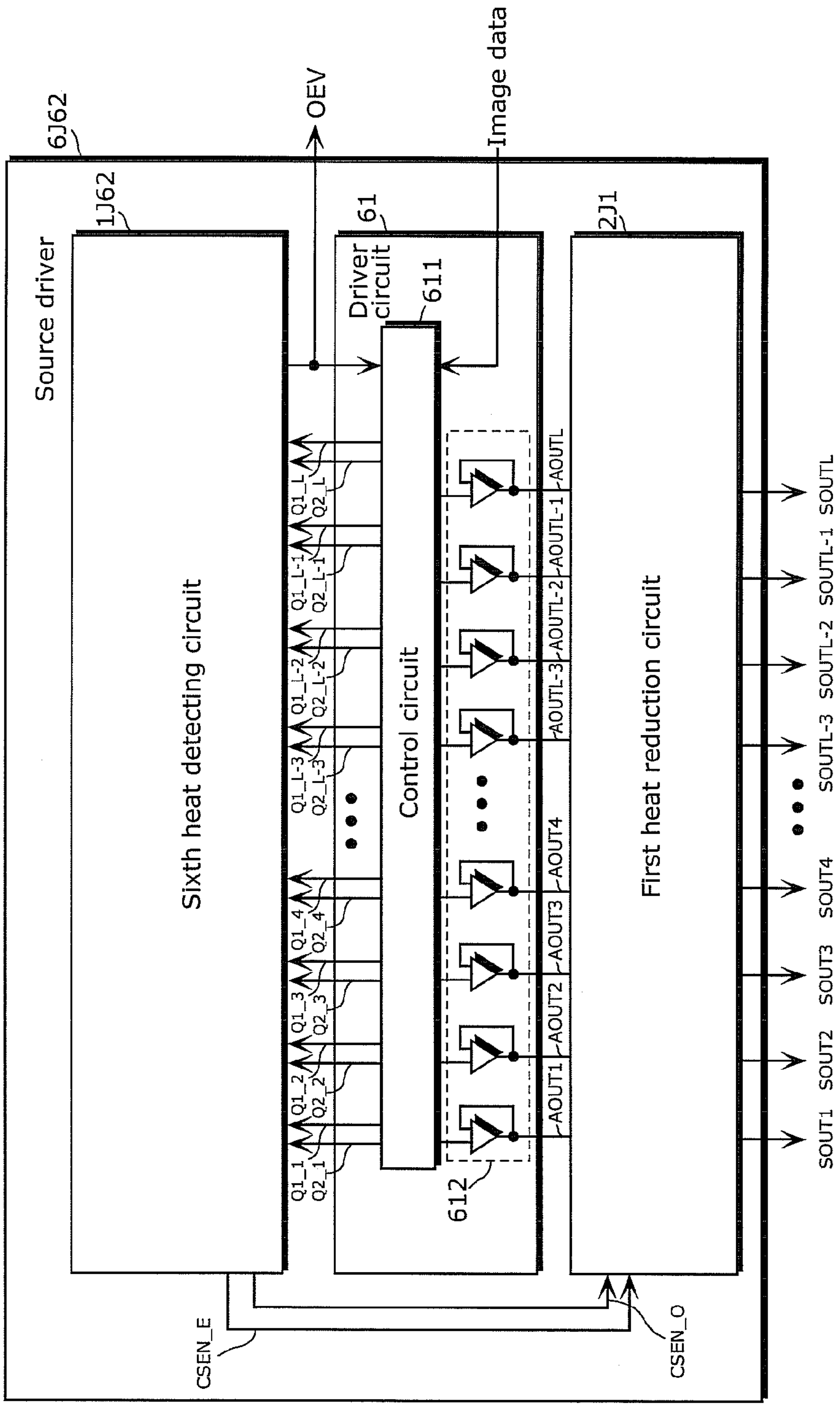
FIG. 45 illustrates an example of schematic configuration of a source driver according to a variation of Embodiment 7.

FIG. 45 illustrates a schematic configuration of the source driver 6J62 according to a variation of Embodiment 7. The source driver 6J62 includes L output channel, a driver circuit 61, a sixth heat detecting circuit 1J62, and a first heat reduction circuit 2J1. For description purpose, only signals transmitted and received between the driver circuit 61, the sixth heat detecting circuit 1J62 and the first heat reduction circuit 2J1, and between the source driver 6J62, the display unit 5, and the gate driver 7J1 are indicated in FIG. 45.

Sixth Heat Detecting Circuit 1J62

The sixth heat detecting circuit 1J62 determines whether or not the source driver 6J62 exceeds one or more reference temperature by a second temperature sensor circuit (see FIG. 46) included by the sixth heat detecting circuit 1J62. More specifically, the sixth heat detecting circuit 1J62 outputs, an odd-column charge sharing enable signal CSEN_O, and an even-column charge sharing enable signal CSEN_E to the first heat reduction circuit 2J1, and outputs the output enable signal OEV to the driver circuit 61 and the gate driver 7J1, as the heat detection signals according to the level of the detected amount of generated heat. The sixth heat detecting circuit 1J62 performs charge sharing as the first step of the heat reduction method, and performs the control for changing the display driving method from the progressive driving to the interlaced driving or frame thinning driving, as the second step of the heat reduction method.

Detailed Description of Sixth Heat Detecting Circuit 1J62

Figure 46:
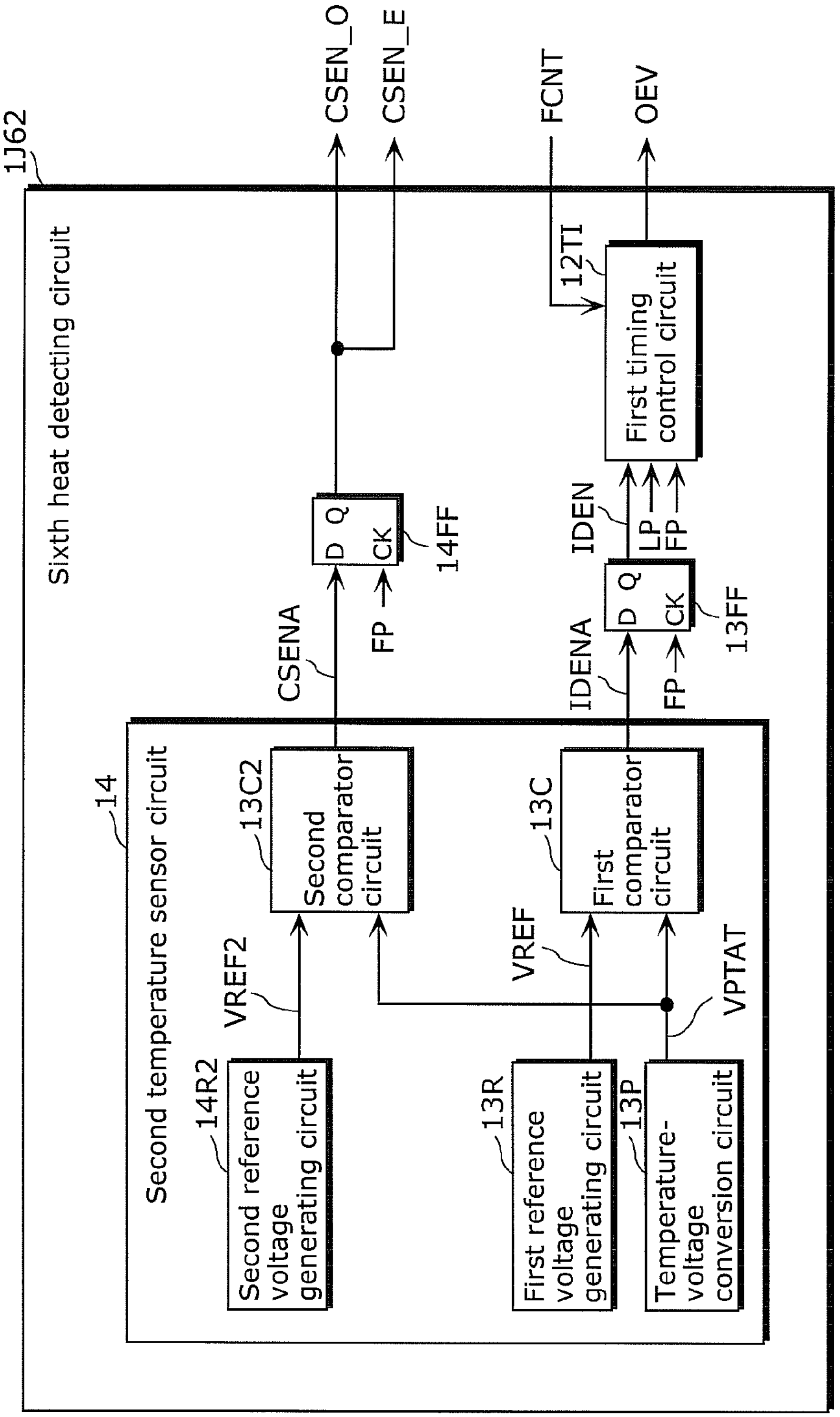
FIG. 46 illustrates an example of a schematic configuration of a sixth heat detecting circuit according to a variation of Embodiment 7.

FIG. 46 illustrates an example of schematic configuration of the sixth heat detecting circuit 1J62 according to Embodiment 7. The difference from the first heat detecting circuit 1J1 is that the first heat computing circuit 121 is replaced with the second temperature sensor circuit 14 configured with an analog circuit, the flip-flop 14FF, the flip-flop 13FF, and the first timing control signal 12T1.

The second temperature sensor circuit 14 shall be described. The difference from the first temperature sensor circuit 13 is that the second reference voltage generating circuit 14R2 and the second comparator circuit 13C2 are added. The method of generating the output enable signal OEV is omitted since the description has been made in Embodiment 7.

The second reference voltage generating circuit 14R2 generates a reference voltage signal VREF2 different from a reference voltage signal VREF set by the first reference voltage generating circuit 13R1. The second comparator circuit 13C2 has the same circuit configuration as the first comparator circuit 13C. The second comparator circuit 13C2 compares the reference voltage signal VREF2 and the temperature proportional voltage signal VPTAT. When the temperature proportional voltage signal VPTAT is higher than the reference voltage signal VREF2, the second comparator circuit 13C2 outputs the charge sharing enable signal CSENA in H, and when VPTAT is lower than the VREF2, the second comparator circuit 13C2 outputs the charge sharing enable signal CSENA in L. Here, a voltage value of the reference voltage signal VREF2 is a voltage value of the temperature proportional voltage VPTAT corresponding to a temperature which is a reference set for detecting the first step of the heat reduction method.

Note that, in order to synchronize the charge sharing enable signal CSENA with the frame pulse signal FP, the charge sharing enable signal CSENA is provided to the D terminal of the flip-flop 14FF as an input, which received an input of the frame pulse signal FP at the clock terminal. Subsequently, the flip-flop 14FF outputs the odd-column charge sharing enables signal CSEN_O and the even-column charge sharing enable signal CSEN_E to the first heat reduction circuit 2J1. Note that, since the second temperature sensor circuit 14 cannot determine whether the charge sharing is performed on the even columns or the odd columns, the charge sharing is performed on the even columns and the odd columns simultaneously.

Figure 47:
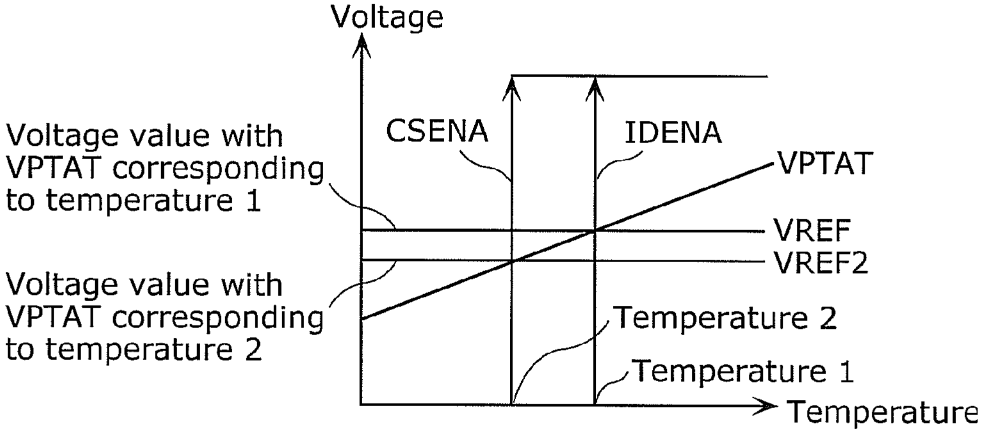
FIG. 47 illustrates an example of a temperature-voltage relationship of a second temperature sensor circuit according to a variation of Embodiment 7.

FIG. 47 is a chart illustrating an example of a relationship between temperature and voltage in the second temperature sensor circuit 14 according to Embodiment 7. The horizontal axis denotes temperature, and the vertical axis denotes voltage, and "Temperature 2" indicates a reference temperature for detecting the first step of the heat reduction method. The reference voltage signal VREF2 is a voltage value at which the temperature proportional voltage signal VPTAT corresponds to "Temperature 2", and is not dependent on temperature.

The temperature proportional voltage signal VPTAT has a property proportional to temperature. At "Temperature 2" at which the temperature proportional voltage signal VPTAT exceeds the reference voltage signal VREF2, the second comparator circuit 13C2 causes the charge sharing enable signal CSENA from L to H.

With the configuration described above, the display apparatus according to Embodiment 7 determines whether or not the source driver 6J62 exceeds one or more set reference temperature. Subsequently, the source driver 6J62 can output the odd-column charge sharing enable signal CSEN_O and the even-column charge sharing enable signal CSEN_E to the heat reduction circuit, and the output enable signal OEV to the driver circuit 61 and the gate driver 7J1, as the heat detection signals according to the level of the detected amount of generated heat.

As described above, the present invention can be applied to a case in which the circuit which detects the first step and the second step of heat reduction method is implemented as the analog circuit using the bandgap characteristics.

In Embodiment 1, the charge sharing is performed when the frame with a value higher than the first generated heat reference value continues. In contrast, in Embodiment 7, the determination as to whether the display driving method should be changed as the second step of the heat reduction method is made by detecting the actual temperature of the source driver 6J62, and by comparing the measured temperature with a set reference temperature.

The former is not affected by the process change in the semiconductor fabrication process, but the determination is made merely on the computation and estimation from the image data, and does not take factors other than the part after the buffer unit of the source driver 6J62 into account. Accordingly, although it is possible to narrow down the generated heat amount reference value in the second time-series by the specification of the display device, it is time-consuming.

The latter can make a determination using an actual temperature to which the factors other than the amount of generated heat after the buffer unit of the source driver 6J62, it is affected by the process change in the semiconductor fabrication process. Either one of them that is more suitable for the display apparatus may be selected.

Although only some exemplary embodiments of the display apparatus driving circuit and the method of driving the display apparatus according to the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Figure 48:
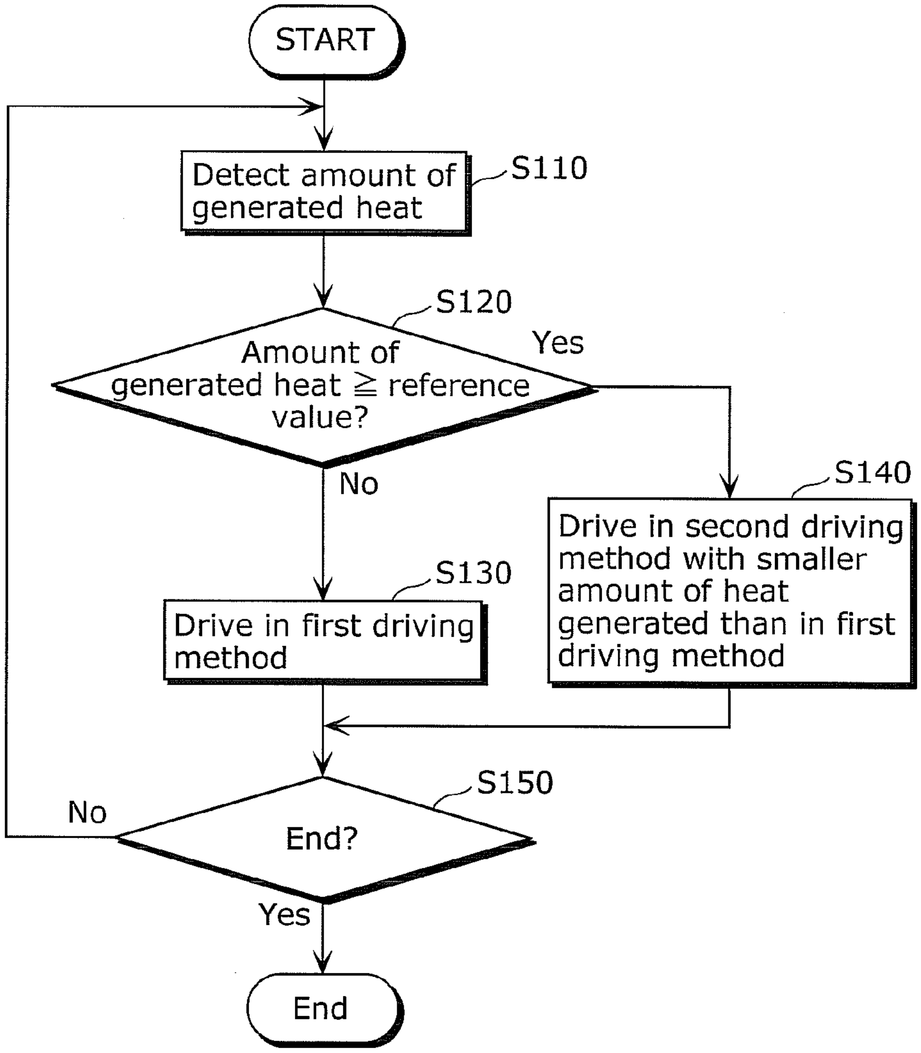
FIG. 48 is a flowchart illustrating an example of a driving method of a display apparatus according to a variation of the present invention.
Figure 49:
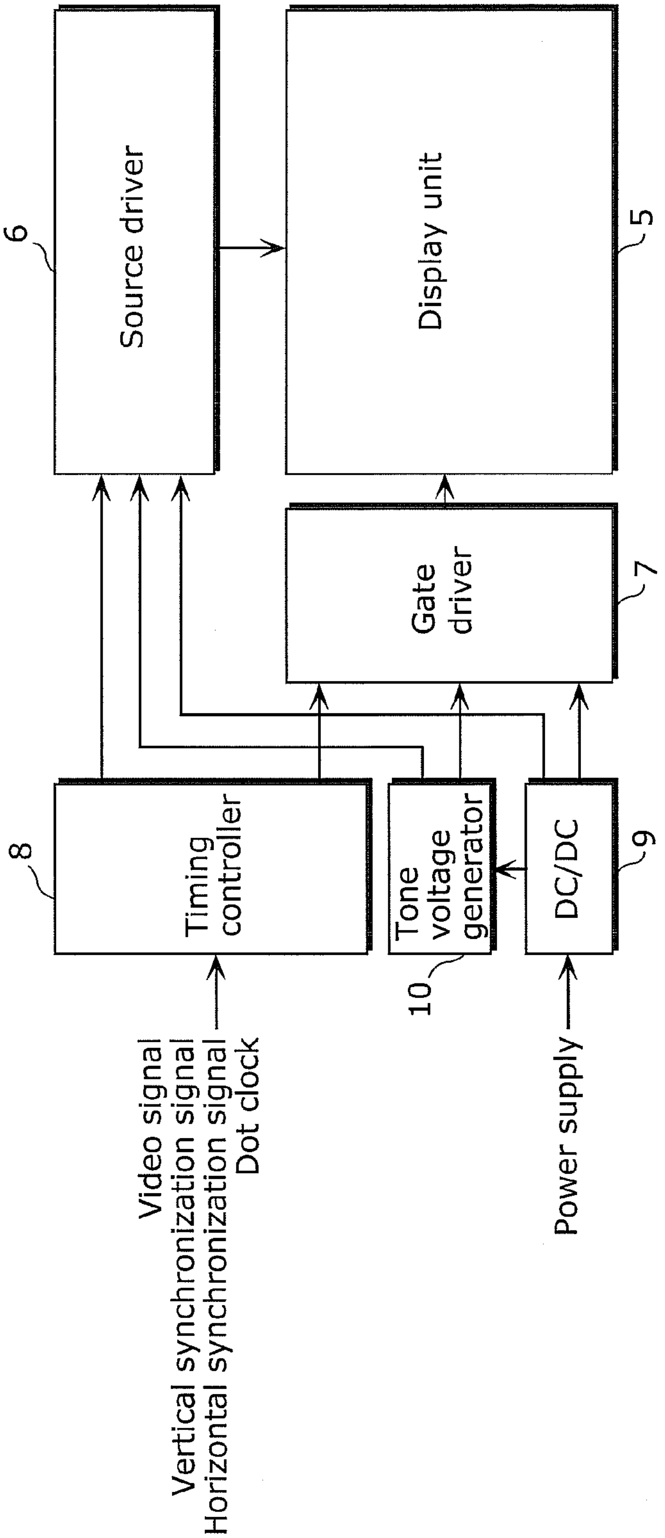
FIG. 49 illustrates a schematic configuration of a conventional display apparatus.

For example, in Embodiments above, the first step of detection for determining whether or not the charge sharing shall be performed and the second step of detection for determining whether or not the driving method shall be changed from the progressive driving to the progressive driving to the interlaced driving or to the frame thinning driving. However, the detection and determination may include only one step. FIG. 48 is a flow chart illustrating an example of the driving method of the display apparatus according to an embodiment of the present invention. Note that, the following description shall be made using Embodiment 1 as an example.

First, the first heat detecting circuit 1J1 detects the amount of heat generated at the source driver 6J1 (S110). For example, the first heat detecting circuit 1J1 receives at least part of the image data on a row basis, compares, among the received image data, first data in row p (p is a natural number), and second data in row p+1 and to detect a value based on the difference between the first data and the second data as the amount of generated heat. In other words, the first heat detecting circuit 1J1 detects a value added by the adder circuit IDC1 (more specifically, a value indicated as the frame heat value signal IDC1) as the amount of generated heat.

Alternatively, the first heat detecting circuit 1J1 may detect the number of successive frames in which the absolute difference between the first data and the second data in one frame exceeds for the number of times equal to or more than the predetermined second threshold as the amount of generated heat. More specifically, the first heat detecting circuit 1J1 may detect the count by the succession detecting circuit C1 as the amount of generated heat.

Alternatively, the first heat detecting circuit 1J1 may detect the count of a counter which is incremented when the absolute difference of the first data and the second data in one frame is larger for the number of times larger than a predetermined second threshold, and is decremented when the number of times is smaller than the second threshold as the amount of generated heat. More specifically, the first heat detecting circuit 1J1 may detect the count by the counter D2 as the amount of generated heat.

Next, the first heat detecting circuit 1J1 determines whether or not the detected amount of generated heat is equal to or larger than the predetermined reference value (S120). Subsequently, when the amount of generated heat is smaller than the reference value (No in S120), the source driver 6J1 and the gate driver 7J1 drive the display unit 5 in the first driving method (S130). For example, the source driver 6J1 and the gate driver 7J1 drive the display unit 5 in the progressive driving without charge sharing.

When the amount of generated heat is equal to or higher than the reference value (Yes in S120), the source driver 6J1 and the gate driver 7J1 drive the display unit 5 in the second driving method which has less amount of generated heat than the first driving method (S140). More specifically, the first heat detecting circuit 1J1 outputs the heat detection signal when the amount of generated heat is equal to or larger than the reference value. When the heat detection signals are received, the source driver 6J1 and the gate driver 7J1 change the method of driving the display unit 5 to reduce the amount of heat generated at the source driver 6J1. As described in Embodiments above, the second driving method includes, for example, the driving methods with charge sharing, interlaced driving, or the frame thinning driving.

For example, the source driver 6J1 changes the driving method from the driving method without charge sharing to the driving method with charge sharing when the heat detection signal is received. Alternatively, the source driver 6J1 and the gate driver 7J1 may change the driving method from the progressive driving to the interlaced driving of the frame thinning driving, when the heat detection signal is received. Alternatively, the source driver 6J1 and the gate driver 7J1 change to a driving method with both charge sharing and the interlaced driving or the frame thinning driving.

The process described above shall be performed until the end of driving the display unit 5 (S150). For example, the process continues until the input of the image data ends.

As such, the driving method of the display apparatus according to the present invention detects the amount of heat generated at the source driver, and compares the detected amount of generated heat and a predetermined reference value. When the detected amount of generated heat is equal to or larger than the reference value, the driving method of the display unit is changed to reduce the amount of heat generated at the source driver. According to a variation of the present invention, regardless of the multiple steps of detection, it is possible to change the driving method to reduce the amount of generated heat with one-step detection.

With this, it is possible to reduce the amount of heat generated at the driving unit, and does not increase the factors for the driving unit and a heat radiating sheet, thereby reducing the set cost.

Furthermore, the display apparatus according to Embodiments includes one gate driver; however, more than one gate drivers may be included. In this case, inputting the common heat detection signal to the gate drivers allows sharing the operations of the gate driver.

Furthermore, the numbers used in the example above are merely examples for specific explanation of the present invention, and the present invention is not limited to the exemplified numbers. Furthermore, the logical levels represented by high (H)/low (L), and the switching state represented by ON/OFF are examples for specifically describing the present invention, and equivalent results may be obtained by a combination of logical levels and switching states different from the examples. Furthermore, the configuration of the logical circuit described above is an example for specifically describing the present invention and the equivalent input/output relationship can be implemented by a logical circuit with different configuration. Furthermore, the connections between components are examples for specifically describing the present invention and the connections for implementing the functions of the present invention are not limited to these examples.

Furthermore, the configuration of the display apparatus is an example for specifically describing the present invention, the display apparatus and the display apparatus driving circuit according to the present invention may not necessarily include all of the configurations. In other words, the display apparatus and the display apparatus driving circuit according to the present invention may include a minimum configuration for achieving the effects of the present invention.

Furthermore, the present invention may be implemented, not only as the display apparatus driving circuit and the method of driving the display apparatus, but also as a program for causing a computer to execute the method of driving the display apparatus according Embodiments. Alternatively, the present invention may be implemented as a recording medium such as a computer readable CD-ROM in which the program is recorded. The present invention may also be implemented as information, data, or a signal for indicating the program. Furthermore, the program, information, data, and signal may be distributed via a communication network such as the Internet.

According to the present invention, part of, or all of the components of the display apparatus driving circuit may be configured with one system Large Scale Integration (LSI). The system LSI is a super-multi function LSI fabricated by integrating multiple components on one chip. More specifically, the system LSI is a computer system configured with a microprocessor, ROM, RAM, and others.

INDUSTRIAL APPLICABILITY

The display apparatus according to the present invention can reduce the factors in the driving unit, that is, can reduce the set cost by reducing the amount of heat generated at the driving unit while suppressing degradation in image quality of the display apparatus, and is applicable to a display apparatus such as a digital television.

What is claimed is:

1. A display apparatus driving circuit comprising:

a source driver for driving a display unit;

a heat detecting circuit for detecting amount of heat generated at said source driver, and outputting a heat detection signal when the detected amount of generated heat is equal to or larger than a predetermined reference value; and a heat reduction circuit for changing, when the heat detection signal is received, a driving method of the display unit to reduce the amount of heat generated at said source driver;

wherein said heat detecting circuit receives at least part of image data on a row basis, compares first data in row p and second data in row p+1 out of the received image data so as to detect a value based on a difference between the first data and the second data as the generated heat amount, where p is a natural number, and detects, as the generated heat amount, the number of successive frames in which absolute differences of the first data and the second data in one frame is larger than a predetermined first threshold for the number of times equal to or larger than a predetermined second threshold.

2. The display apparatus driving circuit according to claim 1, wherein said heat detecting circuit detects s generated heat amount, compares the s generated heat amount with s reference values, and outputs a heat detection signal according to the s generated heat amount, the s reference values, and their magnitude relationship, where s is a natural number, and said heat reduction circuit changes the driving method to a driving method according to a type of the heat detection signal.

3. The display apparatus driving circuit according to claim 1, further comprising a timing controller for controlling a driving timing by said source driver, based on image data, wherein said heat detecting circuit is incorporated in said timing controller.

4. The display apparatus driving circuit according to claim 1, further comprising a gate driver for driving the display unit on a row basis, wherein said gate driver and said source driver change the driving method from a progressive driving to an interlaced driving or a frame thinning driving, when the heat detection signal is received.

5. The display apparatus driving circuit according to claim 3, wherein said heat reduction circuit changes the driving method from a method that does not perform charge sharing to a method that performs charge sharing, when the heat detection signal is received.

6. The display apparatus driving circuit according to claim 5, wherein said heat reduction circuit performs the charge sharing by short-circuiting at least one of (i) odd columns and (ii) even columns.

7. A display apparatus driving circuit comprising:

a source driver for driving a display unit;

a heat detecting circuit for detecting amount of heat generated at said source driver, and outputting a heat detection signal when the detected amount of generated heat is equal to or larger than a predetermined reference value; and a heat reduction circuit for changing, when the heat detection signal is received, a driving method of the display unit to reduce the amount of heat generated at said source driver;

wherein said heat detecting circuit receives at least part of image data on a row basis, compares first data in row p and second data in row p+1 out of the received image data so as to detect a value based on a difference between the first data and the second data as the generated heat amount, where p is a natural number, and includes a counter for outputting a count as the generated heat amount, and said counter increments the count when absolute differences of the first data and the second data in one frame is larger than predetermined first threshold for the number of times equal to or larger than a predetermined second threshold, and decrements the count when the number of times is smaller than the second threshold.

8. The display apparatus driving circuit according to claim 7, wherein said heat detecting circuit detects s generated heat amount, compares the s generated heat amount with s reference values, and outputs a heat detection signal according to the s generated heat amount, the s reference values, and their magnitude relationship, where s is a natural number, and said heat reduction circuit changes the driving method to a driving method according to a type of the heat detection signal.

9. The display apparatus driving circuit according to claim 7, further comprising a timing controller for controlling a driving timing by said source driver, based on image data, wherein said heat detecting circuit is incorporated in said timing controller.

10. The display apparatus driving circuit according to claim 7, further comprising a gate driver for driving the display unit on a row basis, wherein said gate driver and said source driver change the driving method from a progressive driving to an interlaced driving or a frame thinning driving, when the heat detection signal is received.

11. The display apparatus driving circuit according to claim 7, wherein said heat reduction circuit changes the driving method from a method that does not perform charge sharing to a method that performs charge sharing, when the heat detection signal is received.

12. The display apparatus driving circuit according to claim 11, wherein said heat reduction circuit performs the charge sharing by short-circuiting at least one of (i) odd columns and (ii) even columns.

13. A display apparatus driving circuit comprising:

n source drivers for driving a display unit;

at least one heat detecting circuit incorporated in at least one of said n source drivers for detecting amount of heat generated at said at least one of said n source drivers, and outputting a heat detection signal when the detected amount of generated heat is equal to or larger than a predetermined reference value; and a heat reduction circuit for changing, when the heat detection signal is received, a driving method of the display unit to reduce the amount of heat generated at said at least one source driver;

wherein said heat detecting circuit includes:

a temperature measuring circuit for measuring a temperature which is the amount of heat generated at said at least one source driver; and a temperature comparison circuit for comparing the temperature measured by said temperature measuring circuit and a reference temperature which is the reference value, and said heat detecting circuit outputs the heat detection signal when the temperature measured by said temperature detecting circuit is equal to or higher than the reference temperature, said at least one source driver having said heat detecting circuit among said n source drivers is two or more source drivers which are interconnected, and heat detecting circuits included in said two or more source drivers share a detection result.

14. The display apparatus driving circuit according to claim 13, wherein said heat detecting circuit further includes a reference circuit for generating a reference voltage corresponding to the reference temperature, using bandgap characteristics, said temperature measuring circuit further generates a measured voltage corresponding to the measured temperature, and said temperature comparison circuit compares the reference voltage and the measured voltage, and outputs the heat detection signal when the measured voltage is equal to or larger than the reference voltage.

15. The display apparatus driving circuit according to claim 13, wherein all of said n source drivers change the driving method to a same driving method when any of said at least one heat detecting circuit outputs the heat detection signal.

* * * * *